United States Patent
Karasawa et al.

(10) Patent No.: US 8,595,816 B2
(45) Date of Patent: Nov. 26, 2013

(54) USER AUTHENTICATION SYSTEM AND METHOD FOR THE SAME

(75) Inventors: Kei Karasawa, Tokyo (JP); Nachi Ueno, Tokyo (JP); Kenji Takahashi, Tokyo (JP); Yukio Tsuruoka, Tokyo (JP); Shingo Orihara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 618 days.

(21) Appl. No.: 12/681,382

(22) PCT Filed: Jun. 25, 2008

(86) PCT No.: PCT/JP2008/061577
§ 371 (c)(1),
(2), (4) Date: Nov. 1, 2010

(87) PCT Pub. No.: WO2009/050924
PCT Pub. Date: Apr. 23, 2009

(65) Prior Publication Data
US 2011/0047373 A1    Feb. 24, 2011

(30) Foreign Application Priority Data
Oct. 19, 2007    (JP) ................................. 2007-272588

(51) Int. Cl.
*H04L 9/32* (2006.01)
(52) U.S. Cl.
USPC .......................................................... 726/10
(58) Field of Classification Search
USPC .......................................... 713/176; 726/10
See application file for complete search history.

(56) References Cited

U.S. PATENT DOCUMENTS 6,553,493 B1 * 4/2003 Okumura et al. ............. 713/170
6,823,454 B1 * 11/2004 Hind et al. .................... 713/168

(Continued)

FOREIGN PATENT DOCUMENTS

| JP | 5 289957 | 11/1993 |
| JP | 2005 521279 | 7/2005 |
| WO | WO 03/079167 A1 | 9/2003 |

OTHER PUBLICATIONS

Extended European search report issued Oct. 25, 2011, in Application No. / Patent No. 08777593.8-2415 / 2202913 PCT/JP2008061577.

(Continued)

*Primary Examiner* — Tamara T Kyle
(74) *Attorney, Agent, or Firm* — Oblon, Spivak, McClelland, Maier & Neustadt, L.L.P.

(57) ABSTRACT

At the user authentication apparatus 30, an identifier of a certification authority (CA) certificate that a CA information disclosure server 20 discloses in advance is registered in an identifier list of the CA. At the user terminal 10, a key pair consisting of a terminal public key and a terminal secret key is generated, the terminal signature is generated for information containing the terminal public key using the CA secret key acquired in advance, and a self-signed certificate of the same form as the certificate issued from CA, that is, a terminal certificate containing at least a terminal public key, a terminal signature, and a CA identifier, is created and stored, and registered in the user authentication apparatus 30. The terminal certificate having the same issuer information as the CA identifier in the identifier list of the CA notified from the user authentication apparatus 30 at the time of the service request is selected, and user authentication in accordance with a well-known user authentication protocol is executed using the terminal certificate.

21 Claims, 40 Drawing Sheets

(56) References Cited

U.S. PATENT DOCUMENTS

| | | | |
|---|---|---|---|
| 6,826,690 B1* | 11/2004 | Hind et al. | 713/186 |
| 7,096,363 B2* | 8/2006 | Kon et al. | 713/176 |
| 7,600,113 B2* | 10/2009 | Kuehnel et al. | 713/155 |
| 2002/0010684 A1* | 1/2002 | Moskowitz | 705/75 |
| 2002/0138735 A1* | 9/2002 | Felt et al. | 713/176 |
| 2003/0172278 A1* | 9/2003 | Farnham et al. | 713/176 |
| 2003/0185395 A1* | 10/2003 | Lee et al. | 380/277 |
| 2005/0144463 A1 | 6/2005 | Rossebo et al. | |
| 2005/0188193 A1* | 8/2005 | Kuehnel et al. | 713/155 |
| 2006/0242410 A1 | 10/2006 | Aftab et al. | |

OTHER PUBLICATIONS

D. Cooper, et al., "Internet X.509 Public Key Infrastructure Certificate and Certificate Revocation List (CLR) Profile; draft-ietf-pkix-rfc3280bis-08.txt", (Network working Group), 5. JCT-VC Meeting; 96. MPEG Meeting; (Joint Collaborative Team on Video Coding of ISO/IEC JTC1/SC29/WG11and ITU-T SG.16 ); URL: http://wftp3.itu.int/av-arch/jc tvc-site/-17/03/2011, Internet Engineering Task Force, IETF, vol. pkix, No. 8, XP015049719, Feb. 21, 2007, 144 pages.

Herzberg, Amir "Relying Party Credentials Framework", Electronic Commerce Research, vol. 4, No. 1-2, pp. 23-39, (2004).

Chappell, David "Windows (registered trademark) CardSpace no shoukai (Introduction of Windows (registered trademark) CardSpace)", Microsoft Corporation, http://msdn.microsoft.com/en-us/library, Searched on Sep. 3, 2007 , (with computer generated translation).

* cited by examiner

FIG. 40

3SD USER INFORMATION DATABASE

| TERMINAL PUBLIC KEY (OR TERMINAL CERTIFICATE) | SERVICE PROVISION SERVER IDENTIFIER | USER IDENTIFIER | USER PASSWORD |
|---|---|---|---|
| MIIdfeEFA.... | http://www.server1/... | Taro | ABC123abc |
| MIIAEb92s... | http://www.server2/... | Hanako | qwerty |
| MIIweibeiUJ... | http://www.server3/... | Nippon | xyzpassword |
| ... | ... | ... | ... |

USER AUTHENTICATION SYSTEM AND METHOD FOR THE SAME

TECHNICAL FIELD

The present invention relates to a user authentication technique using a self-signed certificate.

BACKGROUND ART

Conventionally, in cases where authentication is done by confirming only an identity of the user, or where providers of service, such as an online bank, already have means to confirm the user, there is a demand to improve the level of security of the protocol that authenticates the user by using a key pair. With regards to techniques for realizing user authentication with high level of security, many mutual authentication protocols that use certificates have been proposed. Such protocols include SSL (Secure Sockets Layer) client authentication protocol, IKE (Internet Key Exchange) mutual authentication protocol, and EAP-TLS (Extensible Authentication Protocol-Transport Layer Security) protocol. As to these mutual authentication protocols, standards are established for using a key pair consisting of a public key and a secret key, and a digital certificate of the public key (public key certificate), and many kinds of products support these protocols. The public key certificate is usually issued by a certification authority (hereafter referred to as "CA"). The certificate includes data such as user's public key and identifier ID, and a digital signature generated using a secret key of the CA to the data.

When using such a mutual authentication protocol utilizing certificates, there is a problem in that the cost incurs for protecting the secret key of the CA and for processing the issuance of the certificates.

On the other hand, a protocol has been proposed which issues a certificate (self-signed certificate) using user's own key pair and authenticates the user using the self-signed certificate (refer to Non-patent literature 1). With the user authentication protocol using the self-signed certificate, it is possible to confirm the identity of the user by using user's key pair. In this case, since the CA is not used, there is an advantage that there is no need for the cost needed to protect the above-described secret key of the CA and to issue the certificates at the server side.

FIG. 1 shows a schematic view of a system for a user to be provided various services via the network. Connected to a network NW is a large number of user terminals $10_1$, $10_2$, . . . (hereafter, any one of which is referred to as a "user terminal 10"), a plurality of certification authorities $2_1$, $2_2$, . . . (hereafter, any one of which is referred to as a "certification authority 2"), and a plurality of service providers $3_1$, $3_2$, . . . (hereafter, any one of which is referred to as a "service provider 3"). Each of the service providers $3_1$, $3_2$, . . . includes respective user authentication apparatus $30_1$, $30_2$, . . . (hereafter, any one of which is referred to as a "user authentication apparatus 30"). However, as shown by the dashed line, a service provider 3 and a user authentication apparatus 30 may be provided independently. Each user terminal 10 can be provided desired services from any one of the service providers 3 via the network NW. There are various forms of service. For example, in cases where a user is to be provided a particular service, in many cases, user registration to the service provider that provides the service is required in advance, and the service provider provides the service only to those users registered oneself, non-free or free of charge. In such cases, the service provider needs to perform user authentication before providing a service in response to a service request from the user.

First, the user terminal 10 performs user registration to the user authentication apparatus 30 of the service provider 3 that provides the desired service. Then, the user terminal 10 accesses the user authentication apparatus 30 of the service provider at a point of time when it desires to be provided the service, the user authentication apparatus 30 performs user authentication, and the desired service is provided to the user if the authentication is successful. Each user can be provided one or more services at any time by registering oneself to one or more service providers 3. The user authentication apparatus 30 of each service provider authenticates a plurality of registered users in response to respective service requests to thereby provide the service.

Examples of a method for performing user authentication include a method that uses certificates issued by a CA, and a method that uses a self-signed certificate of the user terminal. In the former method that uses certificates issued by a CA, the user terminal requests the CA which the user authentication apparatus trusts to issue a public key certificate of the user that contains a signature calculated by using a CA secret key, and performs user authentication of the user terminal using the public key certificate of the user at the time of the service request. In this method, it is necessary for the CA to generate a certificate for each user and safely manage the CA secret key. Therefore, there is a problem in that the management cost of the CA increases.

Now, the latter authentication method that uses a self-signed certificate will be described below. FIG. 2 shows a flow of overall processing in a user authentication system using a conventional self-signed certificate. Shown here is processing between any one of the user terminals 10 in FIG. 1 and any one of the user authentication apparatus 30.

[Registration Phase]

(1) The user terminal 10 generates a key pair consisting of a public key $PK_U$ and a secret key $SK_U$, for use with a desired service provider, generates a signature $SIG_U = SK_U(PK_U, INF_U)$ corresponding to the public key $PK_U$ and information required for creating a certificate such as a user identifier $ID_U$ prepared in advance (user information $INF_U$), using the secret key $SK_U$, creates a self-signed certificate (hereafter referred to as a "terminal certificate") $CERT_U = \{PK_U, INF_U, SIG_U\}$ containing the public key $PK_U$, the user information $INF_U$, and the signature $SIG_U$ (Step S11), and stores it in a storage device and transmits to the user authentication apparatus 30 of the above service provider, to thereby request the registration (Step S12). Here, SK (*) indicates a signature generated using a secret key SK for data "*".

(2) The user authentication apparatus 30 verifies the user terminal certificate $CERT_U$ received from the user terminal 10 (Step S13), and if the verification is successful, associates the user information $INF_U$ contained in the terminal certificate or the user information $INF_U$ separately notified by the user, and the user terminal certificate $CERT_U$ or the terminal public key $PK_U$ contained in it, to thereby store them into the user information storage device (registration of user information) (Step S14).

In cases where the user uses a plurality of service providers, such registration is performed for each service provider that the user uses. Since the key pair and/or the user identifier $ID_U$ are newly generated for each service provider, the user retains a plurality of different terminal certificates (self-signed certificates) corresponding to each service provider.

[Utilization Phase]

(1) In response to a service request from the user terminal (Step S15), the user authentication apparatus 30 transmits a certificate request and a random number R to the user terminal 10 (Step S16).

(2) From the plurality of stored terminal certificates, the user terminal 10 lets the user select a terminal certificate corresponding to the service provider that the user desires to use. Then, the user terminal 10 makes a signature on data containing the random number R using the terminal secret key $SK_U$ corresponding to the terminal public key $PK_U$ contained in the selected terminal certificate (Step S17), and the signature $SIGR_U$ and the terminal certificate $CERT_U$ are transmitted to the user authentication apparatus 30 (Step S18).

(3) The user authentication apparatus 30 verifies the received signature $SIGR_U$ and the terminal certificate $CERT_U$ (Step S19), and if the verification is successful, the corresponding registered user information $INF_U$ is searched in the user information storage device using the terminal certificate $CERT_U$ or the terminal public key $PK_U$ contained in it (Step S20), to provide service for the user (Step S21).

[Non-patent literature 1] "Windows (registered trademark) CardSpace no shoukai (Introduction of Windows (registered trademark) CardSpace)"

[Online] Microsoft Corporation, [searched on Sep. 3, 2007], Internet <URL: http://www.microsoft.com/japan/msdn/net/general/IntroInfoCard.aspx>

DISCLOSURE OF THE INVENTION

Problems to be Solved by the Invention

However, a majority of server software does not support operations that use self-signed certificates (terminal certificates). For example, as to the method of specifying a certificate that can be accepted by a user authentication apparatus, SSL only defines a method that specifies in a certificate request message an identifier of the CA that issued the certificate. Therefore, there is no means to specify the self-signed certificate of the user (terminal certificate) from the user authentication apparatus. Thus, there are two problems as follows:

(a) In cases where the user terminal stores a plurality of self-signed certificates, user software (e.g., browser) cannot select a certificate automatically, and the user needs to select one out of a plurality of self-signed certificates presented by the user terminal.

(b) The server that is at the service provision side (i.e., user authentication apparatus) should be set to accept any certificate. Therefore, it is not possible to avoid the increase in the processing load and lowering of security level.

One way to avoid these problems is to give up the authentication by a self-signed certificate, pay the cost of CA operation, and distribute certificates issued by the CA to the users.

An objective of the present invention is to solve the above two problems involved in user authentication protocols which use self-signed certificates.

Means to Solve the Problems

In accordance with the invention, a user authentication system which performs user authentication utilizing a terminal certificate between a user authentication apparatus and a user terminal is provided, wherein at least one user terminal having a certification authority secret key and a certification authority identifier, and at least one user authentication apparatus having a certification authority public key and a certification authority identifier are connected to at least a network, the user terminal includes:

terminal certificate generation means which is configured to calculate a terminal signature using the certification authority secret key for signature subject information which is discretionary data, and generate a terminal certificate which is a self-signed certificate containing at least the signature subject information, the terminal signature, and the certification authority identifier;

terminal information storage means which is configured to save the terminal certificate;

registration request means which is configured to transmit at least the terminal certificate as a user registration request to the user authentication apparatus; and service request means which is configured to acquire from the terminal information storage means a terminal certificate corresponding to a certification authority identifier received from a user authentication apparatus upon a service request, and transmit the terminal certificate to the user authentication apparatus; and the user authentication apparatus includes:

authentication information storage means;

user registration means which is configured to register in the authentication information storage means a terminal certificate received from a user terminal; and user authentication means which is configured to notify, in response to a service request from a user terminal when authenticating the user terminal, the certification authority identifier to the user terminal, obtain a corresponding terminal certificate from the user terminal, and verify the terminal signature contained in the terminal certificate using the certification authority public key.

Effects of the Invention

Thus, in accordance with the invention, since the terminal certificate is generated at the user terminal, it is possible to eliminate the operation cost of the CA and the cost for protecting the secret key of the CA. Moreover, the user authentication apparatus can limit the terminal certificate that it receives by specifying the CA identifier, and therefore, it is possible to improve the security. Furthermore, the user terminal can limit the terminal certificate that is to be transmitted to the user authentication apparatus using a CA identifier specified by the user authentication apparatus, and when a plurality of terminal certificates are retained, it is possible to reduce the load of the user selecting the terminal certificate.

BRIEF DESCRIPTION OF THE DRAWINGS

FIG. 40 is a figure showing an example of the user information registered into a user information database in a user information server.

DETAILED DESCRIPTION OF PREFERRED EMBODIMENTS

Figure 1:
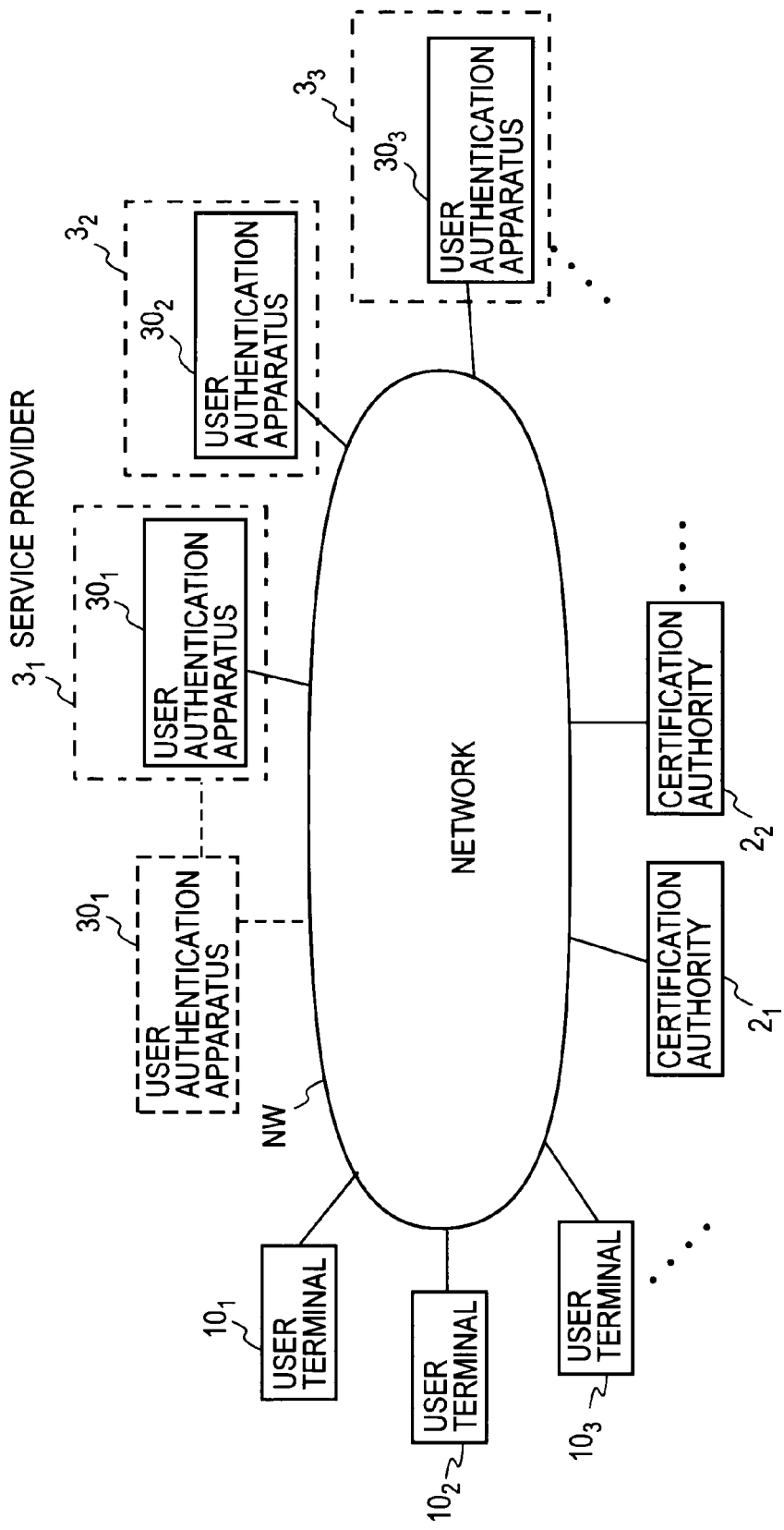
FIG. 1 is a block diagram briefly showing a conventional user authentication system.
Figure 2:
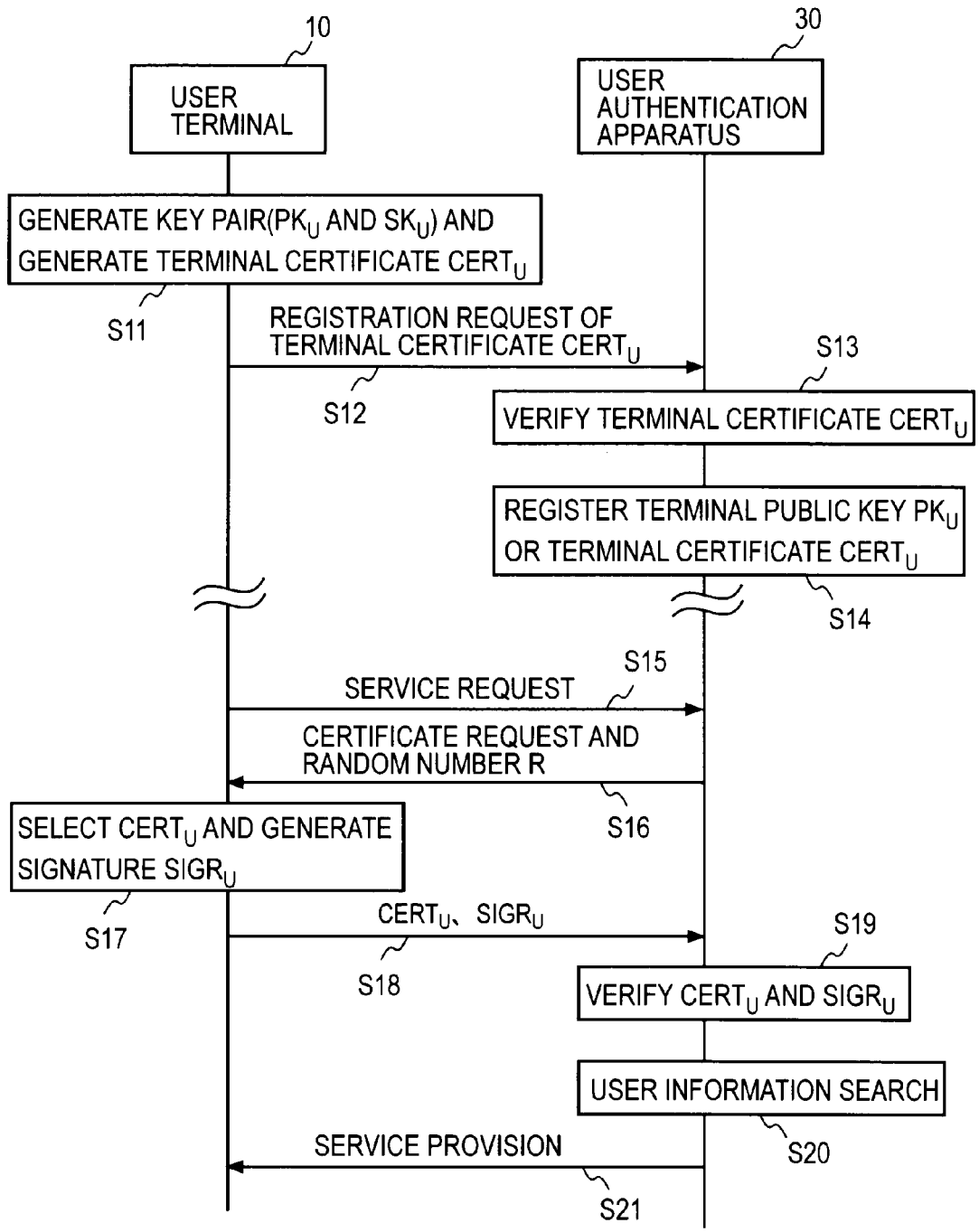
FIG. 2 is a sequence diagram showing a flow of overall processing in the conventional user authentication system.
Figure 3:
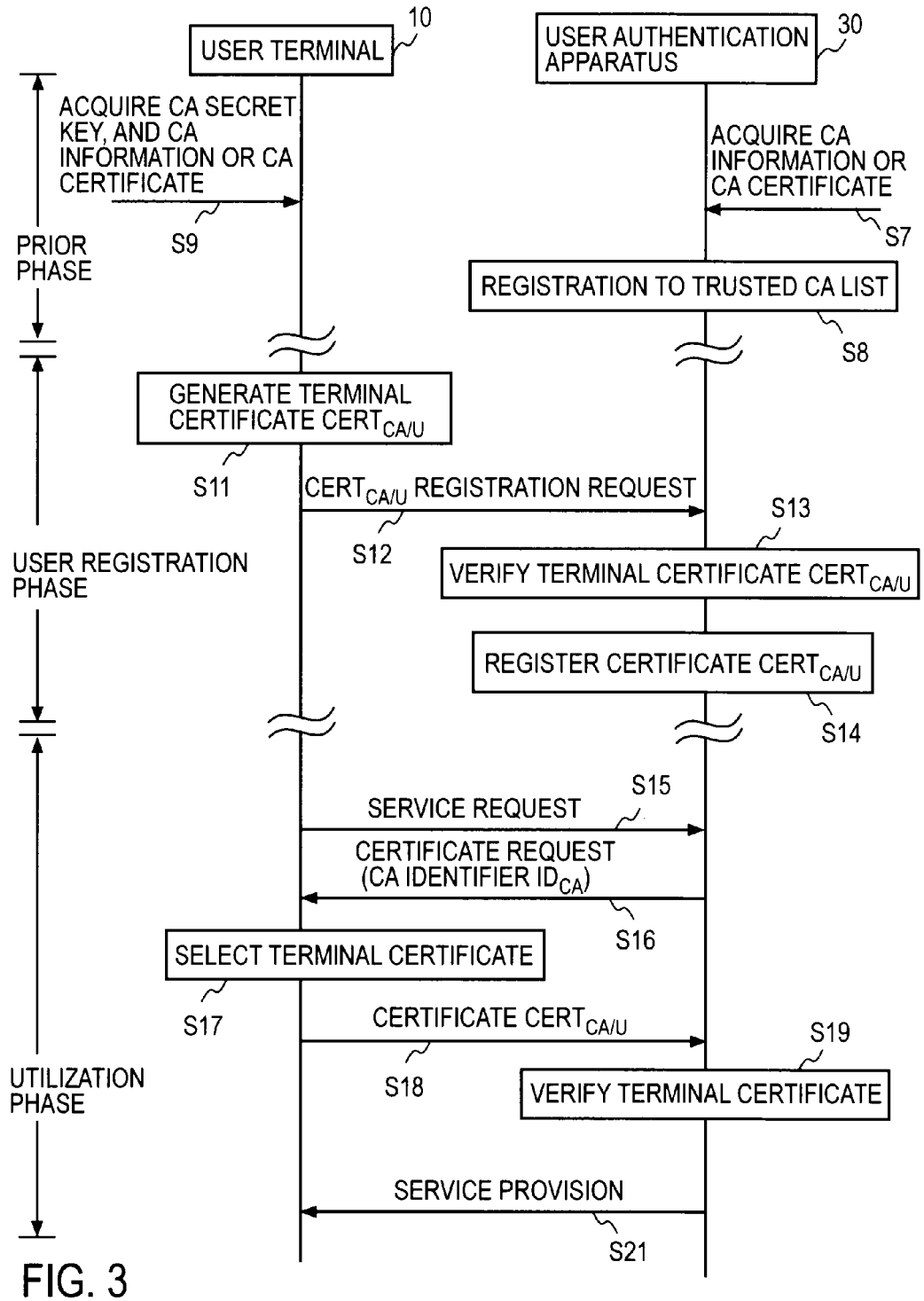
FIG. 3 is a sequence diagram showing a fundamental flow of processing in the user authentication system in accordance with the present invention.

FIG. 3 shows a fundamental flow of overall processing in the user authentication system in accordance with the present invention. Shown here is processing in a system (refer to FIG. 1) comprising a user terminal 10, a user authentication apparatus (service provision server) 30, and a network which connects these elements.

[Prior Phase]

The user authentication apparatus 30 acquires in advance, information on the CA that the user authentication apparatus 30 trusts (CA public key $PK_{CA}$, CA identifier $ID_{CA}$), or the CA certificate $CERT_{CA}$ containing the CA information (Step S7), and the CA certificate $CERT_{CA}$ or the CA identifier $ID_{CA}$ is registered in the CA list that the user authentication apparatus 30 trusts (Step S8). The CA certificate $CERT_{CA}$ contains a CA public key $PK_{CA}$, issue subject information $INF_{CA}$ which contains an identifier $ID_{CA}$ of CA that is the issue subject, an identifier $ID_{CA}$ of CA that is the issuer of the certificate, and a CA signature $SIG_{CA}=SK_{CA}(PK_{CA}, INF_{CA}, ID_{CA})$ which use a CA secret key $SK_{CA}$ for the public key $PK_{CA}$, the issue subject information $INF_{CA}$, and the identifier $ID_{CA}$ of CA that is the issuer. It is assumed that this is expressed as $CERT_{CA}=\{PK_{CA}, INF_{CA}, ID_{CA}, SIG_{CA}\}$. As to the method for acquiring the CA information or the CA certificate, for example, it is separately acquired from CA information disclosure server (not illustrated) provided in the network. Alternatively, it can be acquired by other methods.

It is assumed that the user terminal 10 has acquired in advance the secret key $SK_{CA}$ of CA that is trusted by the user authentication apparatus to be used, and the CA certificate $CERT_{CA}$ or CA information of the CA (Step S9). That is, in the present invention, there is no need to manage the CA secret key $SK_{CA}$ secretly in the CA. As to the method of acquiring the CA information or the CA certificate, for example, it may be acquired from the user authentication apparatus 30, or a CA information disclosure server may be separately prepared in the network (not illustrated), and it may be acquired from the CA information disclosure server. Any method of acquisition may be used.

[User Registration Phase]

(a) The user terminal 10 generates a terminal signature $SIG_{CA/U}=SK_{CA}(UD, ID_{CA})$ using the CA secret key $SK_{CA}$, for information containing discretional information UD prepared in advance as a subject for the signature (referred to as "signature subject information") and the issuer identifier $ID_{CA}$, creates a self-signed certificate $CERT_{CA/U}=\{UD, SIG_{CA/U}, ID_{CA}\}$ which contains signature subject information UD, a terminal signature $SIG_{CA/U}$, and certificate issuer information (a CA identifier $ID_{CA}$ corresponding to a secret key $SK_{CA}$ used for signature calculation herein) (hereafter referred to as "terminal certificate") (Step S11), saves it to the terminal storage device (not illustrated) of the user terminal 10 and transmits it to the user authentication apparatus 30, and requests the registration (Step S12).

(b) The user authentication apparatus 30 examines whether or not the CA identifier $ID_{CA}$ contained in the user's terminal certificate $CERT_{CA/U}$ received from the user terminal 10 is contained in the CA list, verifies, if required, the terminal certificate $CERT_{CA/U}$ by verifying the terminal signature $SIG_{CA/U}$ contained in the terminal certificate $CERT_{CA/U}$ using a CA public key $PK_{CA}$ (Step S13), and if the verification is successful, registers the terminal certificate $CERT_{CA/U}$ into the user information storage device (not illustrated) (Step S14).

[Utilization Phase]

(a) In response to a service request from the user terminal 10 (Step S15), the user authentication apparatus 30 transmits to the user terminal 10 a list of CAs that the user authentication apparatus trusts and have been registered in advance, that is, a list of CA identifiers $ID_{CA}$, as a certificate request (Step S16).

(b) The user terminal 10 which received the certificate request selects from the terminal storage device (not illustrated) a terminal certificate $CERT_{CA/U}$ which has the same CA identifier $ID_{CA}$ as any one of those in the CA identifier list contained in the certificate request as issuer information (Step S17). Furthermore, the user terminal 10 transmits the terminal certificate $CERT_{CA/U}$ to the user authentication apparatus 30 (Step S18).

(c) The user authentication apparatus 30 verifies the authenticity of the received terminal certificate $CERT_{CA/U}$ using a certificate $CERT_{CA}$ of the CA that the user authentication apparatus 30 trusts. That is, The user authentication apparatus 30 verifies that the CA identifier $ID_{CA}$ contained in the received terminal certificate $CERT_{CA/U}$ matches any one of the CA identifiers $ID_{CA}$ in the CA list, and verifies the terminal signature $SIG_{CA/U}$ contained in the terminal certificate $CERT_{CA/U}$ using the CA public key $PK_{CA}$ (Step S19). If the verification is successful, service is provided to the user (Step S21).

As described above, in accordance with the invention, it is possible to specify which CA information ($SIG_{CA}$, $ID_{CA}$) is the needed terminal certificate based on by means of the user authentication apparatus notifying to the user terminal the identifier list of the CA which the user authentication apparatus trusts. Therefore, the user authentication apparatus needs to accept only the terminal certificate that contains, as the issuer information, an identifier that matches the identifier of the CA, and it is possible to reduce the load and improve security at the same time.

Moreover, it is possible to limit the terminal certificate that the user authentication apparatus accepts to those certificates that contain the identifier $ID_{CA}$ in the specified CA identifier list as the issuer information. Therefore, it is possible to select a terminal certificate that is to be automatically sent from a plurality of terminal certificates, narrow down the candidates even in cases where the user selects the terminal certificate, and improve user friendliness.

Moreover, since the terminal certificate is used for confirming the identity of the user, there is no problem in disclosing a secret key of the CA. Therefore, it is possible to eliminate the cost of managing the CA key, and eliminate the cost of operation of the CA by making each of the user terminals perform the issuance of the certificates.

In the following, embodiments of the present invention will be described in detail with reference to the drawings.

<First Embodiment>

Figure 4:
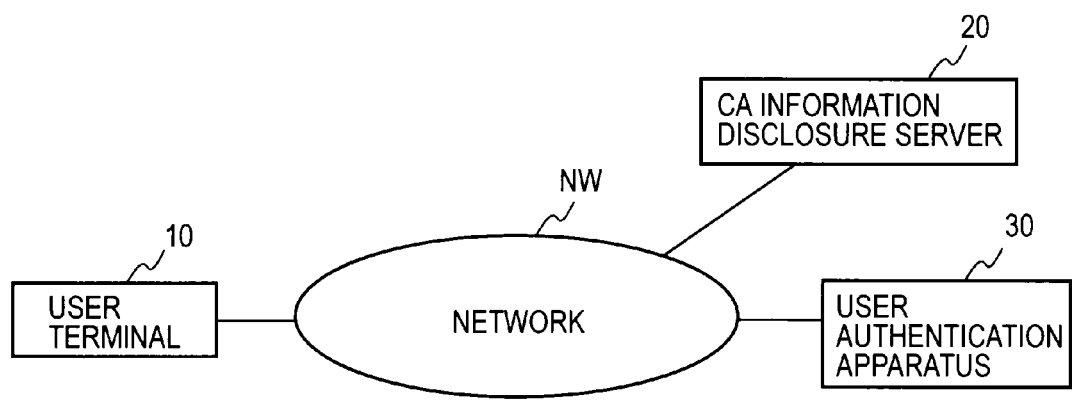
FIG. 4 is a block diagram briefly showing a user authentication system in accordance with a first embodiment of the present invention.

FIG. 4 shows a schematic view of a user authentication system in accordance with a first embodiment of the present invention. In the figure, 10 is a user terminal which the user uses, 20 is a CA information disclosure server which discloses CA information (CA public key $PK_{CA}$, CA secret key $SK_{CA}$, and CA identifier $ID_{CA}$), 30 is a user authentication apparatus which authenticates the user and provides service, and NW is a network, such as the Internet, which connects these elements.

[User Terminal]

Figure 5:
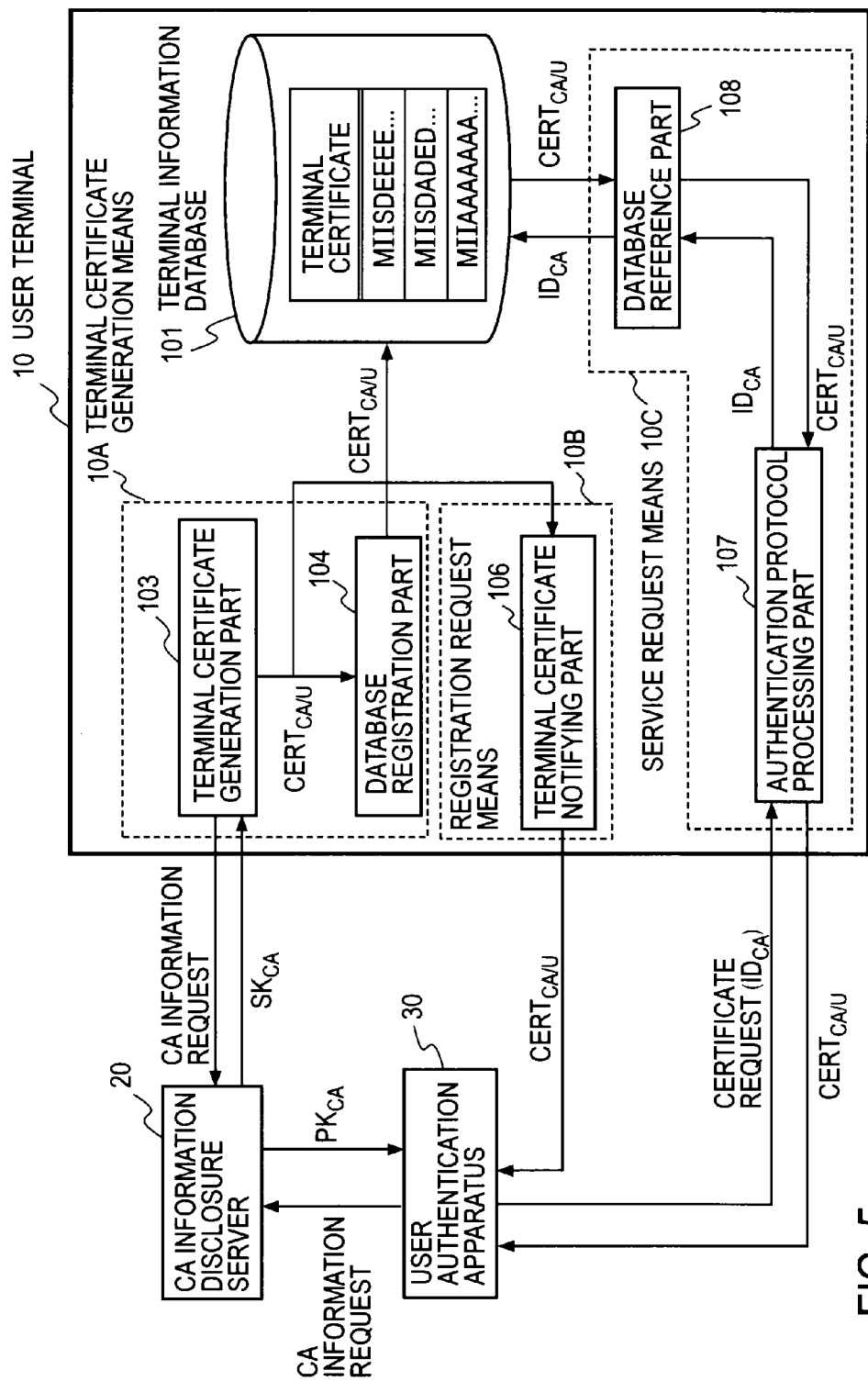
FIG. 5 is a block diagram of a user terminal in accordance with the first embodiment of the present invention.

As shown in FIG. 5, the user terminal 10 includes a terminal information database 101, a terminal certificate generation part 103, a database registration part 104, a terminal certificate notifying part 106, an authentication protocol processing part 107, and a database reference part 108. The terminal certificate generation part 103 and the database registration part 104 configure terminal certificate generation means 10A. The terminal certificate notifying part 106 configures registration request means 10B. The authentication protocol processing part 107 and the database reference part 108 configure service request means 10C.

The terminal information database 101 stores a terminal certificate $CERT_{CA/U}$ which is a self-signed certificate generated in the terminal certificate generation part 103. The terminal certificate generation part 103 specifies a CA identifier $ID_{CA}$ which the user authentication apparatus of the service provider that the user desires to use requires, requests a CA secret key to the CA information disclosure server 20 in advance, receives the CA secret key $SK_{CA}$ from the CA information disclosure server 20, generates a terminal signature $SIG_{CA/U}=SK_{CA}(UD)$ using the received CA secret key $SK_{CA}$ for the signature subject information UD which is discretionary data prepared in advance (signature calculation), generates a terminal certificate $\text{CERT}_{CA/U} = \{UD, \text{SIG}_{CA/U}, \text{ID}_{CA}\}$ containing at least signature subject information UD, a terminal signature $\text{SIG}_{CA/U}$, and the CA identifier $\text{ID}_{CA}$, and registers it into the terminal information database 101 via the database registration part 104.

The terminal certificate notifying part 106 transmits a terminal certificate $\text{CERT}_{CA/U}$ generated in the terminal certificate generation part 103 to the user authentication apparatus 30. Upon receiving a certificate request containing the CA identifier list from the user authentication apparatus 30 in response to the service request to the user authentication apparatus 30 at the time of the user authentication in the utilization phase, the authentication protocol processing part 107 reads a terminal certificate $\text{CERT}_{CA/U}$ containing the CA identifier $\text{ID}_{CA}$ that matches either of the items in the identifier list of the CA from the terminal information database 101 via the database reference part 108, and transmits it to the user authentication apparatus 30.

[CA Information Disclosure Server]

Figure 6:
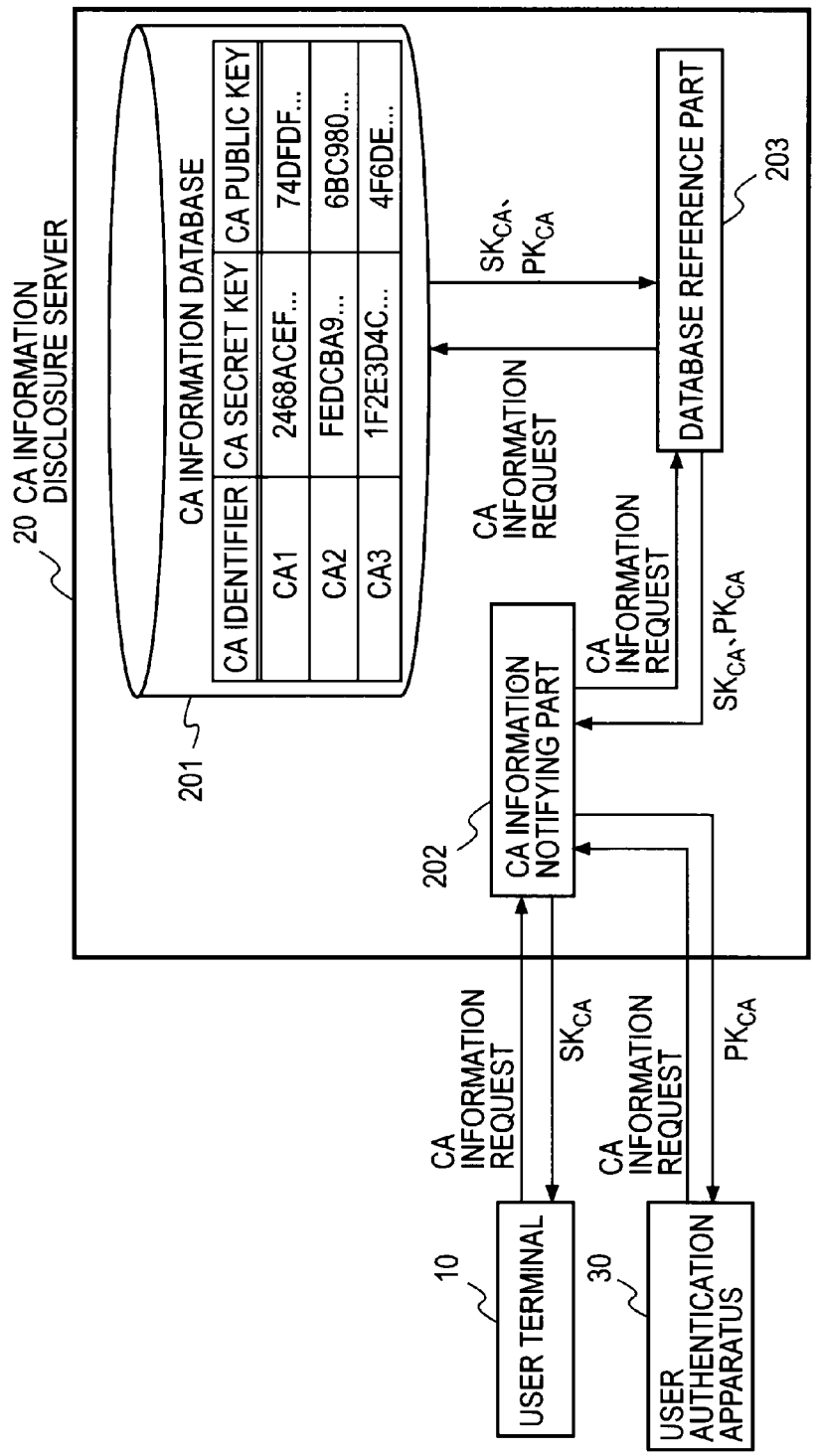
FIG. 6 is a block diagram of a CA information disclosure server in accordance with the first embodiment of the present invention.

As shown in FIG. 6, the CA information disclosure server 20 includes a CA information database 201, a CA information notifying part 202, and a database reference part 203. The CA information database 201 stores the CA identifier $\text{ID}_{CA}$, the CA secret key $\text{SK}_{CA}$, and the CA public key $\text{PK}_{CA}$ which constitute a pair with the CA secret key $\text{SK}_{CA}$, in association with each other.

Upon receiving a CA information request which contain CA identification information $\text{ID}_{CA}$ from the user terminal 10, the CA information notifying part 202, acquires a CA secret key $\text{SK}_{CA}$ corresponding to the specified CA identifier $\text{ID}_{CA}$ from the CA information database 201 via the database reference part 203, and transmits it to the user terminal 10. Moreover, upon receiving a CA information request containing the CA identifier $\text{ID}_{CA}$ from the user authentication apparatus 30, the CA information notifying part 202 acquires the CA public key $\text{PK}_{CA}$ corresponding to the specified CA identifier $\text{ID}_{CA}$ from the CA information database 201 via the database reference part 203, and transmits it to the user authentication apparatus 30.

The user terminal 10 may be authenticated by a predetermined method (for example, ID and password) before transmitting the CA secret key $\text{SK}_{CA}$ to the user terminal 10, and the CA secret key $\text{SK}_{CA}$ may be transmitted only when the authentication is successful.

[User Authentication Apparatus]

Figure 7:
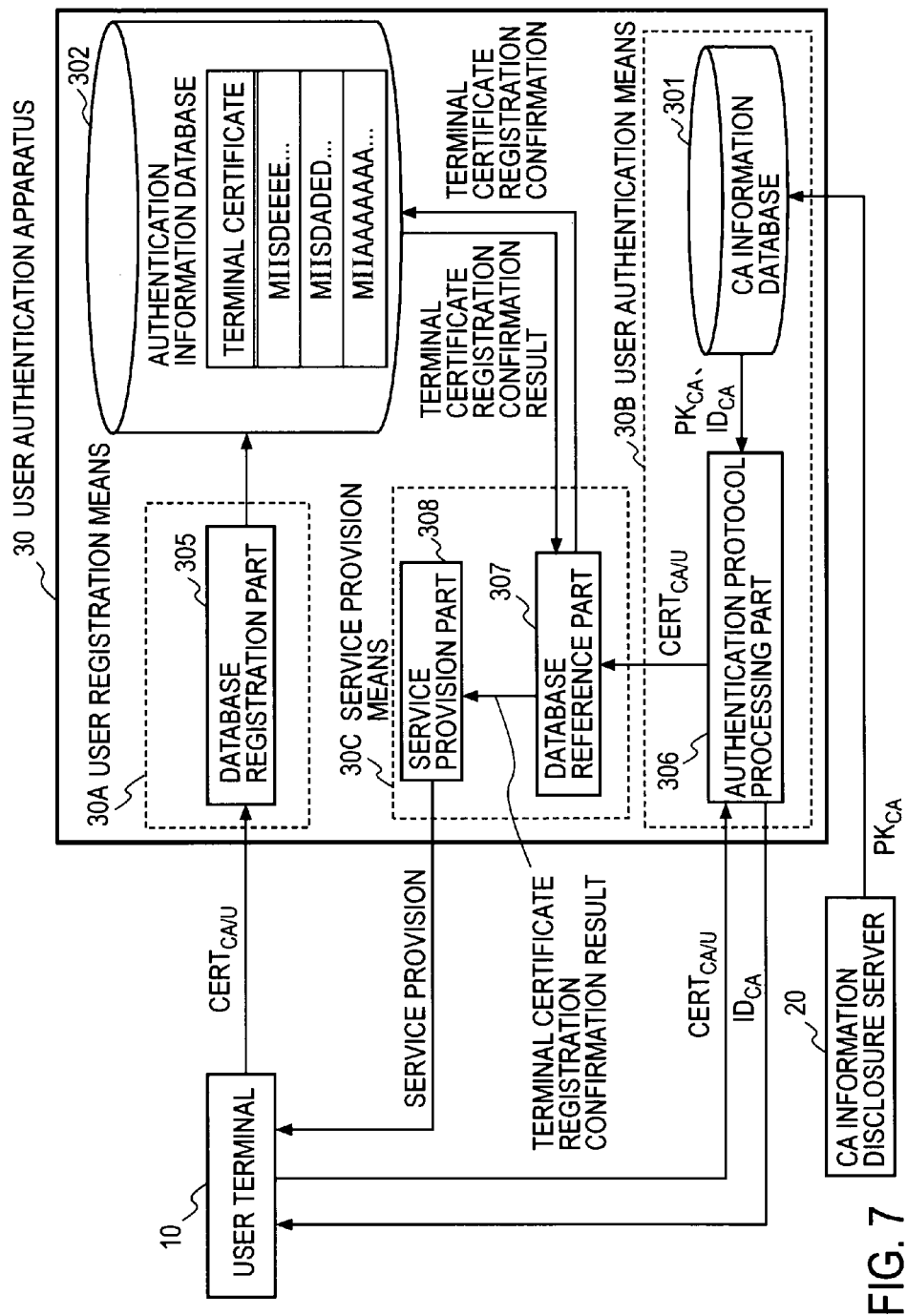
FIG. 7 is a block diagram of a user authentication apparatus in accordance with the first embodiment of the present invention.

As shown in FIG. 7, the user authentication apparatus 30 includes a CA information database 301, an authentication information database 302, a database registration part 305, an authentication protocol processing part 306, a database reference part 307, and a service provision part 308. The database registration part 305 configures user registration means 30A. The CA information database 301 and the authentication protocol processing part 306 configure user authentication means 30B. The database reference part 307 and the service provision part 308 configure service provision means 30C.

The CA information database 301 stores the CA public key $\text{PK}_{CA}$ and the CA identifier $\text{ID}_{CA}$ which correspond to the CA that the user authentication apparatus trusts among the CA public information which the CA information disclosure server 20 discloses, by associating with each other. The authentication information database 302 stores the received user terminal certificate $\text{CERT}_{CA/U}$ from the user terminal 10 via the database registration part 305.

In response to the service request from the user terminal 10 at the time of user authentication, the authentication protocol processing part 306 reads the CA public key $\text{PK}_{CA}$ and the CA identifier $\text{ID}_{CA}$ of the trusted CA from the CA information database 301, transmits the certificate request containing the CA identifier to the user terminal 10, verifies the terminal certificate $\text{CERT}_{CA/U}$ transmitted from the user terminal 10 in response to the certificate request using the CA public key $\text{PK}_{CA}$, and transmits the terminal certificate $\text{CERT}_{CA/U}$ to the database reference part 307 if the authenticity of the terminal certificate $\text{CERT}_{CA/U}$ is confirmed.

The database reference part 307 confirms whether or not the terminal certificate $\text{CERT}_{CA/U}$ which was received from the authentication protocol processing part 306 and which had been confirmed its authenticity has been registered in the authentication information database 302, and transmits the terminal certificate registration confirmation result to the service provision part 308.

The service provision part 308 determines whether or not to provide service based on the received terminal certificate registration confirmation result, and provides service to the user terminal 10.

[Certificate Generation Processing]

Figure 8:
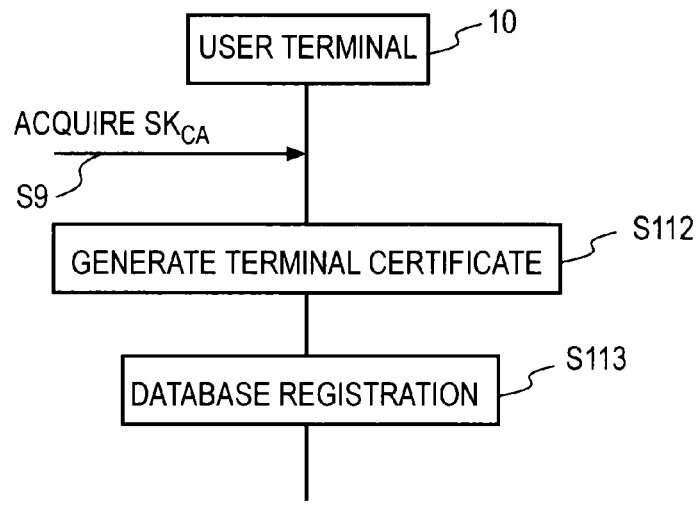
FIG. 8 is a sequence diagram showing a flow of terminal certificate generation processing in a user authentication system in accordance with the first embodiment of the present invention.

FIG. 8 shows a flow of the terminal certificate generation processing by the user terminal 10 in the user authentication system in accordance with the first embodiment of the present invention.

First, the user terminal 10 acquires a CA secret key $\text{SK}_{CA}$ from the CA information disclosure server 20 via the terminal certificate generation part 103 (Step S9). The user terminal 10 generates a terminal signature $\text{SIG}_{CA/U} = \text{SK}_{CA}(UD)$ using the received CA secret key $\text{SK}_{CA}$ for the signature subject information UD which is discretionary data prepared in advance (signature calculation), generates a terminal certificate $\text{CERT}_{CA/U} = \{UD, \text{SIG}_{CA/U}, \text{ID}_{CA}\}$ containing at least signature subject information UD, a terminal signature $\text{SIG}_{CA/U}$, and the CA identifier $\text{ID}_{CA}$ (Step S112), and registers it into the terminal information database 101 via the database registration part 104 (Step S113).

[User Registration Processing]

Figure 9:
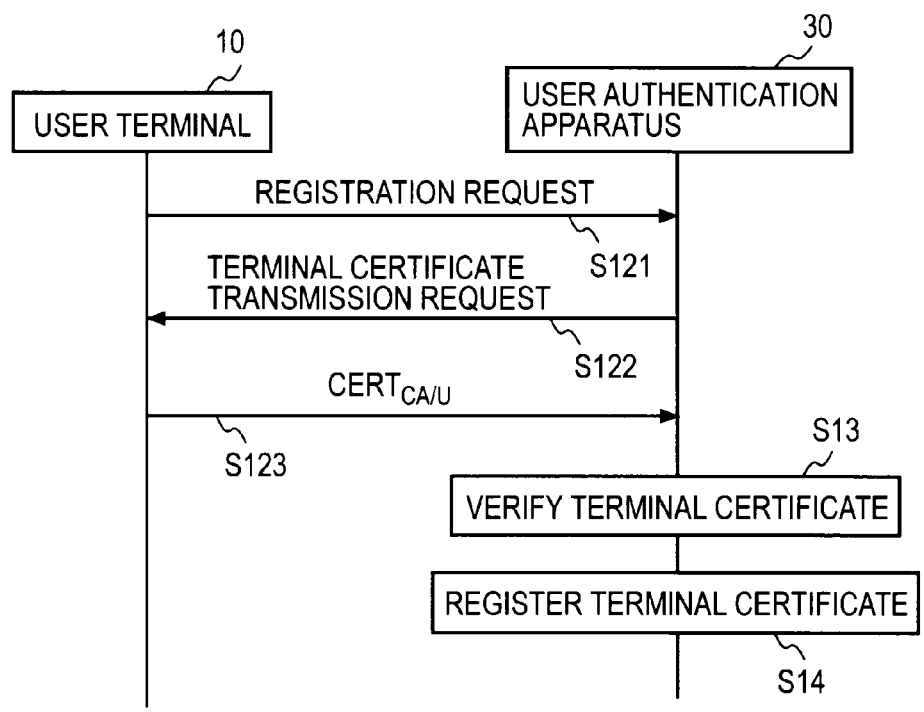
FIG. 9 is a sequence diagram showing a flow of user registration processing in the user authentication system in accordance with the first embodiment of the present invention.

FIG. 9 shows a flow of user registration processing (registration processing of a terminal certificate) in the user authentication system in accordance with the first embodiment of the present invention.

First, in response to the user registration request (Step S121) from the user terminal 10, the user authentication apparatus 30 transmits a terminal certificate transmission request to the user terminal 10 (Step S122). The user terminal 10 which received the terminal certificate transmission request transmits to the user authentication apparatus 30 a terminal certificate $\text{CERT}_{CA/U}$ generated in the terminal certificate generation part 103 and stored in the terminal information database 101 via its terminal certificate notifying part 106 (Step S123). The user authentication apparatus 30 verifies the received terminal certificate $\text{CERT}_{CA/U}$ (Step S13), and if the verification is successful, registers the terminal certificate $\text{CERT}_{CA/U}$ into the authentication information database 302 via the database registration part 305 (Step S14).

[User Authentication Processing]

Figure 10:
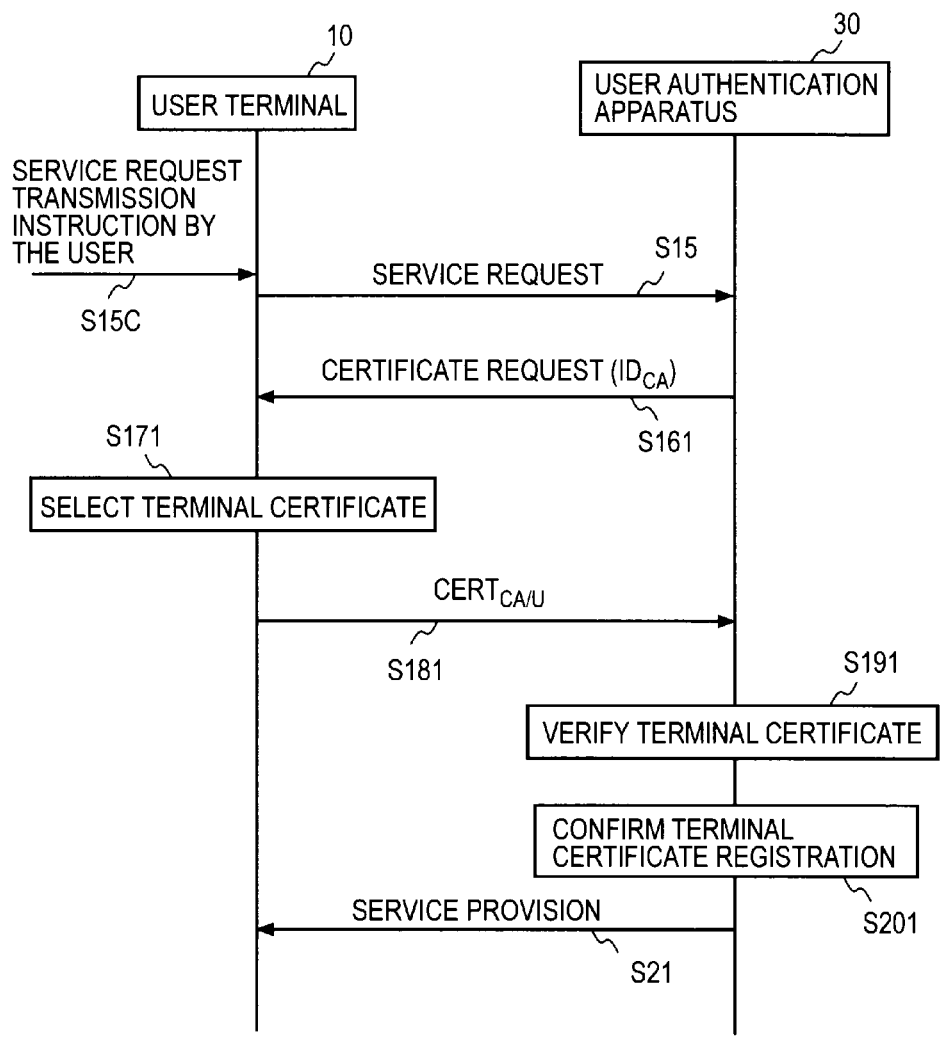
FIG. 10 is a sequence diagram showing a flow of user authentication processing in a user authentication system in accordance with the first embodiment of the present invention.

FIG. 10 shows a flow of user authentication processing in the utilization phase by the user authentication system in accordance with the first embodiment of the present invention. It is assumed that the user authentication apparatus 30 has acquired, in advance, an identifier $\text{ID}_{CA}$ and a public key $\text{PK}_{CA}$ of the CA that the user authentication apparatus trusts, and has registered them into the CA information database 301. As to the acquisition method, for example, there may be provided a separate CA information disclosure server 20 and they may be acquired from there. Any method can be used for the acquisition.

First, in response to the user's instructions (Step S15C), the user terminal 10 transmits a service request to the user authentication apparatus 30 (Step S15). In response to the service request from the user terminal 10, the user authentication apparatus 30 reads the identifier list of the trusted CA from the CA information database 301 by the authentication protocol processing part 306, and transmits the certificate request containing the identifier list to the user terminal 10 (Step S161).

By means of the authentication protocol processing part 107, upon receiving the certificate request, the user terminal 10 selects a terminal certificate $CERT_{CA/U}$ containing a CA identifier that matches any one of the items in the identifier list of the CA from the terminal information database 101 via the database reference part 108 (Step S171), and transmits the terminal certificate $CERT_{CA/U}$ to the user authentication apparatus 30 (Step S181).

By means of the authentication protocol processing part 306, the user authentication apparatus 30 verifies whether or not the CA identifier $ID_{CA}$ in terminal certificate $CERT_{CA/U}$ received from the user terminal 10 matches any one of the CA identifiers in the CA list, further verifies the terminal certificate $CERT_{CA/U}$ using the CA public key $PK_{CA}$ corresponding to the CA identifier $ID_{CA}$ (Step S191), and if the authenticity is confirmed, transmits the terminal certificate to the database reference part 307.

Subsequently, by means of the database reference part 307, the user authentication apparatus 30 confirms whether or not the terminal certificate $CERT_{CA/U}$ received from the authentication protocol processing part 306 is registered in the user authentication information database 302 (Step S201), and notifies the terminal certificate registration confirmation result to the service provision part 308.

By means of the service provision part 308, the user authentication apparatus 30 determines whether or not to provide service based on the terminal certificate registration confirmation result received from the database reference part 307, and provides service to the user terminal 10 (Step S21).

It is noted that, in the present embodiment, the CA information disclosure server 20 and the user authentication apparatus 30 may be unified as one apparatus.

<Second Embodiment>

The schematic view of the user authentication system in accordance with the second embodiment is similar to that of FIG. 4, and therefore, we will refer to FIG. 4.

[User Terminal]

Figure 11:
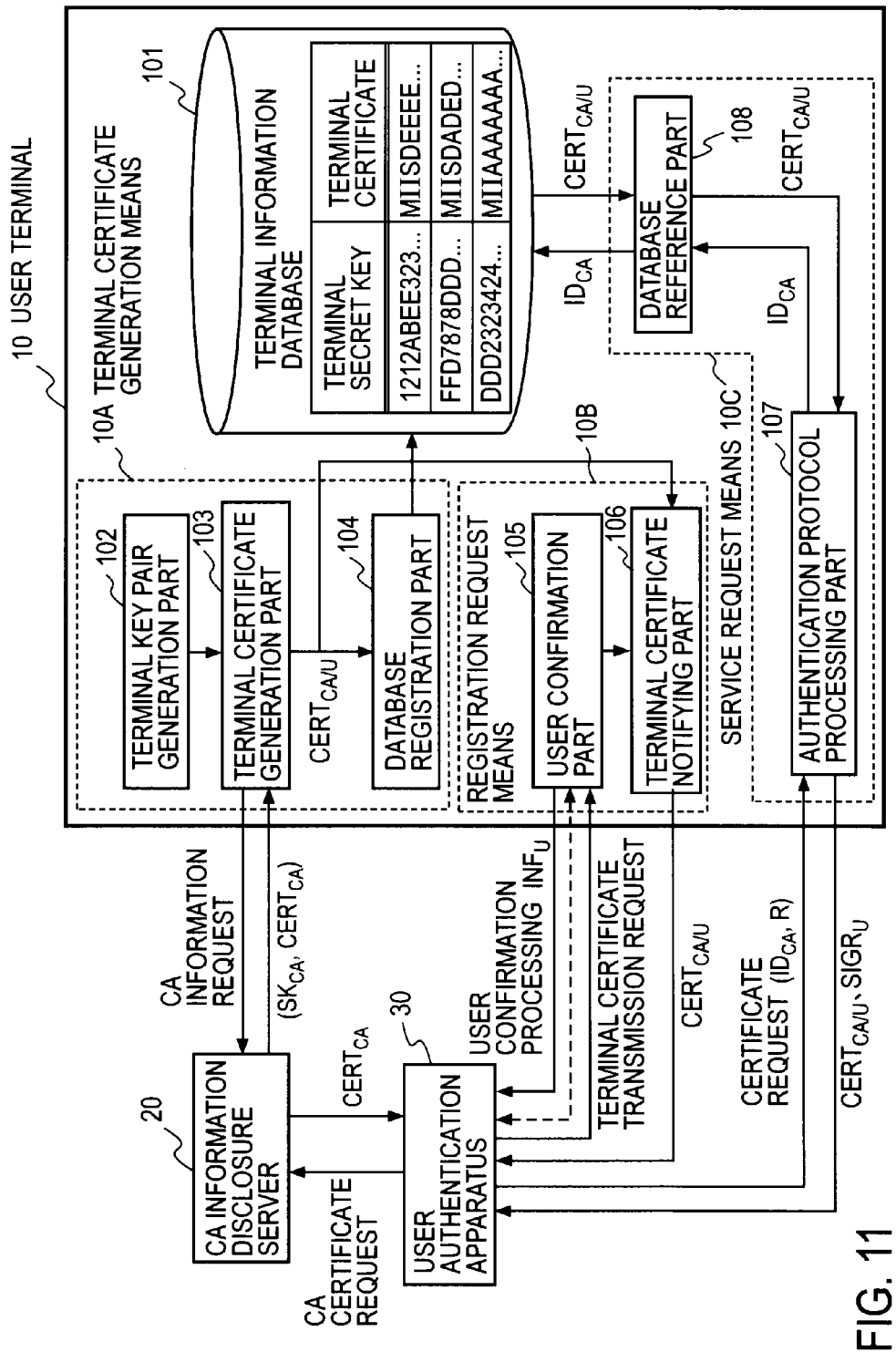
FIG. 11 is a block diagram of a user terminal in accordance with a second embodiment of the present invention.

As shown in FIG. 11, the user terminal 10 includes a terminal information database 101, a terminal key pair generation part 102, a terminal certificate generation part 103, a database registration part 104, a user confirmation part 105, a terminal certificate notifying part 106, an authentication protocol processing part 107, and a database reference part 108. The terminal key pair generation part 102, the terminal certificate generation part 103, and the database registration part 104 configure terminal certificate generation means 10A. The user confirmation part 105 and the terminal certificate notifying part 106 configure registration request means 10B. The authentication protocol processing part 107 and the database reference part 108 configure service request means 10C.

The terminal information database 101 stores the terminal certificate $CERT_{CA/U}$, which is a self-signed certificate generated in the terminal certificate generation part 103, in association with the terminal secret key $SK_U$ which constitutes a pair with the terminal public key $PK_U$ contained in the terminal certificate. The terminal key pair generation part 102 generates a key pair consisting of a public key $PK_U$ and a secret key $SK_U$ of the terminal.

The terminal certificate generation part 103 specifies a CA identifier $ID_{CA}$ which the user authentication apparatus 30 of the service provider that is desired to be used requests, requests the CA secret key and the CA certificate to the CA information disclosure server 20 in advance, and receives the CA secret key $SK_{CA}$ and the CA certificate $CERT_{CA}$ from the CA information disclosure server 20. Then, the terminal certificate generation part 103 generates a terminal signature $SIG_{CA/U}=SK_{CA}(UD)=SK_{CA}(PK_U, INF_U, ID_{CA})$ using the received CA secret key $SK_{CA}$ by assuming information containing the public key $PK_U$ generated in the terminal key pair generation part 102, information (user information $INF_U$) required in order to be provided service, such as a user identifier $ID_U$ prepared in advance (which was inputted in advance and stored in a storage device which is not illustrated), and an issuer identifier $ID_{CA}$ as the signature subject information UD (signature calculation). Further, the terminal certificate generation part 103 generates a terminal certificate $CERT_{CA/U}=\{PK_U, INF_U, SIG_{CA/U}, ID_{CA}\}$ of the same form as the certificate $CERT_{CA}$ issued from CA, which at least contains the public key $PK_U$, the user information $INF_U$, the terminal signature $SIG_{CA/U}$, and the CA identifier $ID_{CA}$ contained in the received CA certificate, and registers it in the terminal information database 101 via the database registration part 104 in association with the terminal secret key $SK_U$ which constitutes a pair with the terminal public key $PK_U$ contained in the terminal certificate $CERT_{CA/U}$.

The user confirmation part 105 transmits user information $INF_U$ containing data, such as a user identifier $ID_U$, to the user authentication apparatus 30. The terminal certificate notifying part 106 transmits a terminal certificate $CERT_{CA/U}$ generated in the terminal certificate generation part 103 to the user authentication apparatus 30 by means of a user authentication protocol by the certificate or an original certificate transmitting protocol.

According to a standard security protocol, such as TLS, upon receiving a certificate request containing a random number R together with a list of identifiers of trusted CAs at the time of user authentication from the user authentication apparatus 30 in response to a service request to the user authentication apparatus 30, the authentication protocol processing part 107 reads a terminal certificate $CERT_{CA/U}$ containing a CA identifier $ID_{CA}$ that matches any one of items in the identifier list of the CA as issuer information, and the corresponding terminal secret key $SK_U$ from the terminal information database 101 via the database reference part 108, makes user signature $SIGR_U=SK_U(DR)$ using the terminal secret key $SK_U$ on data DR containing the random number R (signature calculation), and transmits the user signature $SIGR_U$ to the user authentication apparatus 30 together with the terminal certificate $CERT_{CA/U}$. If necessary, as shown by the dashed line, upon registering the terminal certificate with the user authentication apparatus 30 by means of the user confirmation part 105, predetermined user confirmation processing may be executed with the user authentication apparatus 30.

[CA Information Disclosure Server]

Figure 12:
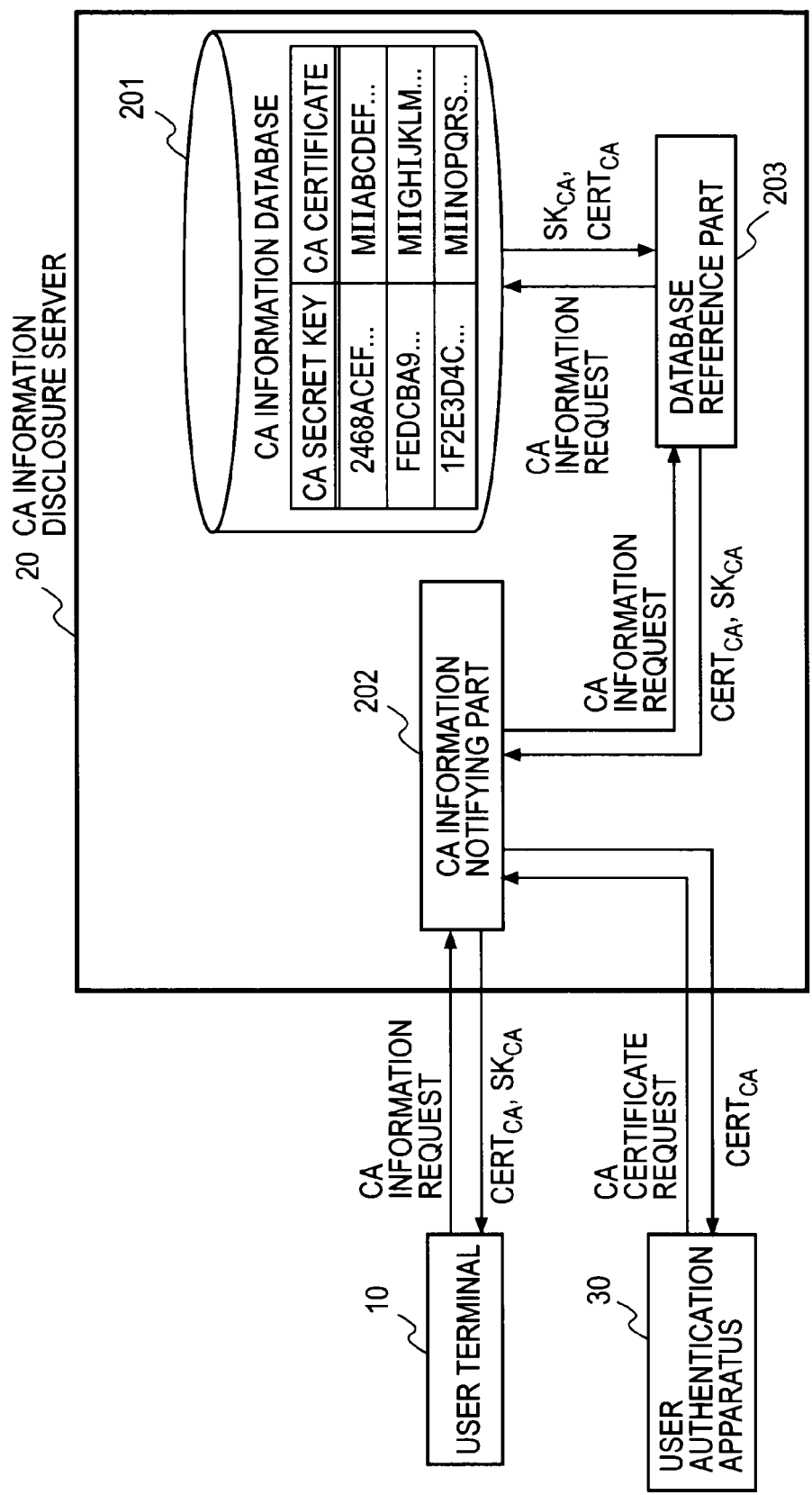
FIG. 12 is a block diagram of a CA information disclosure server in accordance with the second embodiment of the present invention.

As shown in FIG. 12, the CA information disclosure server 20 includes a CA information database 201, a CA information notifying part 202, and a database reference part 203.

As described above, the CA certificate $CERT_{CA}$ contains a CA public key $PK_{CA}$, a CA identifier $ID_{CA}$, and a CA signature $SIG_{CA}$ for information containing them. The CA information database 201 stores the certificate $CERT_{CA}$ of each of the available CAs in association with the CA secret key $SK_{CA}$ which constitutes a pair with the CA public key $PK_{CA}$ contained in the certificate.

Upon receiving a request of the CA certificate specified from the user terminal 10 and the CA secret key (CA information), the CA information notifying part 202 acquires the CA secret key $SK_{CA}$ and the CA certificate $CERT_{CA}$ specified from the CA information database 201 via the database reference part 203, and transmits them to the user terminal 10. Moreover, upon receiving a request of the certificate of the specified CA which the user authentication apparatus trusts from the user authentication apparatus 30, the CA information notifying part 202 acquires the CA certificate specified from the CA information database 201 via the database reference part 203, and transmits it to the user authentication apparatus 30.

As to the method for specifying the required CA information and the method for specifying the required CA certificate in the user authentication apparatus in the user terminal 10, they may be specified by methods, such as a method that use the CA identifier $ID_{CA}$ in the CA certificate or the identifier of the CA secret key $SK_{CA}$, and a method that use search keys stored in the CA information database 201 (for example, a URL of service in cases where the CA certificate is specified for every service, etc.). However, all or a part of CA information may be notified for requests that were not specified by disclosing the CA information freely. Moreover, by means of distributing the CA information, all or a part of the CA information may be notified without a request from the user terminal 10 or the user authentication apparatus 30 in a PUSH type way. Furthermore, a predetermined user authentication may be performed at the time of receiving the request to thereby limit the user who notifies the CA information.

The CA information (CA certificate $CERT_{CA}$ and CA secret key $SK_{CA}$) in the present invention is used in order to make the terminal certificate automatically selectable at the user terminal 10 side by specifying the self-signed certificate (terminal certificate) $CERT_{CA/U}$ of the user terminal 10 from the user authentication apparatus 30 side. The details do not need to be secret to the third parties other than the users (user terminals) or the service providers (user authentication apparatus).

[User Authentication Apparatus]

Figure 13:
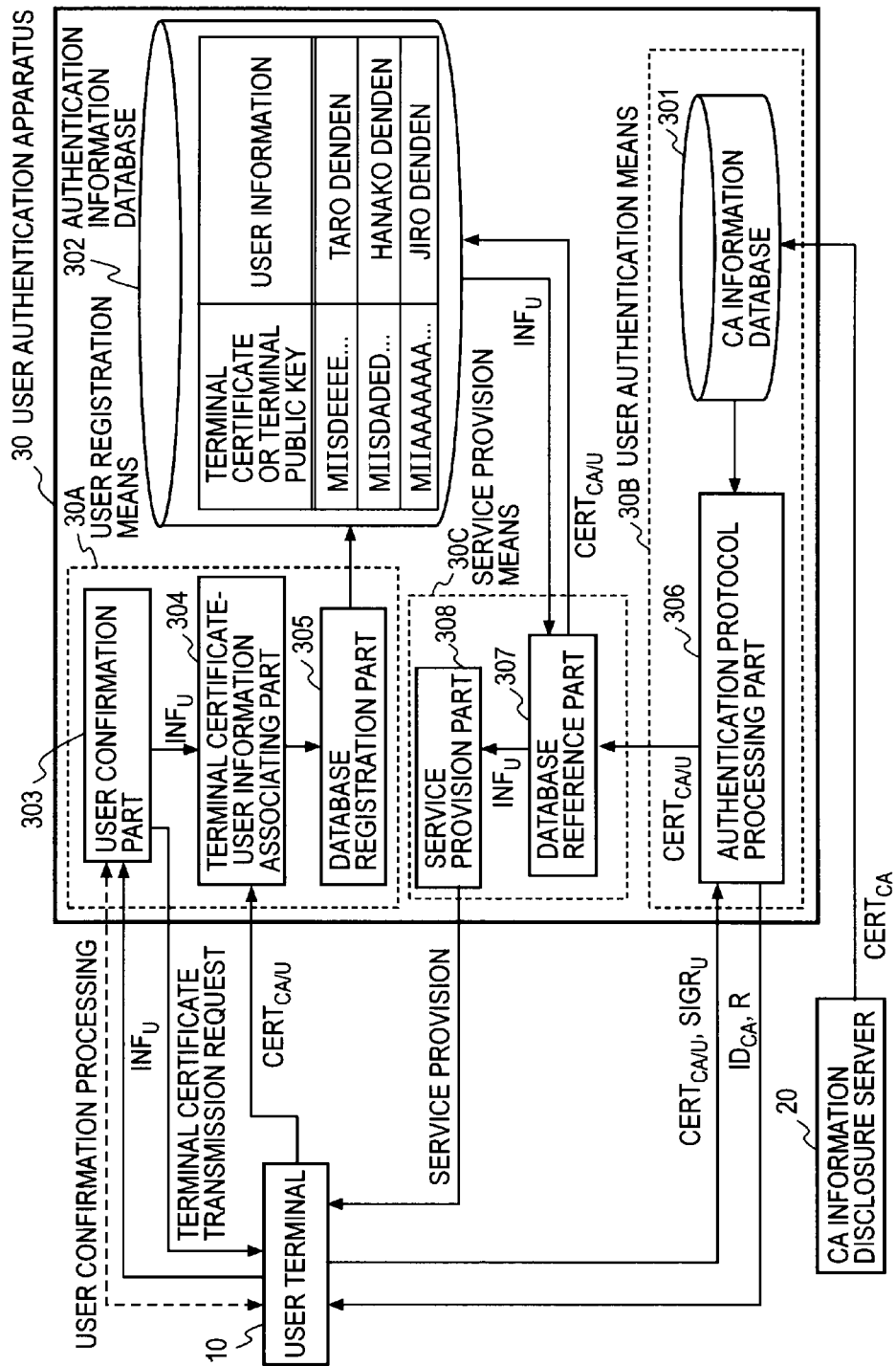
FIG. 13 is a block diagram of a user authentication apparatus in accordance with the second embodiment of the present invention.

As shown in FIG. 13, the user authentication apparatus 30 includes a CA information database 301, an authentication information database 302, a user confirmation part 303, a terminal certificate-user information associating part 304, a database registration part 305, an authentication protocol processing part 306, a database reference part 307, and a service provision part 308. The user confirmation part 303, the terminal certificate-user information associating part 304, and the database registration part 305 configure user registration means 30A. The CA information database 301, and the authentication protocol processing part 306 configure user authentication means 30B. The database reference part 307 and the service provision part 308 configure service provision means 30C.

The CA information database 301 stores the CA certificate $CERT_{CA}$ which the CA information disclosure server 20 discloses (registration to trusted CA list). The authentication information database 302 stores user information $INF_U$ containing data, such as a user identifier $ID_U$, in association with the user terminal certificate $CERT_{CA/U}$ received from the user terminal 10 or at least the terminal public key $PK_U$ contained in the terminal certificate (registration of terminal certificate).

The user confirmation part 303 receives the user information $INF_U$ from the user terminal 10, and provides it to the terminal certificate-user information associating part 304. The terminal certificate-user information associating part 304 receives the terminal certificate $CERT_{CA/U}$ from the user terminal 10, and registers the user information $INF_U$ in the authentication information database 302 via the database registration part 305 in association with the terminal certificate $CERT_{CA/U}$ or at least the terminal public key $PK_U$ contained in the terminal certificate $CERT_{CA/U}$. If necessary, as shown by the dashed line, a predetermined user confirmation processing may be executed with the user terminal 10 by means of the user confirmation part 303 at the time of terminal certificate registration, and the registration may be done after finishing the user confirmation.

At the time of the user authentication in the utilization phase, the authentication protocol processing part 306 reads the identifier list of the trusted CAs from the CA information database 301 in response to the service request from the user terminal 10, according to a standard security protocol, such as TLS, transmits the certificate request containing it and the random number R to the user terminal 10, and in response to the certificate request, executes user authentication processing which verifies the user signature $SIGR_U=SK_U(DR)$ by the user terminal made on the data DR containing the random number R transmitted from the user terminal 10 using the terminal public key $PK_U$ of the user terminal 10 in the terminal certificate $CERT_{CA/U}$ simultaneously transmitted from the user terminal 10, and transmits it to the database reference part 307 if the authenticity of the terminal certificate $CERT_{CA/U}$ is confirmed.

The database reference part 307 searches in the authentication information database 302 using the terminal certificate $CERT_{CA/U}$ which had been confirmed authenticity, or at least the terminal public key $PK_U$ contained in the terminal certificate $CERT_{CA/U}$, received from the authentication protocol processing part 306, and if there is a matched terminal certificate or terminal public key $PK_U$, acquires the user information $INF_U$ corresponding to it (e.g., user identifier $ID_U$), and transmits it to the service provision part 308. The service provision part 308 provides service to the user terminal 10 using the user information $INF_U$ acquired at the database reference part 307.

[Certificate Generation Processing]

Figure 14:
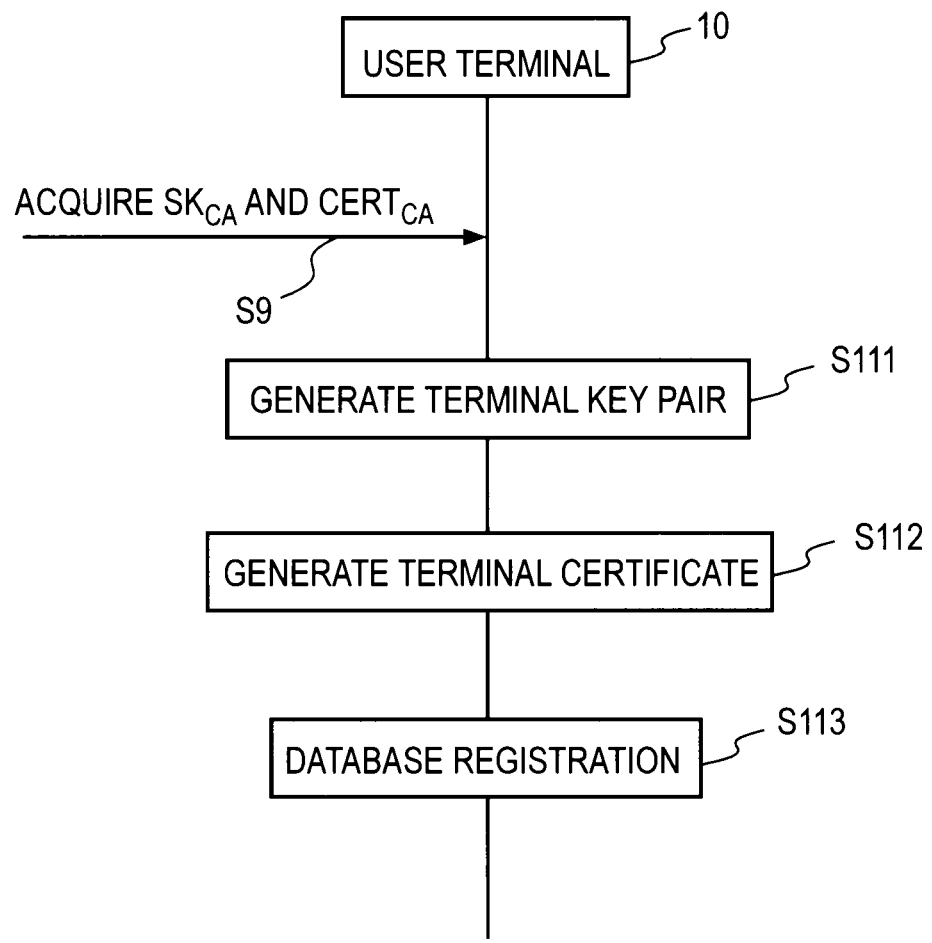
FIG. 14 is a sequence diagram showing a flow of terminal certificate generation processing in a user authentication system in accordance with the second embodiment of the present invention.

FIG. 14 shows a flow of the terminal certificate generation processing by the user terminal 10 in the user authentication system in accordance with the second embodiment of the present invention.

First, the user terminal 10 acquires CA information (CA certificate $CERT_{CA}$ and CA secret key $SK_{CA}$) from the CA information disclosure server 20 by means of the terminal certificate generation part 103 (Step S9). Moreover, a pair consisting of a terminal public key $PK_U$ and a terminal secret key $SK_U$ is generated at the terminal key pair generation part 102 (Step S111). The user terminal 10 generates the terminal signature $SIG_{CA/U}=SK_{CA}(PK_U, INF_U, ID_{CA})$ for the generated terminal public key $PK_U$, information (user information $INF_U$) required for creating the certificate, such as a user identifier $ID_U$ prepared in advance (inputted and stored in a storage device, which is not illustrated, in advance), and the issuer identifier $ID_{CA}$, using the received CA secret key $SK_{CA}$ (signature calculation), generates the terminal certificate $CERT_{CA/U}=\{PK_U, INF_U, SIG_{CA/U}, ID_{CA}\}$ of the same form as the certificate issued by the CA, which contains at least the terminal public key $PK_U$, the user information $INF_U$, the terminal signature $SIG_{CA/U}$, and the CA identifier $ID_{CA}$ contained in the received CA certificate (Step S112), and registers the terminal certificate $CERT_{CA/U}$ in the terminal information database 101 via the database registration part 104 in association with the terminal secret key $SK_U$ which constitutes a pair with the terminal public key $PK_U$ contained in the terminal certificate $CERT_{CA/U}$ (Step S113).

It is noted that the order of the generation step S111 of the key pair by the terminal key pair generation part 102 and the acquisition step S9 of the CA information from the CA information disclosure server 20 may be in reverse order.

[User Registration Processing]

Figure 15:
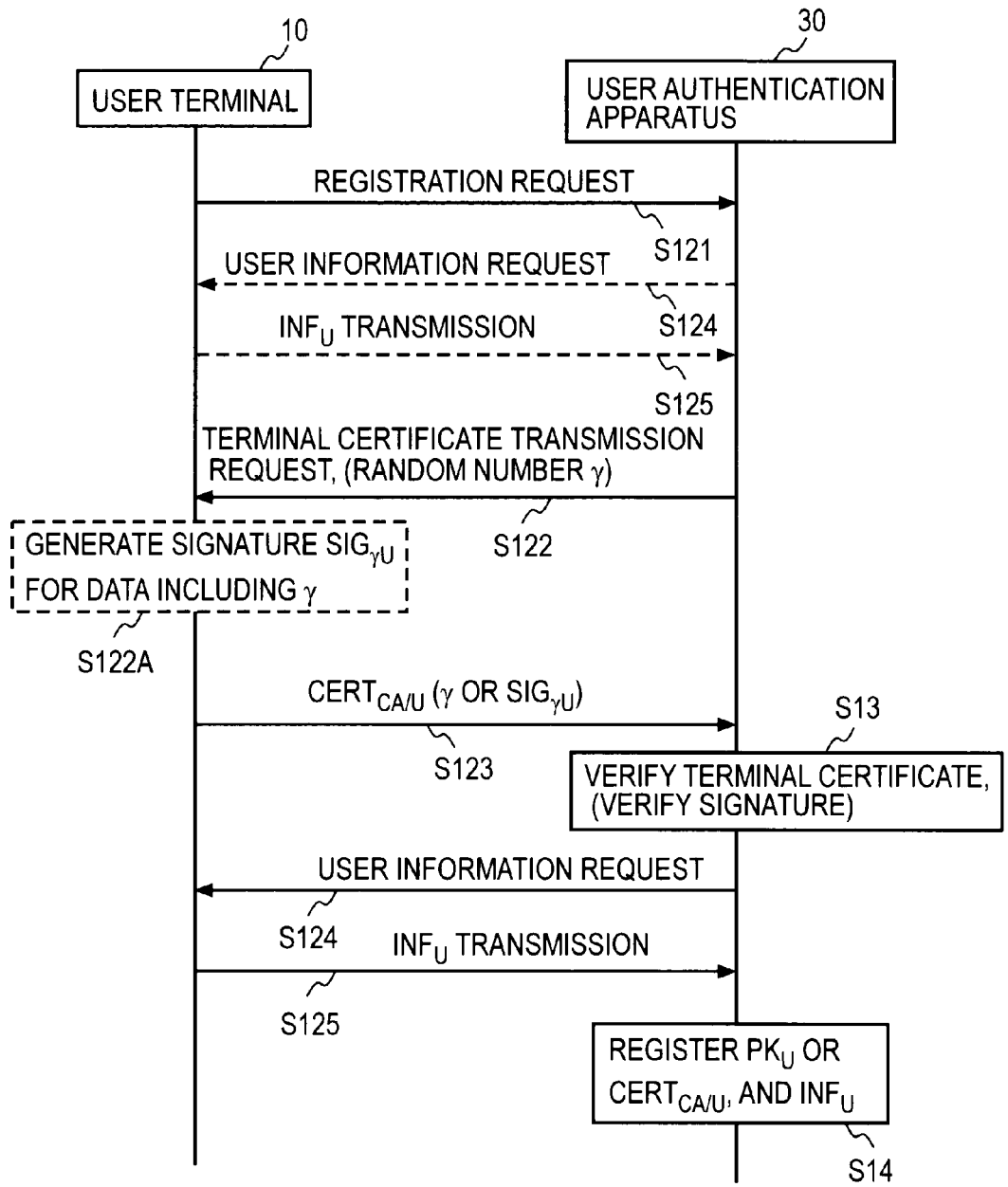
FIG. 15 is a sequence diagram showing a flow of user registration processing in the user authentication system in accordance with the second embodiment of the present invention.

FIG. 15 shows a flow of user registration processing (registration processing of terminal certificate) in the user authentication system in accordance with the second embodiment of the present invention.

First, in response to a user registration request from the user terminal 10 (Step S121), the user authentication apparatus 30 transmits a terminal certificate transmission request to the user terminal 10 (Step S122).

The user terminal 10 which received the terminal certificate transmission request transmits the terminal certificate $CERT_{CA/U}$ generated in the terminal certificate generation part 103 and stored in the terminal information database 101 to the user authentication apparatus 30 by means of the terminal certificate notifying part 106 (Step S123). The user authentication apparatus 30 verifies the received terminal certificate $CERT_{CA/U}$ (Step S13), and if the verification is successful, requests user information to the user terminal 10 (Step S124). The user authentication apparatus 30 receives the user information $INF_U$ from the user terminal 10 (Step S125), and associates the user information $INF_U$, and the received terminal certificate $CERT_{CA/U}$ or the terminal public key $PK_U$ contained in the terminal certificate, and registers it in the authentication information database 302 via the database registration part 305 by means of the terminal certificate-user information associating part 304 (Step S14).

As shown by the dashed line, the request and reception (Step S124, S125) of the user information $INF_U$ may be performed before the terminal certificate transmission request (Step S122). Moreover, the request and reception of the user information INF (Step S124, S125) may be performed before the terminal certificate transmission request (Step S122) and further, the request and reception of additional user information may be performed after the certificate verification (Step S13).

Further, the terminal certificate transmission request (Step S122) may include the user information request (Step S124), and the terminal certificate transmission (Step S123) may include the user information transmission (Step S125). Moreover, the existing user verification procedure based on the request and reception of the user identifier $ID_U$ and the password may be contained in the request and reception of the user information, so that the terminal certificate or the terminal public key, and the user information are registered only when the confirmation of the user has succeeded.

Furthermore, a random number γ may be contained in the terminal certificate transmission request (Step S122). The user terminal 10 transmits the terminal certificate $CERT_{CA/U}$ in Step S123 as well as its random number γ, and the user authentication apparatus 30 verifies the random number γ, and thereby it is possible to confirm that the terminal certificate $CERT_{CA/U}$ has been transmitted from the other side which transmitted the terminal certificate transmission request.

Alternatively, instead of returning the random number γ without modification, the user terminal 10 may generate a user signature $SIGγ_U=SK_U(Dγ)$ for data Dγ containing the random number γ using the terminal secret key $SK_U$ in Step S122A shown with the dashed line, and transmit the user signature $SIGγ_U$ to the user authentication apparatus 30 together with the terminal certificate $CERT_{CA/U}$ in Step S123, and the user authentication apparatus 30 may verify the received user signature $SIGγ_U$ using the terminal public key $PK_U$ contained in the received terminal certificate $CERT_{CA/U}$ in Step S13. Thereby, it is possible to confirm that the user terminal 10 surely retains the terminal secret key $SK_U$ corresponding to the terminal public key $PK_U$.

[User Authentication Processing]

Figure 16:
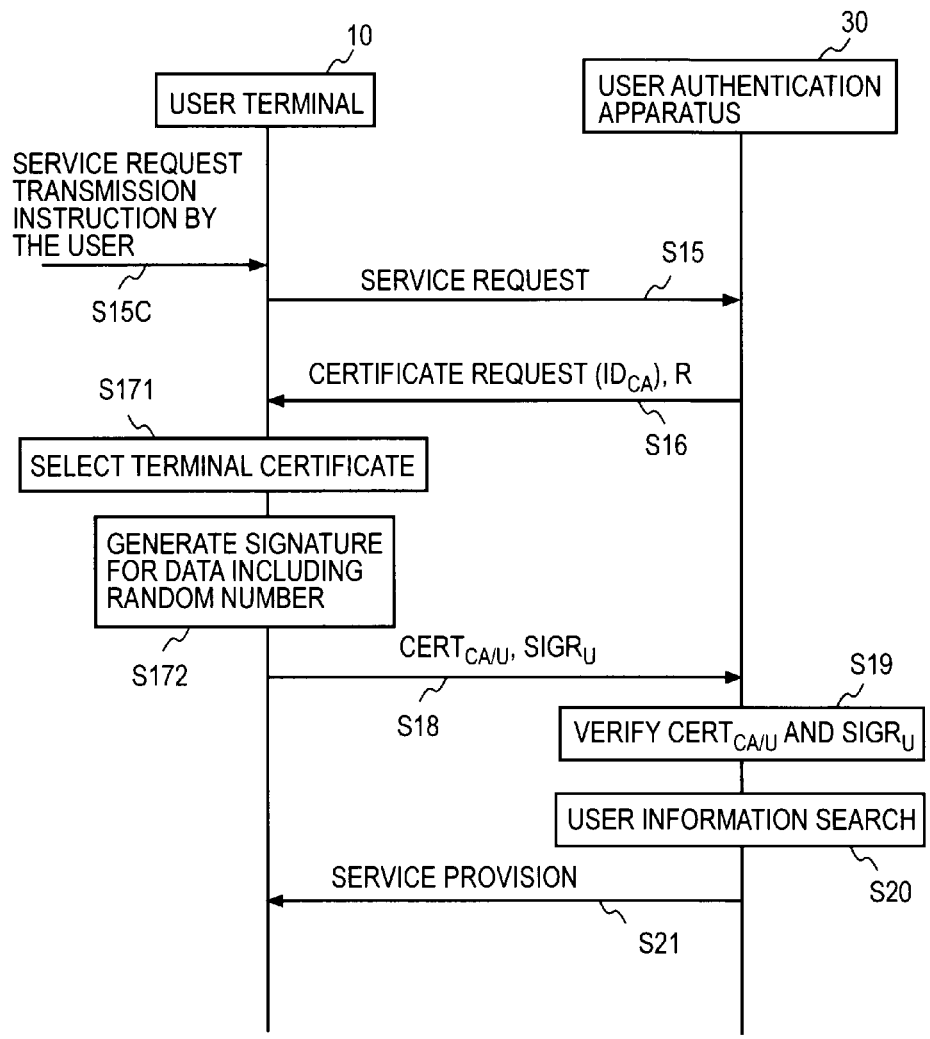
FIG. 16 is a sequence diagram showing a flow of user authentication processing in the user authentication system in accordance with the second embodiment of the present invention.

FIG. 16 shows a flow of user authentication processing in the utilization phase by the user authentication system in accordance with the second embodiment of the present invention. It is assumed that the user authentication apparatus 30 acquires in advance the certificate $CERT_{CA}$ of the CA that the user authentication apparatus trusts, and registers the CA certificate $CERT_{CA}$ or CA identifier $ID_{CA}$ in the CA list that the user authentication apparatus 30 trusts. As to the acquisition method, it may acquire via a CA information disclosure server 20 installed separately. Any other acquisition method may be used.

First, in response to user's instruction (Step S15C), the user terminal 10 transmits a service request to the user authentication apparatus 30 (Step S15). In response to the service request from the user terminal 10, the user authentication apparatus 30 reads the identifier list of the trusted CAs from the CA information database 301 by the authentication protocol processing part 306, and transmits the certificate request containing the identifier list and the random number R generated separately to the user terminal 10 (Step S16).

Upon receiving the certificate request and the random number R, by means of the authentication protocol processing part 107, the user terminal 10 selects from the terminal information database 101 via the database reference part 108 the terminal certificate $CERT_{CA/U}$ which has an issuer identifier (i.e., CA identifier) that matches any one of items in the identifier list of the CA, and the terminal secret key $SK_U$ corresponding to it (Step S171), makes signature on data DR containing the random number R using the terminal secret key $SK_U$ (Step S172), and transmits the user signature $SIGR_U=SK_U(DR)$ to the user authentication apparatus 30 together with the terminal certificate $CERT_{CA/U}$ (Step S18).

By means of the authentication protocol processing part 306, the user authentication apparatus 30 confirms whether the CA identifier $ID_{CA}$ in the terminal certificate $CERT_{CA/U}$ received from the user terminal 10 matches any one of the CA identifiers in the CA list, verifies the terminal certificate by verifying the signature $SIG_{CA/U}$ contained in $CERT_{CA/U}$ using the public key $PK_{CA}$ contained in $CERT_{CA}$, and further verifies the received user signature $SIGR_U=SK_U(DR)$ using the terminal public key $PK_U$ of the user terminal 10 (Step S19), and transmits the terminal certificate to the database reference part 307 if the authenticity is confirmed. If the authenticity could not be confirmed, the user authentication sequence may be stopped, or alternatively, the process may proceed to the user registration sequence described above.

By means of the database reference part 307, the user authentication apparatus 30 searches in the authentication information database 302 using the terminal certificate $CERT_{CA/U}$ received from the authentication protocol processing part 306 or at least the terminal public key $PK_U$ contained in the terminal certificate (Step S20), and if there is a matched terminal certificate or terminal public key, acquires the corresponding user information $INF_U$, and provides it to the service provision part 308.

By means of the service provision part 308, the user authentication apparatus 30 provides service to the user terminal 10 using the user information $INF_U$ received from the database reference part 307 (Step S21).

Figure 17:
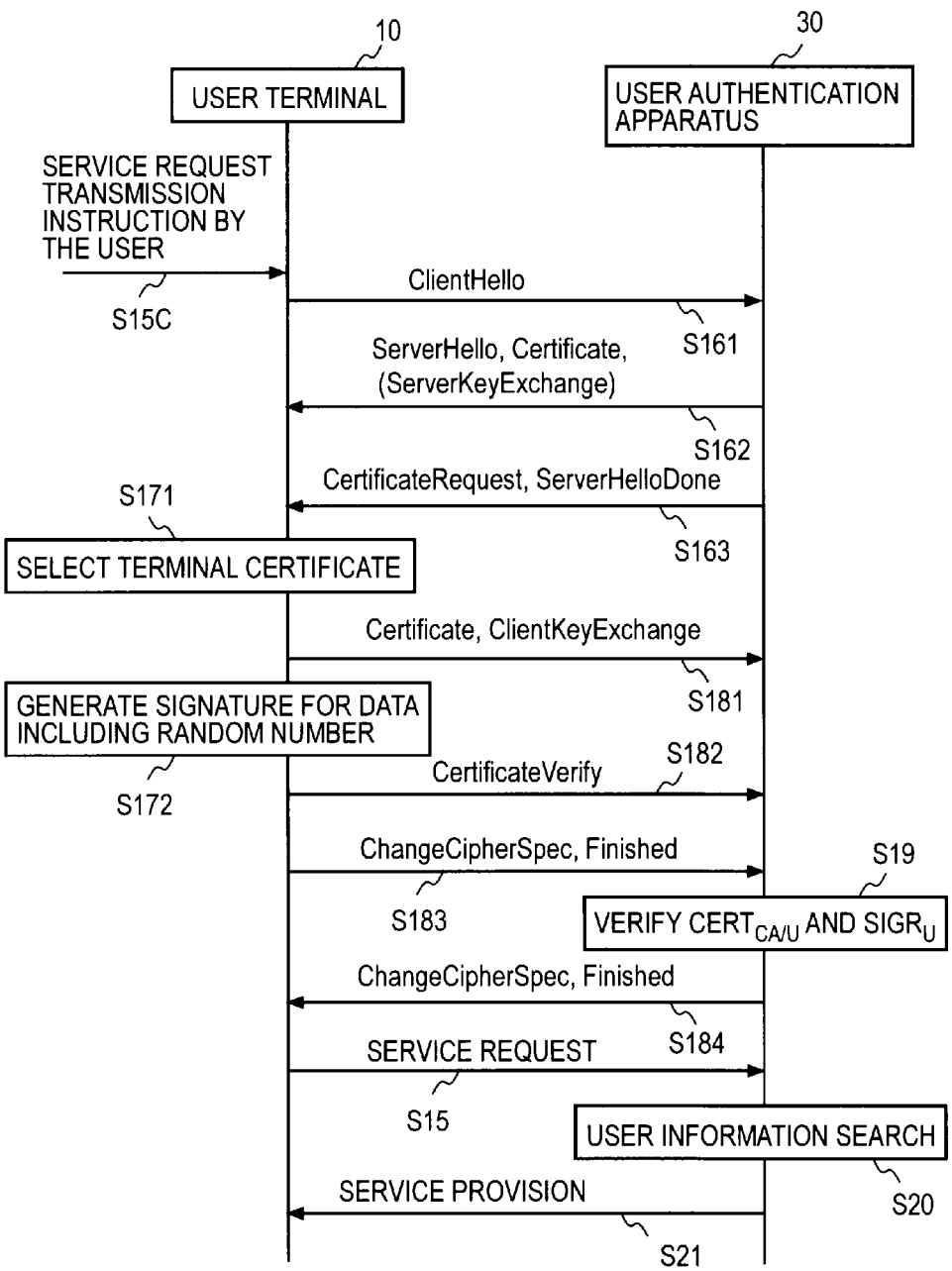
FIG. 17 is a sequence diagram showing a flow of user authentication processing using TLS in the user authentication system in accordance with the second embodiment of the present invention.

The above user authentication processing may be executed using a standard protocol, such as TLS. FIG. 17 shows user authentication processing in a case where TLS is used. In the following, among the sequences of TLS, only the portion relating to the embodiments of the present invention will be described.

If there is an instruction of service request transmission from the user to the user terminal 10 (Step S15C), the user terminal 10 starts the handshake of TLS by transmitting a ClientHello message to the user authentication apparatus 30 (Step S161).

The user authentication apparatus 30 returns a ServerHello message as a reply to ClientHello (Step S162). A random number is contained in the ServerHello message and this corresponds to the above-described random number R. Moreover, a CertificateRequest message containing an identifier list of the trusted CA is transmitted from the user authentication apparatus 30 (Step S163). This corresponds to the above-described certificate request. The user terminal 10 that received CertificateRequest and ServerHelloDone selects the terminal certificate with reference to the identifier list of CAs contained in the CertificateRequest (Step S171), and transmits the terminal certificate to the user authentication apparatus 30 as Certificate message (Step S181). Moreover, the user terminal 10 calculates the user signature for all the handshake messages from ClientHello to ClientKeyExchange using the terminal secret key $SK_U$ (Step S172), and transmits the user signature to the user authentication apparatus 30 as CertificateVerify message (Step S182). This corresponds to the user signature made on the data containing the random number.

The user authentication apparatus 30 verifies the received terminal certificate and user signature (Step S19), and if the authenticity is confirmed, transmits messages, ChangeCipherSpec and Finished, to the user terminal 10 (Step S184). After receiving the message of ChangeCipherSpec and Finished, the user terminal 10 transmits a service request to the user authentication apparatus 30 (Step S15). The user authentication apparatus 30 searches for the user information in the database in response to the service request (Step S20), and provides service to the user terminal 10 (Step S21).

The terminal certificate selection (Step S171) and the signature generation (Step S172) in the user terminal 10 are automatically performed by, for example, a browser which supports TLS. Moreover, the verification (Step S19) of the terminal certificate and the user signature in the user authentication apparatus 30 is automatically performed by, for example, a server which supports TLS.

In the present embodiment, the CA information disclosure server 20 and the user authentication apparatus 30 may be unified as one apparatus.

<Third Embodiment>

Figure 18:
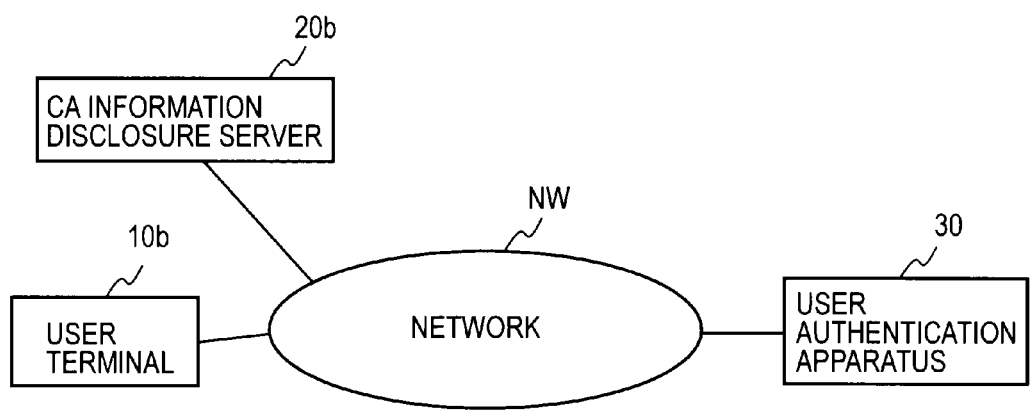
FIG. 18 is a block diagram briefly showing a user authentication system in accordance with a third embodiment of the present invention.

FIG. 18 shows a user authentication system in accordance with the third embodiment of the present invention, which shows a schematic view of the system which embeds CA information in the user terminal in advance. In the figure, same symbols are used for the same elements with the second embodiment. 10b is a user terminal, 20b is a CA information disclosure server, 30 is a user authentication apparatus, and NW is a network.

[User Terminal]

Figure 19:
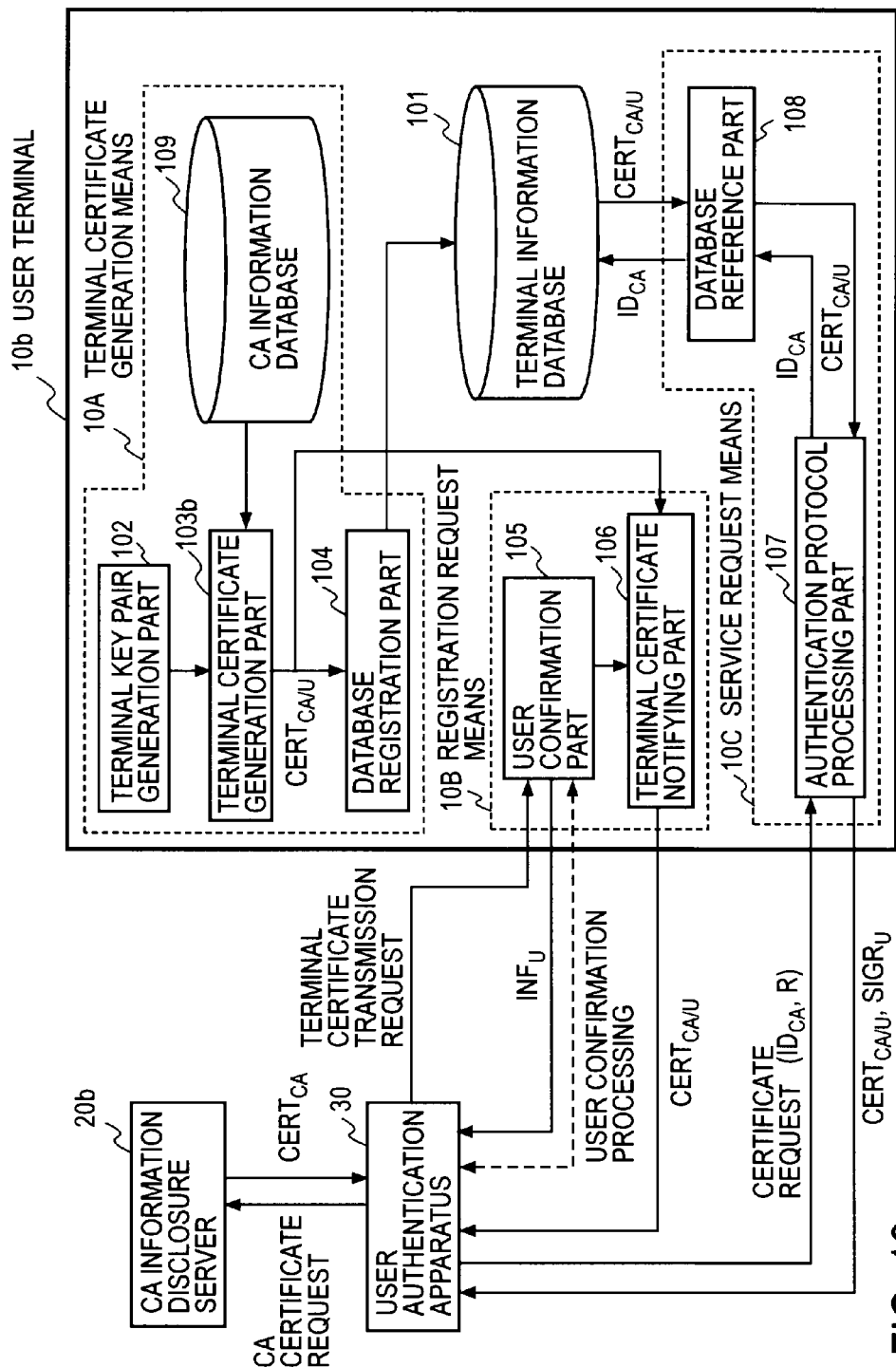
FIG. 19 is a block diagram of a user terminal in accordance with the third embodiment of the present invention.

As shown in FIG. 19, the user terminal 10b includes a terminal information database 101, a terminal key pair generation part 102, a database registration part 104, a user confirmation part 105, a terminal certificate notifying part 106, an authentication protocol processing part 107, a database reference part 108, a CA information database 109, and a terminal certificate generation part 103b. The terminal key pair generation part 102, the terminal certificate generation part 103b, the database registration part 104, and the CA information database 109 configure terminal certificate generation means 10A. The user confirmation part 105 and the terminal certificate notifying part 106 configure registration request means 10B. The authentication protocol processing part 107 and the database reference part 108 configure service request means 10C.

The CA information database 109 is a database (storage unit) which is pre-embedded by a vendor of the base software or the hardware of the user terminal 10b, and stores the CA certificate $CERT_{CA}$ containing at least the CA information which the vendor discloses, that is, a CA public key $PK_{CA}$, a CA signature $SIG_{CA}$, and an identifier $ID_{CA}$ of the higher rank CA or own CA, in association with the CA secret key $SK_{CA}$ which constitutes a pair with the CA public key $PK_{CA}$ contained in the CA certificate. The CA signature $SIG_{CA}$ is generated for the information containing the CA public key $PK_{CA}$ and the CA identifier $ID_{CA}$ by using the secret key $SK_{CA2}$ of a higher rank CA, which is the issuer of CA certificate $CERT_{CA}$, or the secret key $SK_{CA}$ of own CA.

The terminal certificate generation part 103b requests CA information to the CA information database 109 and receives the CA secret key $SK_{CA}$ and the CA certificate $CERT_{CA}$ from the CA information database 109, and at the same time, generates a terminal signature $SIG_{CA/u} = SK_{CA}(PK_U, INF_U, ID_{CA})$ (signature calculation) using the received CA secret key $SK_{CA}$ for the public key $PK_U$ generated in the terminal key pair generation part 102, information (user information $INF_U$) required for creating the certificate, such as a user identifier $ID_U$, which were prepared in advance (inputted and stored in a storage device, which is not illustrated, in advance), and the issuer identifier $ID_{CA}$, generates a terminal certificate $CERT_{CA/U}$ of the same form as the certificate issued from a CA, which contains at least the public key $PK_U$, the user information $INF_U$, the terminal signature $SIG_{CA/U}$, and the CA identifier $ID_{CA}$ (i.e., issuer identifier) contained in the received CA certificate $CERT_{CA}$, and registers the terminal certificate $CERT_{CA/U}$ in the terminal information database 101 via the database registration part 104 in association with the terminal secret key $SK_U$ which constitutes a pair with the terminal public key $PK_U$ contained in the terminal certificate.

[CA Information Disclosure Server]

Figure 20:
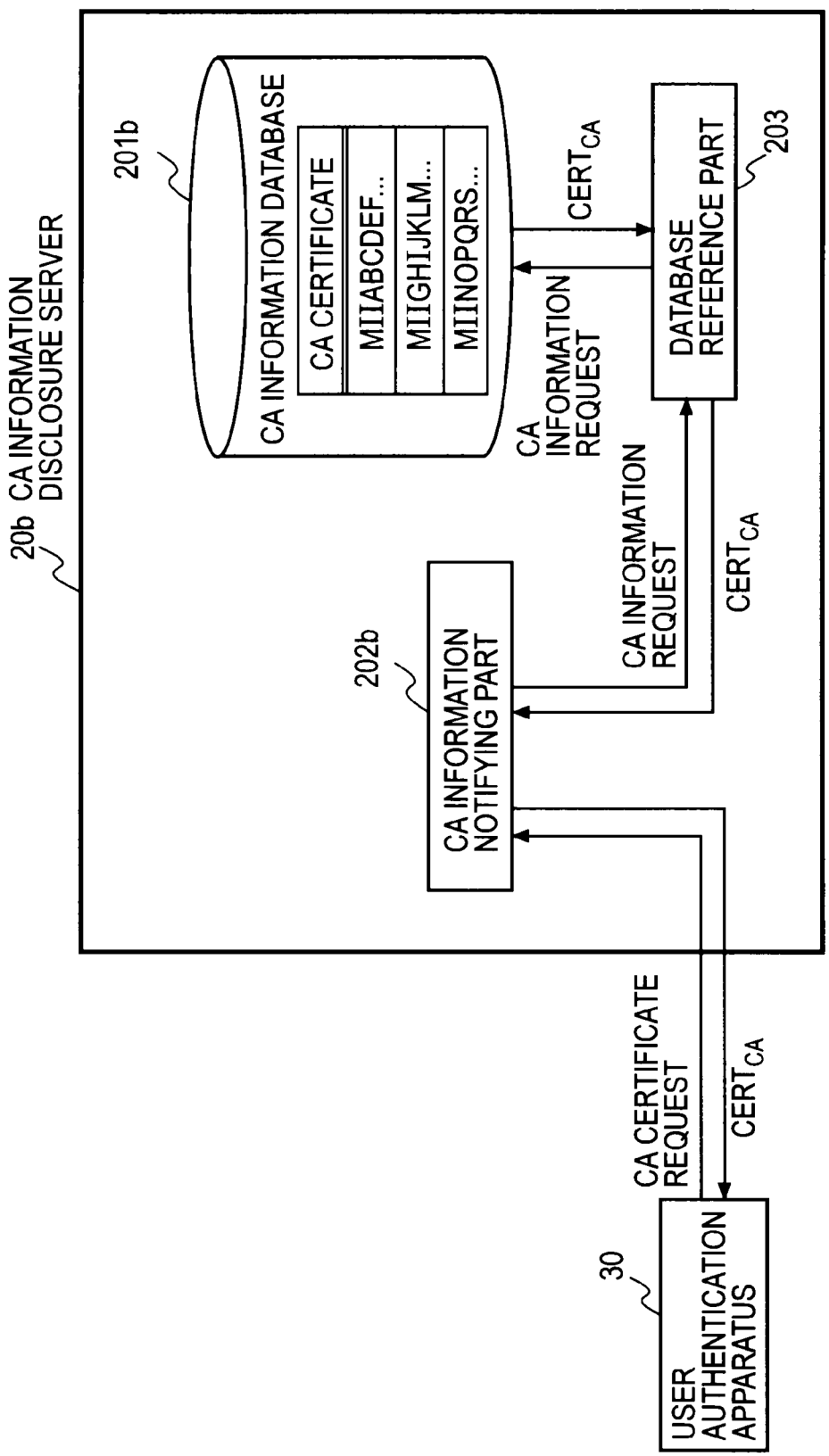
FIG. 20 is a block diagram of a CA information disclosure server in accordance with the third embodiment of the present invention.

As shown in FIG. 20, the CA information disclosure server 20b includes a database reference part 203, a CA information database 201b, and a CA information notifying part 202b.

The CA information database 201b stores CA information which the vendor of the base software or the hardware of the user terminal 10b discloses, that is, a CA certificate $CERT_{CA}$ containing at least the CA public key $PK_{CA}$, the CA signature $SIG_{CA}$, and the identifier $ID_{CA}$ of higher rank CA or own CA which made the signature.

Upon receiving the CA certificate request from the user authentication apparatus 30, the CA information notifying part 202b acquires the CA certificate $CERT_{CA}$ from the CA information database 201b via the database reference part 203, and transmits it to the user authentication apparatus 30.

With regards to the method for specifying the CA information to be requested in the user terminal 10b or the CA certificate to be requested in the user authentication apparatus 30, same method as in the case with the second embodiment can be used.

[Certificate Generation Processing]

Figure 21:
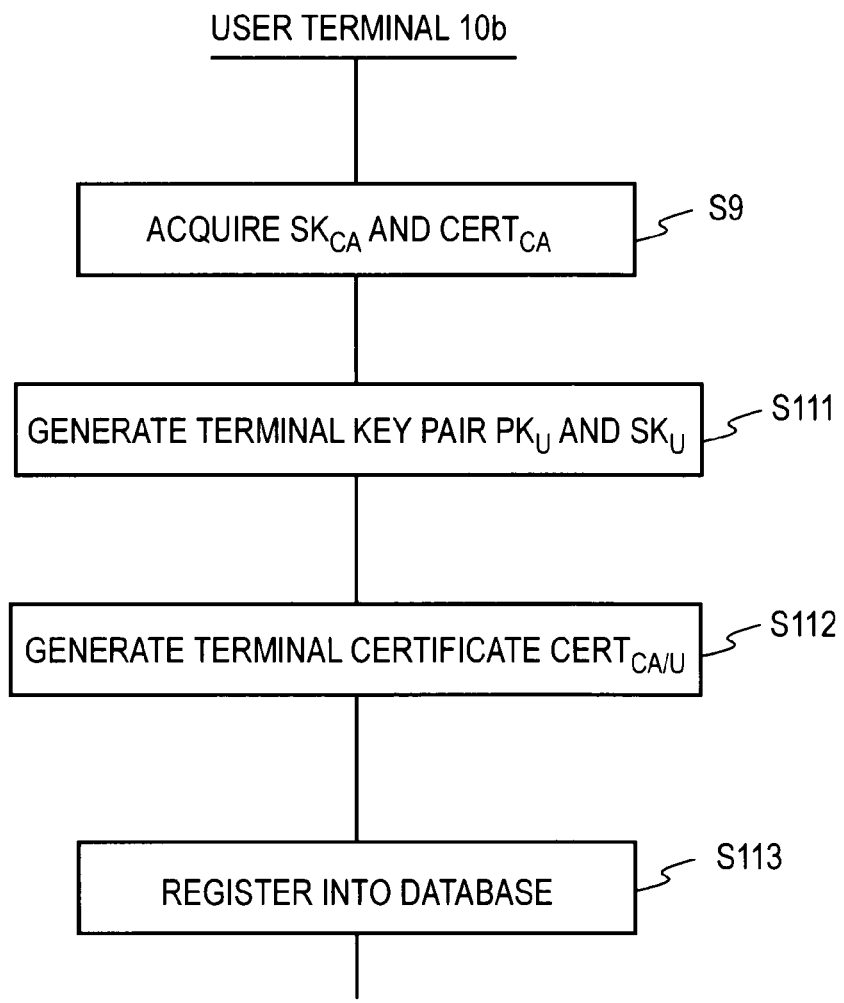
FIG. 21 is a sequence diagram showing a flow of terminal certificate generation processing in a user authentication system in accordance with the third embodiment of the present invention.

FIG. 21 shows a flow of terminal certificate generation processing in the user terminal 10b of the user authentication system in accordance with the third embodiment of the present invention.

The terminal certificate generation part 103b acquires the specified CA information (CA certificate $CERT_{CA}$ and CA secret key $SK_{CA}$) from the CA information database 109 (Step S9), and by means of the terminal key pair generation part 102, generates a key pair consisting of a terminal public key $PK_U$ and a terminal secret key $SK_U$ (Step S111), and stores it in a storage device, which is not illustrated.

A terminal signature $SIG_{CA/U} = SK_{CA}(PK_U, INF_U, ID_{CA})$ is generated using the received CA secret key $SK_{CA}$ for the public key $PK_U$ generated at the terminal key pair generation part 102, information (user information $INF_U$) required for creating a certificate, such as the user identifier $ID_U$ prepared in advance (inputted and stored in a storage device, which is not illustrated, in advance), and the issuer identifier $ID_{CA}$ (signature calculation), and generates a terminal certificate $CERT_{CA/U}$ of the same form as the certificate issued from the CA containing at least the terminal public key $PK_U$, the user information $INF_U$, the terminal signature $SIG_{CA/U}$, and the CA identifier $ID_{CA}$ contained in the received CA certificate (Step S112). This terminal certificate $CERT_{CA/U}$ is registered in the terminal information database 101 via the database registration part 104 in association with the terminal secret key $SK_U$ which constitutes a pair with the terminal public key $PK_U$ contained in the terminal certificate (Step S113).

The order of the generation of the key pair by the terminal key pair generation part 102 (Step S111), and the acquisition of CA information from the CA information database 109 (Step S9) may be in reverse order.

Moreover, as to configurations and flows other than the above, the configuration of the user terminal 10b, the CA information disclosure server 20b, and the user authentication apparatus 30, and the flow of [user registration processing] and [user authentication processing] are the same as in the case with the second embodiment.

Moreover, in the present embodiment, it is also possible to integrate the CA information disclosure server 20b and the user authentication apparatus 30 into one apparatus.

<Fourth Embodiment>

Figure 22:
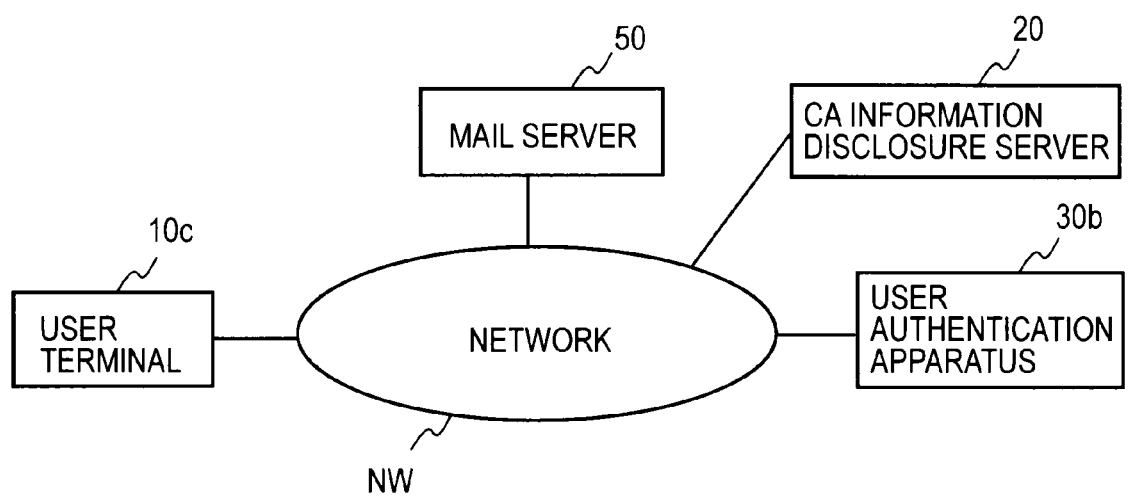
FIG. 22 is a block diagram briefly showing a user authentication system in accordance with a fourth embodiment of the present invention.

FIG. 22 shows a user authentication system in accordance with the fourth embodiment of the present invention. Shown here is a schematic view of a system which performs user confirmation based on user's e-mail address using a communications service provision server, which is a third party organization that can communicate with the user terminal and the user authentication apparatus via a network. In the figure, same symbols are used for the same elements as the second embodiment. 10c is a user terminal, 20 is a CA information disclosure server, 30b is a user authentication apparatus, NW is a network, and 50 is a mail server (communications service provision server) which authenticates destination users and distributes e-mails.

In the second and third embodiment, information containing the user identifier $ID_U$ is used as the user information $INF_U$. However, in the fourth embodiment, information containing user e-mail address $MAD_U$ is used as the user information $INF_U$.

[User Terminal]

Figure 23:
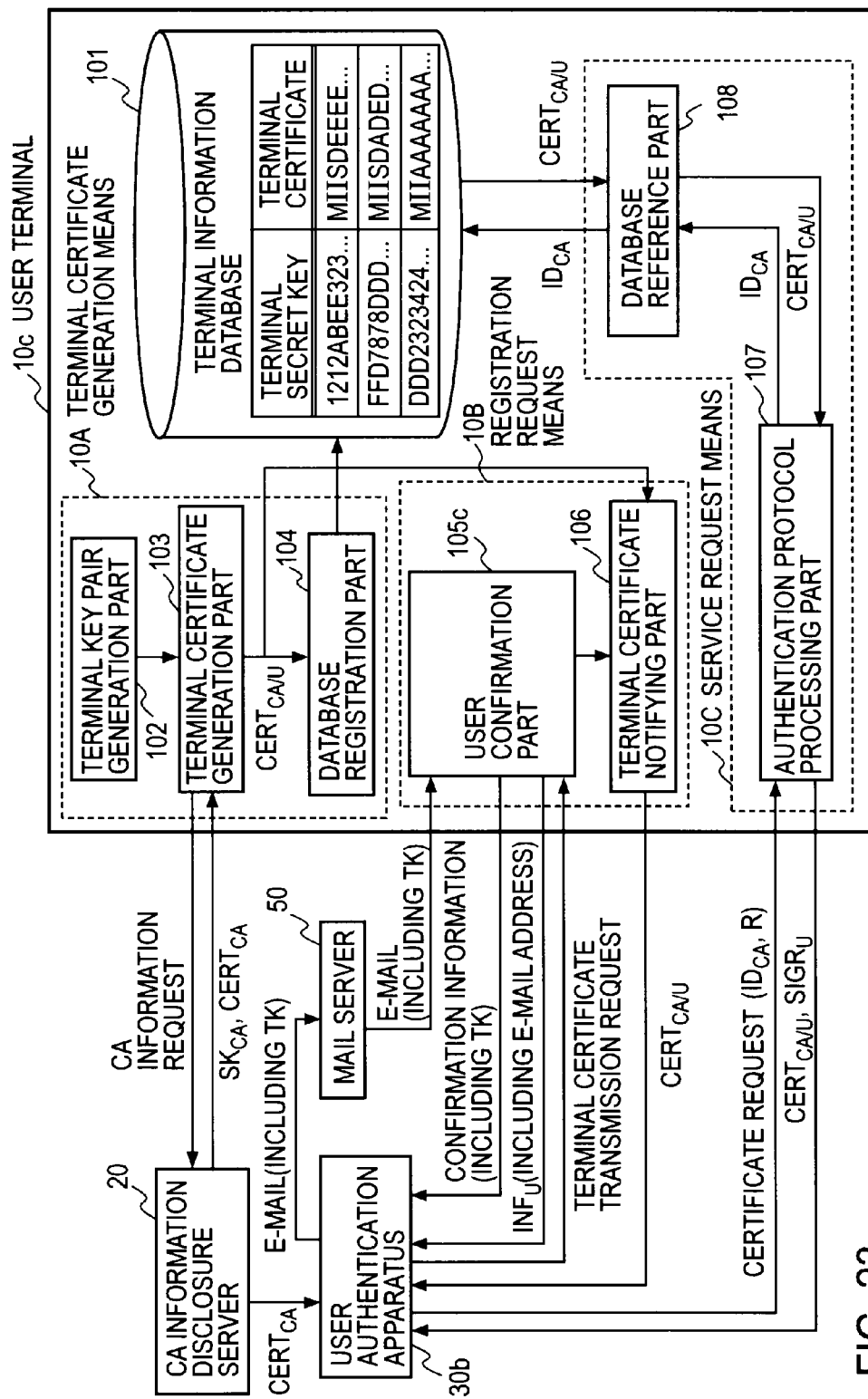
FIG. 23 is a block diagram of a user terminal in accordance with the fourth embodiment of the present invention.

As shown in FIG. 23, the user terminal 10c includes a terminal information database 101, a terminal key pair generation part 102, a terminal certificate generation part 103, a database registration part 104, a terminal certificate notifying part 106, an authentication protocol processing part 107, a database reference part 108, and a user confirmation part 105c. The terminal key pair generation part 102, the terminal certificate generation part 103, and the database registration part 104 configure terminal certificate generation means 10A. The user confirmation part 105c and the terminal certificate notifying part 106 configure registration request means 10B. The authentication protocol processing part 107 and the database reference part 108 configure service request means 10C.

At the time of the user registration, the user confirmation part 105c uses the mail server 50 to execute user confirmation processing with the user authentication apparatus 30b based on the user e-mail address $MAD_U$. Specifically, the user confirmation part 105c adds the e-mail address $MAD_U$ to the user information $INF_U$ and transmit them to the user authentication apparatus 30b, and for example, upon receiving from the user authentication apparatus 30b an e-mail that contains a temporary key (random number) as the secret information TK via the mail server 50, transmits confirmation information containing the secret information TK to the user authentication apparatus 30b.

[User Authentication Apparatus]

Figure 24:
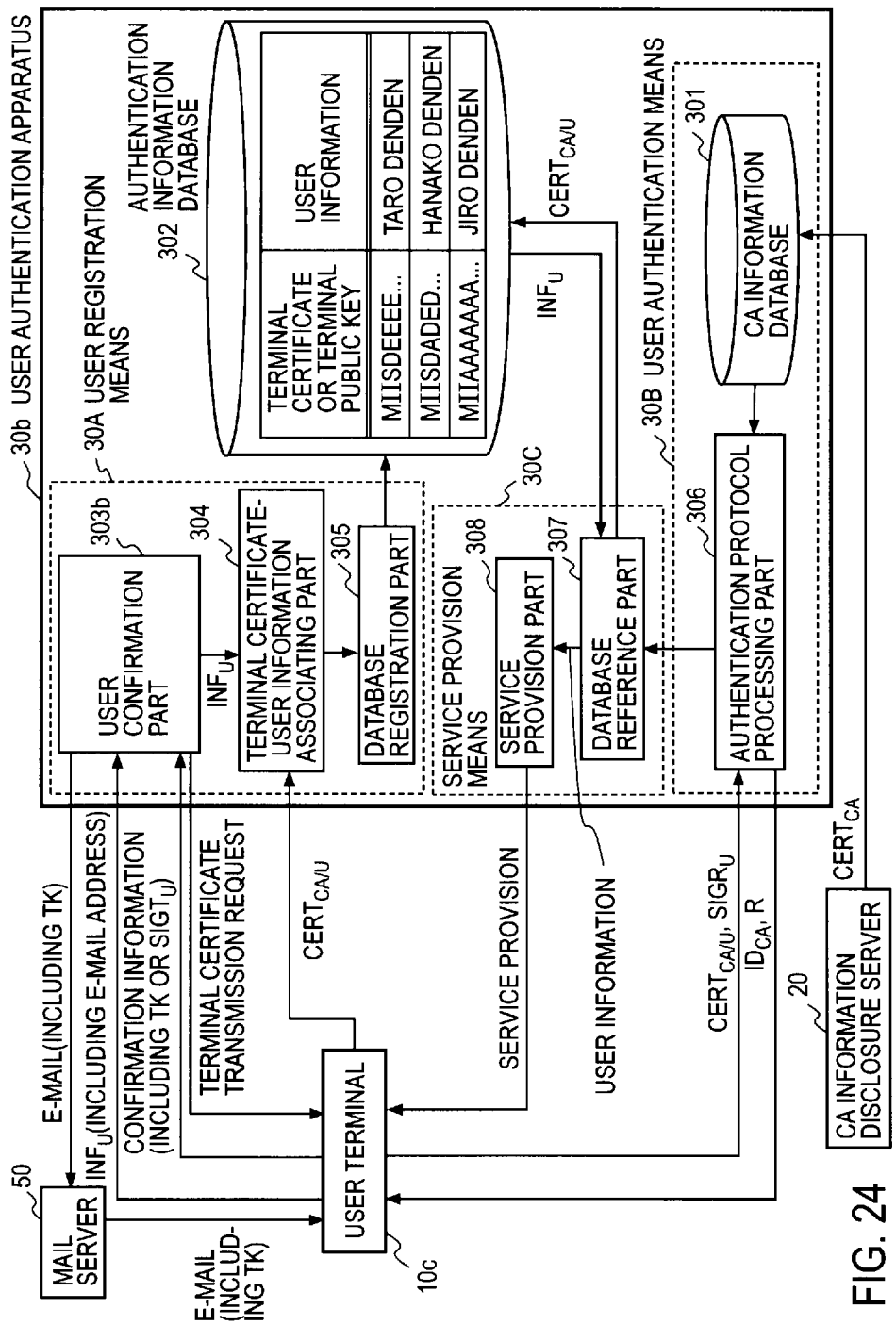
FIG. 24 is a block diagram of a user authentication apparatus in accordance with the fourth embodiment of the present invention.

As shown in FIG. 24, the user authentication apparatus 30b includes a CA information database 301, an authentication information database 302, a terminal certificate-user information associating part 304, a database registration part 305, an authentication protocol processing part 306, a database reference part 307, a service provision part 308, and a user confirmation part 303b. The user confirmation part 303b, the terminal certificate-user information associating part 304, and the database registration part 305 configure user registration means 30A. The CA information database 301 and the authentication protocol processing part 306 configure user authentication means 30B. The database reference part 307 and the service provision part 308 configure service provision means 30C.

At the time of the user authentication in the user registration phase, the user confirmation part 303b uses the mail server 50 to execute user confirmation processing with the user terminal 10c based on the user e-mail address $MAD_U$. Specifically, upon receiving user information $INF_U$ that contains e-mail address $MAD_U$ from the user terminal 10c, the user confirmation part 303b stores it and generates secret information TK, transmits an e-mail containing the secret information TK to the e-mail address $MAD_U$ via the mail server 50, further receives confirmation information containing the secret information TK from the user terminal 10c, and compares the secret information TK contained in the confirmation information with the generated secret information TK, to thereby confirm that the destination of the e-mail address $MAD_U$ is the correct user terminal 10c.

[User Registration Processing]

Figure 25:
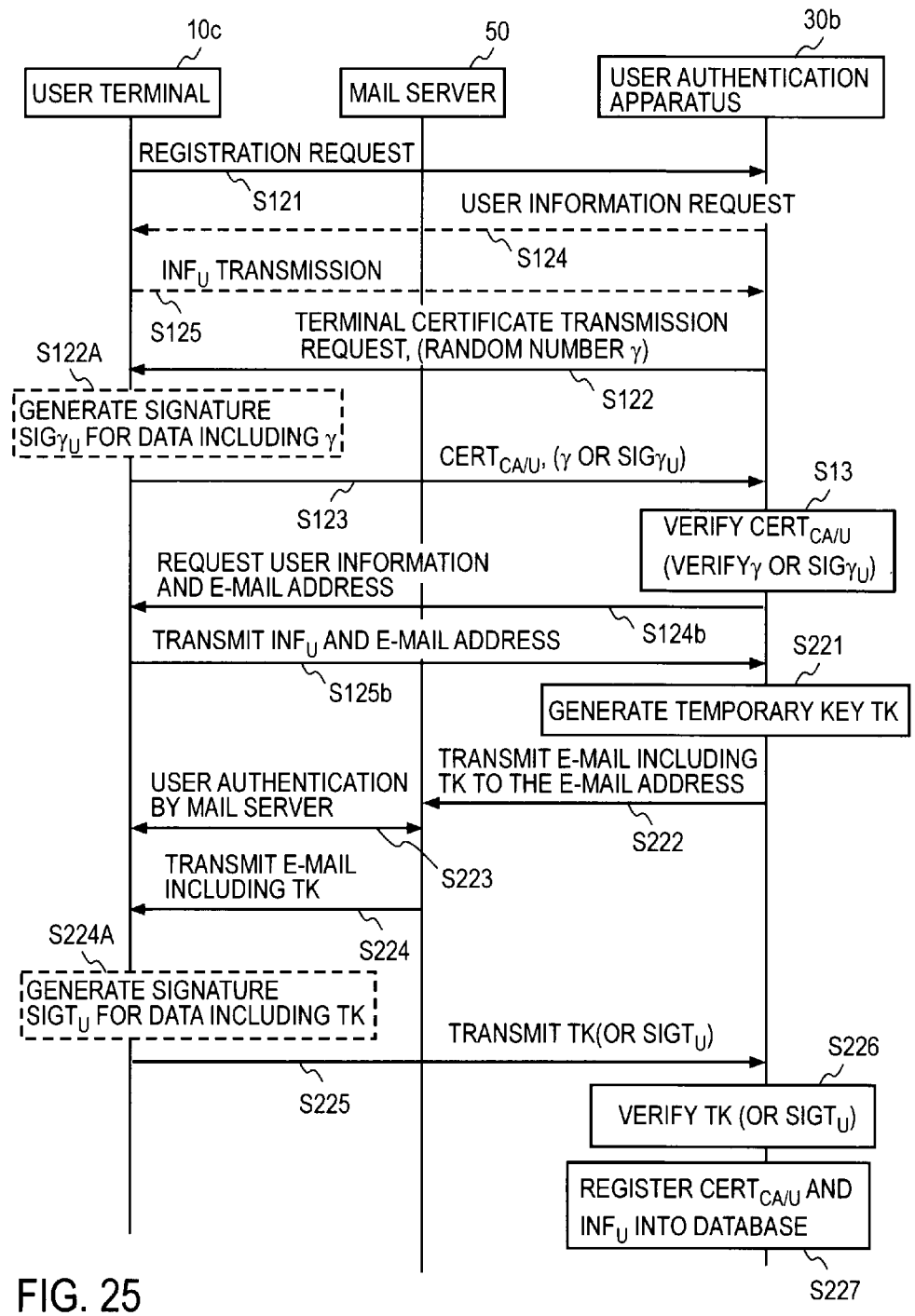
FIG. 25 is a sequence diagram showing a flow of user registration processing in a user authentication system in accordance with the fourth embodiment of the present invention.

FIG. 25 shows a flow of user registration processing in the user authentication system in accordance with the fourth embodiment of the present invention.

First, in accordance with the sequence from Step S121, which is similar with the user registration processing in the second embodiment, to Step S13 (FIG. 15), the terminal certificate $CERT_{CA/U}$ generated at the terminal certificate generation part 103 of the user terminal 10c is transmitted to the user authentication apparatus 30b, and the user authentication apparatus 30b verifies the received terminal certificate $CERT_{CA/U}$. The terminal certificate $CERT_{CA/U}$ which finished the verification is stored in a temporary storage device (not illustrated) of the user authentication apparatus 30b. Then, the user confirmation part 303b of the user authentication apparatus 30b requests user information $INF_U$ containing the user identifier $ID_U$, and the e-mail address to the user terminal 10c (Step S124b).

The user confirmation part 105c of the user terminal 10c, which received the request, transmits the user information $INF_U$ and the e-mail address $MAD_U$ to the user authentication apparatus 30b (Step S125b). At the user authentication apparatus 30b, upon receiving the user information $INF_U$ and the e-mail address $MAD_U$, they are stored in a temporary storage device (not illustrated) by means of the user confirmation part 303b, the temporary key (secret information) TK is generated (Step S221), and an e-mail containing it is transmitted to the e-mail address $MAD_U$ (Step S222).

The e-mail containing the temporary key TK is received at the mail server 50, and user authentication is performed between the mail server 50 and the user terminal 10c (Step S223). Examples of the technique of user authentication in the mail server 50 include a protocol, such as Post Office Protocol Version 3 (POP3) described in RFC1939. If the user authentication in the mail server 50 is successful, an e-mail containing the temporary key TK is transmitted to the user terminal 10c (Step S224).

Then, upon receiving the e-mail containing the temporary key TK, by means of the user confirmation part 105c, the user terminal 10c transmits confirmation information containing the temporary key TK to the user authentication apparatus 30b (Step S225).

At the user authentication apparatus 30b, by means of the user confirmation part 303b, confirmation information containing the temporary key TK is received and verified (Step S226), and if the verification is successful, by means of the terminal certificate-user information associating part 304, it is associated with the stored terminal certificate $CERT_{CA/U}$ or at least the terminal public key $PK_U$ contained in the terminal certificate $CERT_{CA/U}$, and the stored user information $INF_U$ is registered in the authentication information database 302 via the database registration part 305 (Step S227). In addition to the user information $INF_U$, the stored e-mail address $MAD_U$ may be stored in the authentication information database 302, to utilize at the time of later service provision.

Moreover, after the user terminal 10c receives an e-mail containing the temporary key TK in Step S224, the user signature $SIGT_U=SK_U(DT)$ for data DT containing the temporary key TK may be generated using the terminal secret key $SK_U$ (Step S224A), the user signature $SIGT_U$ may be transmitted instead of the temporary key TK in Step S225, and the user signature $SIGT_U$ may be verified using the terminal public key $PK_U$ contained in terminal certificate $CERT_{CA/E}$ instead of verifying the temporary key TK in Step S226.

The user confirmation using the mail server may be performed earlier, and the terminal certificate may be transmitted to user authentication apparatus thereafter. That is, the process from the user information and e-mail address request (Step S124b) to Step S226 may be performed after the registration request (Step S121), and the process from the terminal certificate transmission request (Step S122) to Step S13 and Step S227 may be performed thereafter. In this case, if user confirmation using the user signature $SIGT_U$ is performed, that is, if Step S224A is executed, the user authentication apparatus 30b has not yet acquired the terminal public key $PK_U$ required for the verification of the user signature $SIGT_U$ in Step S226, and therefore, it is necessary to transmit the terminal public key $PK_U$ together with the user signature $SIGT_U$, or to postpone the verification and perform the request of the terminal certificate earlier, that is, to perform the process from Step S122 to Step S13, and perform Steps S226 and S227 thereafter.

Moreover, as to configurations and flows other than the above, the configuration of the user terminal 10c, the CA information disclosure server 20, and the user authentication apparatus 30b and the flow of [certificate generation processing] and [user authentication processing] are the same as in the case with the second embodiment.

Moreover, in the present embodiment, it is also possible to integrate the CA information disclosure server 20 and the user authentication apparatus 30b into one apparatus.

Furthermore, in the present embodiment, as in the third embodiment, the CA information database 109 may be located in the user terminal 10c, and the terminal certificate generation part 103 may generate the terminal certificate $CERT_{CA/U}$, without acquiring CA information from the CA information disclosure server 20.

<Fifth Embodiment>

Figure 26:
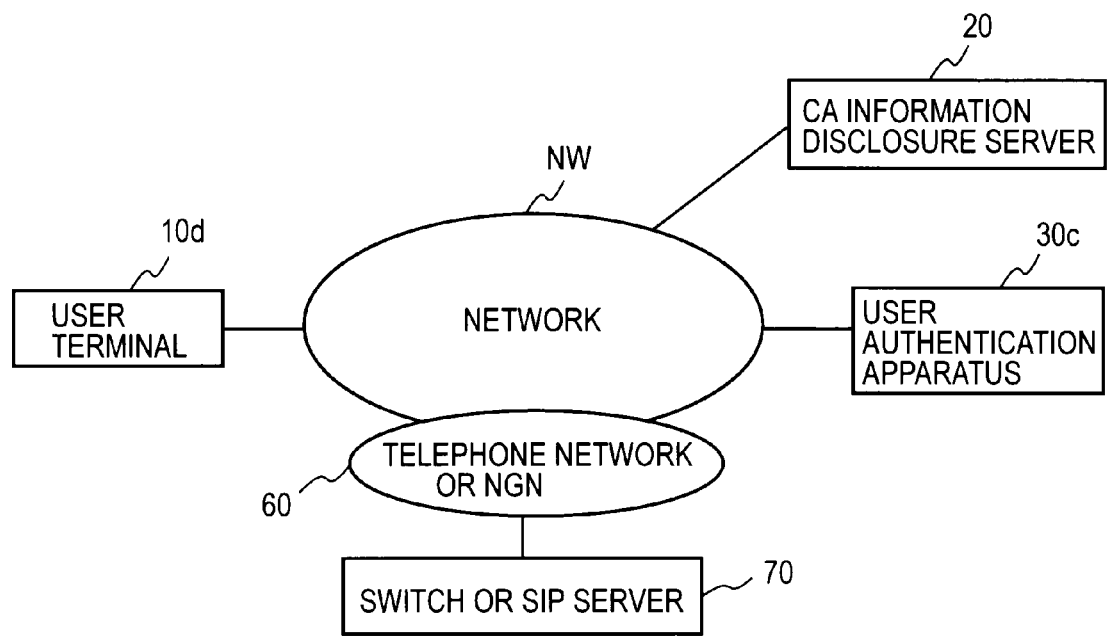
FIG. 26 is a block diagram briefly showing a user authentication system in accordance with a fifth embodiment of the present invention.

User confirmation is performed in the fourth embodiment using an electronic mail. However, user confirmation is performed using user's telephone number in the fifth embodiment. FIG. 26 shows a user authentication system in accordance with the fifth embodiment of the present invention. Shown here is a schematic view of a system which performs user confirmation using a third party organization, especially, a system which performs user confirmation based on user's telephone number. In the figure, same symbols are used for the same elements with the second embodiment. 10d is a user terminal, 20 is a CA information disclosure server, 30c is a user authentication apparatus, NW is a network, 60 is a telephone network or NGN (Next Generation Network), and 70 is a switch or an SIP server (Session Initiation Protocol Server) (hereafter referred to as a "SIP server"), which functions as a communications service provision server, which is a third party organization.

[User Terminal]

Figure 27:
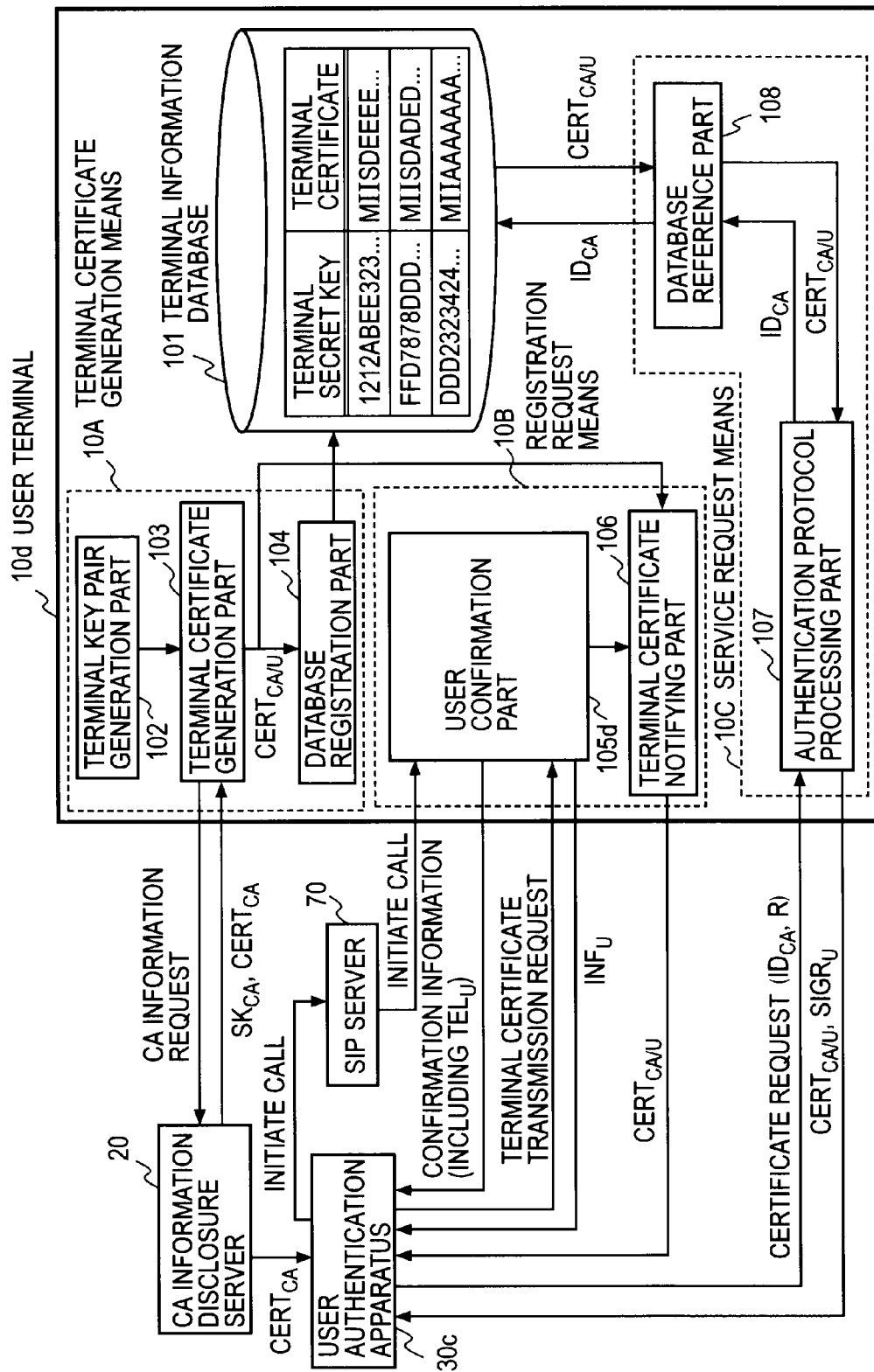
FIG. 27 is a block diagram of a user terminal in accordance with the fifth embodiment of the present invention.

As shown in FIG. 27, the user terminal 10d includes a terminal information database 101, a terminal key pair generation part 102, a terminal certificate generation part 103, a database registration part 104, a terminal certificate notifying part 106, an authentication protocol processing part 107, a database reference part 108, and a user confirmation part 105d. The terminal key pair generation part 102, the terminal certificate generation part 103, and the database registration part 104 configure terminal certificate generation means 10A. The user confirmation part 105d, and the terminal certificate notifying part 106 configure registration request means 10B. The authentication protocol processing part 107 and the database reference part 108 configure service request means 10C.

At the time of the user authentication in the user registration phase, the user confirmation part 105d uses a telephone network or an NGN 60, and the SIP server 70, to perform user confirmation processing with the user authentication apparatus 30c based on the user's telephone number $TEL_U$. Specifically, the user confirmation part 105d transmits confirmation information containing the telephone number $TEL_U$ to the user authentication apparatus 30c, and confirms the user by the user authentication apparatus 30c communicating with the user terminal 10d via a telephone network or an NGN 60, and an SIP server 70 using the telephone number $TEL_U$. After the confirmation, in response to the terminal certificate transmission request from the user authentication apparatus 30c, the terminal certificate $CERT_{CA/U}$ is transmitted from the terminal certificate notifying part 106, and further in response to the user information request, the user information $INF_U$ is transmitted to the user authentication apparatus 30c.

[User Authentication Apparatus]

Figure 28:
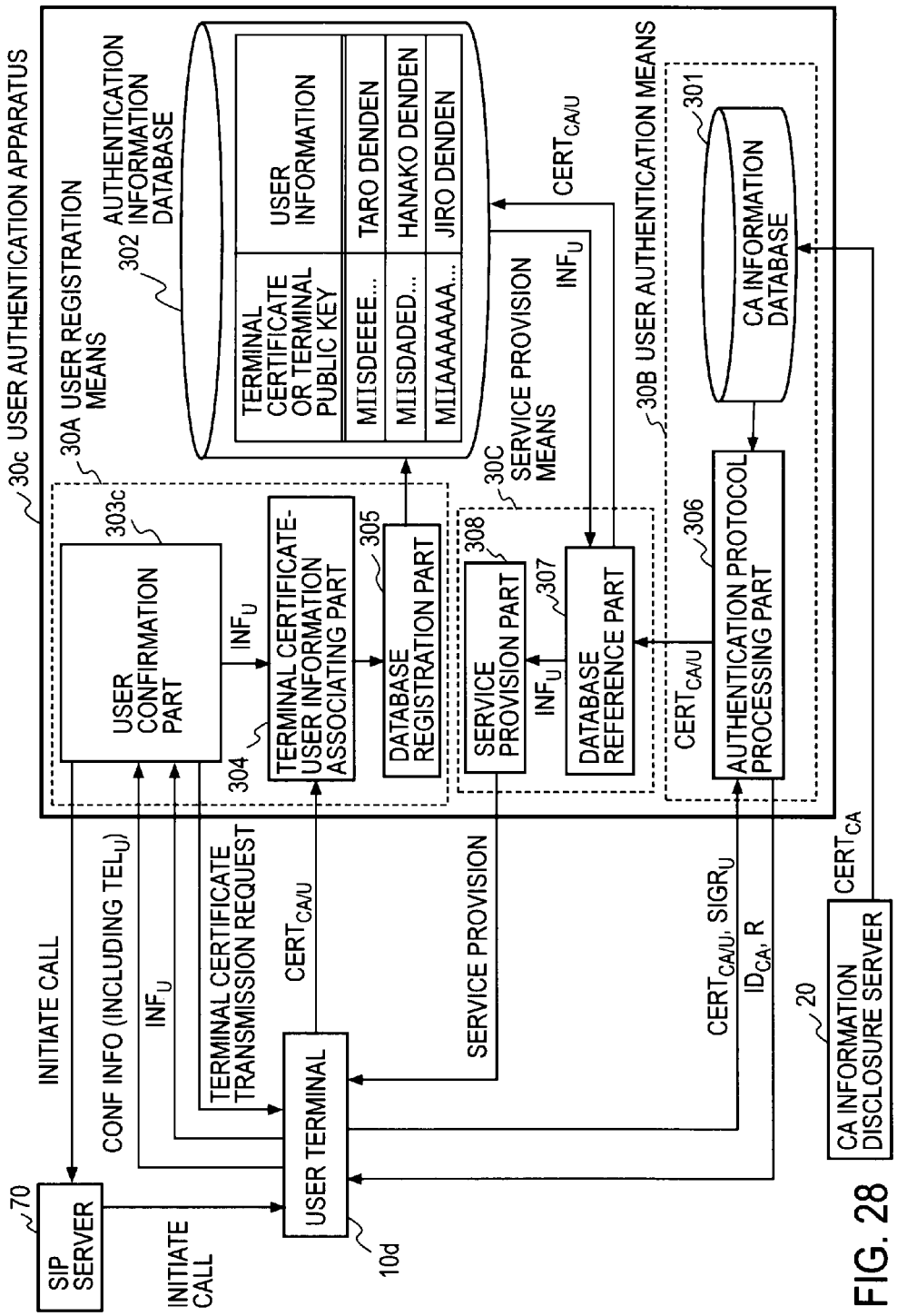
FIG. 28 is a block diagram of a user authentication apparatus in accordance with the fifth embodiment of the present invention.

As shown in FIG. 28, the user authentication apparatus 30c includes a CA information database 301, an authentication information database 302, a terminal certificate-user information associating part 304, a database registration part 305, an authentication protocol processing part 306, a database reference part 307, a service provision part 308, and a user confirmation part 303c. The user confirmation part 303c, and the terminal certificate-user information associating part 304, and the database registration part 305 configure user registration means 30A. The CA information database 301 and the authentication protocol processing part 306 configure user authentication means 30B. The database reference part 307 and the service provision part 308 configure service provision means 30C.

At the time of the user authentication in the user registration phase, the user confirmation part 303c utilizes a telephone network or an NGN 60, and an SIP server 70, to execute user confirmation processing with the user terminal 10d based on the user's telephone number $TEL_U$. More specifically, upon receiving confirmation information containing the telephone number $TEL_U$ from the user terminal 10d, and a connection session for confirmation is established with the user terminal 10d using the telephone number $TEL_U$, and if the session establishment has succeeded, it is assumed that the user confirmation is completed. Thereafter, a terminal certificate transmission request is transmitted to the user terminal 10d, and a terminal certificate $CERT_{CA/U}$ is received at the terminal certificate-user information associating part 304. Furthermore, the user confirmation part 303c transmits the user information request to the user terminal 10d, and receives the user information $INF_U$.

[User Registration Processing]

Figure 29:
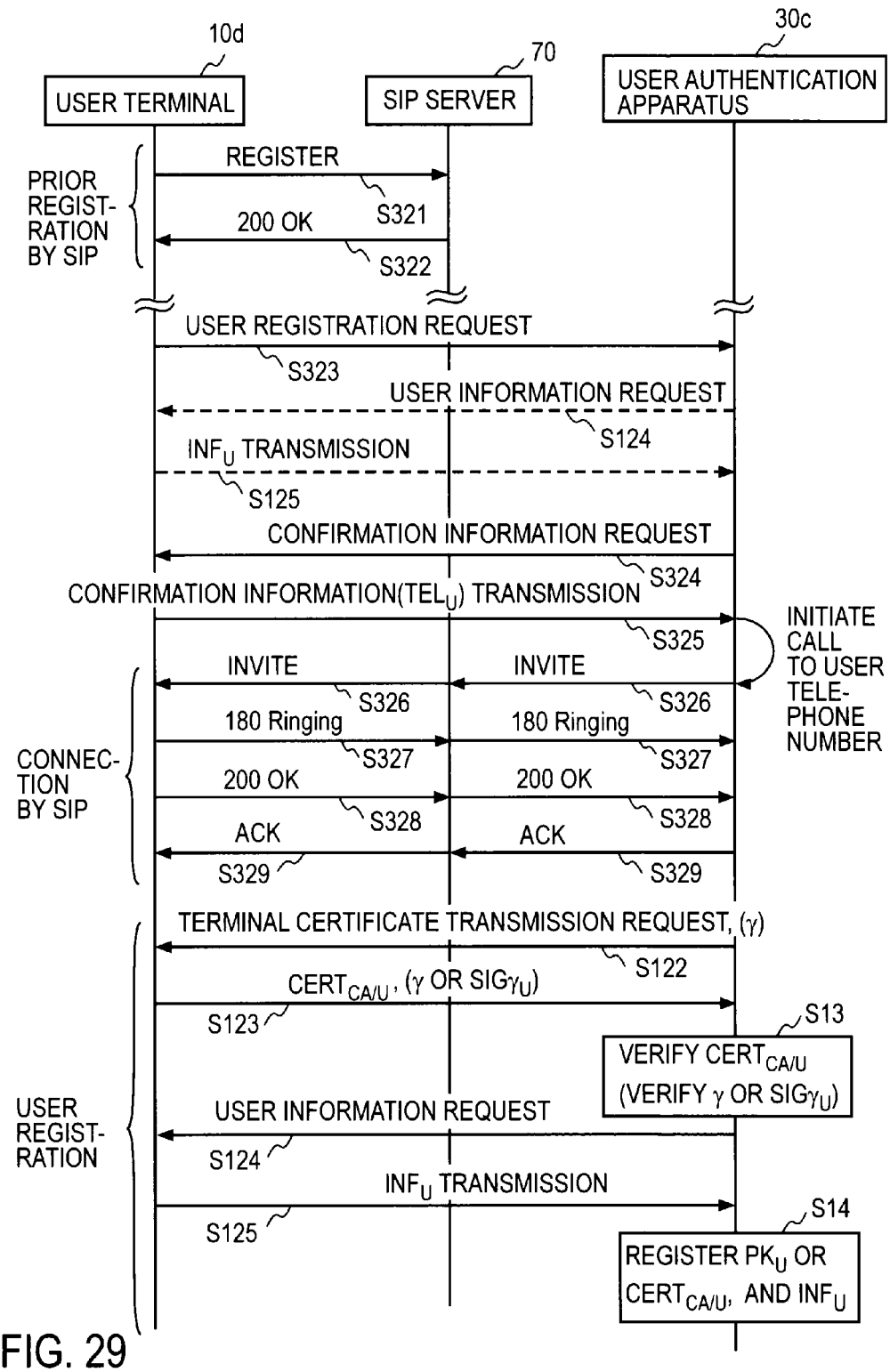
FIG. 29 is a sequence diagram showing a flow of user registration processing in a user authentication system in accordance with the fifth embodiment of the present invention.

FIG. 29 shows a flow of user registration processing in the user authentication system in a case where the SIP server 70 in accordance with the fifth embodiment of the present invention is used.

First, as an advance preparation, the user terminal 10d transmits to the SIP server 70 a message REGISTER, as well as a telephone number $TEL_U$ (IP telephone number) and an IP address $IPAD_U$, which is provided correspondingly to the telephone number, by means of the user confirmation part 105d (Step S321). The SIP server 70 registers the received telephone number $TEL_U$ and IP address $IPAD_U$ in association with each other, and transmits a message 200, "200 OK", to the user terminal 10d (Step S322). Unless the $TEL_U$ and $IPAD_U$ change, it is necessary to execute the advance preparation (Steps S321 and S322) only once. For example, even if accessing to a plurality of user authentication apparatus, it is necessary to execute only once before the first access.

The user terminal 10d transmits the user registration request to the user authentication apparatus 30c by means of the user confirmation part 105d (Step S323). In response to the registration request, the user authentication apparatus 30d transmits the confirmation information request to the user terminal 10d (Step S324). The user terminal 10d transmits the confirmation information containing the user's telephone number $TEL_U$ to the user authentication apparatus 30c by means of the user confirmation part 105d (Step S325).

The user authentication apparatus 30c retains the received telephone number $TEL_U$, and transmits a message INVITE to the user terminal 10d via the SIP server 70 using the telephone number $TEL_U$ (Step S326). In response to the message INVITE, the user terminal 10d transmits a ringing message, "180 Ringing", to the user authentication apparatus 30c via the SIP server 70 (Step S327), and after completing the call, transmits a message, "200 OK" to the user authentication apparatus 30c via the SIP server 70 (Step S328). The user authentication apparatus 30c confirms that the connection is successful by receiving the message, "200 OK", and completes the session establishment via the SIP by replaying with a message ACK (Step S329).

In the following, as with the sequence described in FIG. 15, the user authentication apparatus 30c transmits the terminal certificate transmission request to the user terminal 10d by the user confirmation part 303c (Step S122). In response to the terminal certificate transmission request, the user terminal 10d transmits the terminal certificate $CERT_{CA/U}$ to the user authentication apparatus 30c by means of the terminal certificate notifying part 106 (Step S123). The user authentication apparatus 30c verifies the authenticity of the received terminal certificate $CERT_{CA/U}$ at the terminal certificate-user information associating part 304 (Step S13), and if it is determined as having the authenticity, further transmits the user information request to the user terminal 10d (Step S124), and registers the returned user information $INF_U$ in the authentication information database 302 by means of the database registration part 305 in association with the terminal certificate $CERT_{CA/U}$ or the terminal public key $PK_U$ contained in the terminal certificate (Step S14). In addition to the user information $INF_U$, the stored telephone number $TEL_U$ may be stored in the authentication information database 302 to use for later service provision.

As with the case of FIG. 15, the user authentication apparatus 30c may transmit the terminal certificate transmission request with the random number γ to the user terminal 10d in Step S122, and the user terminal 10d may transmit to the user authentication apparatus 30c the received random number γ together with the terminal certificate $CERT_{CA/U}$ without modification in Step S123, and may further verify whether or not the random number γ received in Step S13 matches the random number γ transmitted in Step S122.

Alternatively, instead of returning the random number γ that the user terminal 10d received without modification, the user signature $SIG\gamma_U=SK_U(D\gamma)$ for data Dγ containing the random number (may be generated using the terminal secret key SKU, the user signature SIG(U may be transmitted to the user authentication apparatus 30c together with the terminal certificate CERTCA/U in Step S123, and the user authentication apparatus 30c may verify the received user signature SIG(U using the terminal public key PKU contained in the received terminal certificate CERTCA/U in Step S13.

Moreover, the transmission of the random number (by the user authentication apparatus 30c may be performed together with the transmission of the INVITE message of Step S326, the transmission of the user signature SIG(U for the random number ( and data D(which contains the random number ( by the user terminal 10d may be performed together with the transmission of the "200 OK" message in Step S328, and the user authentication apparatus 30c may transmit an ACK message in Step S329 only when the verification of the received random number (or user signature SIG(U was successful.

As to other configurations and flows, the configuration of the user terminal 10d, CA information disclosure server 20, and the user authentication apparatus 30c, and the flow of [certificate generation processing] and [user authentication processing] are the same as in the case with the second embodiment.

Moreover, in the present embodiment, it is also possible to integrate the CA information disclosure server 20 and the user authentication apparatus 30c into one apparatus.

Furthermore, in the present embodiment, as in the third embodiment, the CA information database 109 locates in the user terminal 10d, and the terminal certificate generation part 103 may generate the terminal certificate CERTCA/U, without acquiring CA information from the CA information disclosure server 20.

<Sixth Embodiment>

Figure 30:
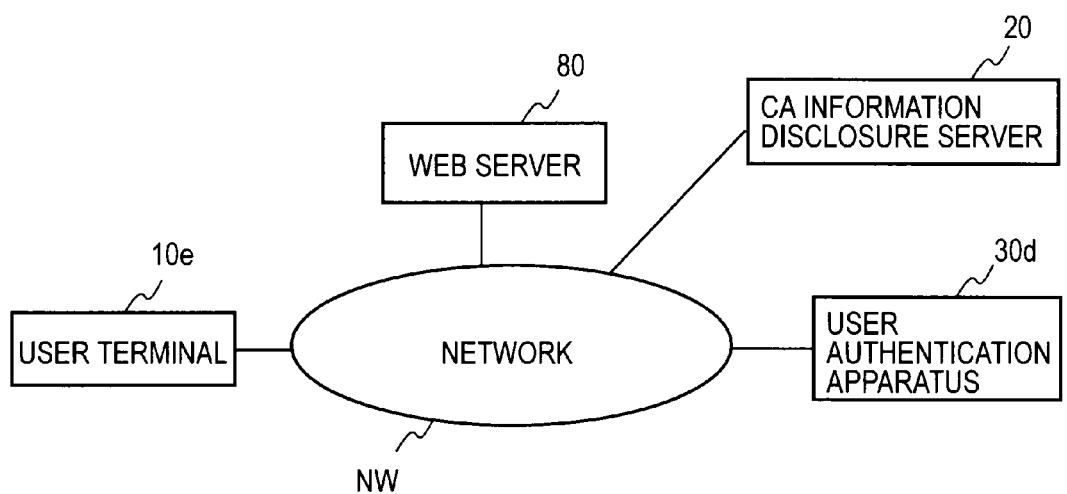
FIG. 30 is a block diagram briefly showing a user authentication system in accordance with a sixth embodiment of the present invention.

FIG. 30 shows a user authentication system in accordance with the sixth embodiment of the present invention. Shown here is an example which the web server issues as a third party organization, a URI that can identify a user uniquely, and performs the user confirmation based on the URI. Examples of the URI that can identify a user uniquely include http:// [domain name of web server]/[user name]/. However, it is not limited to this example. In the figure, same symbols are used for the same elements with the second embodiment. 10e is a user terminal, 20 is a CA information disclosure server, 30d is a user authentication apparatus, NW is a network, and 80 is a web server (third party organization) which replies to the URI of the users.

[User Terminal]

Figure 31:
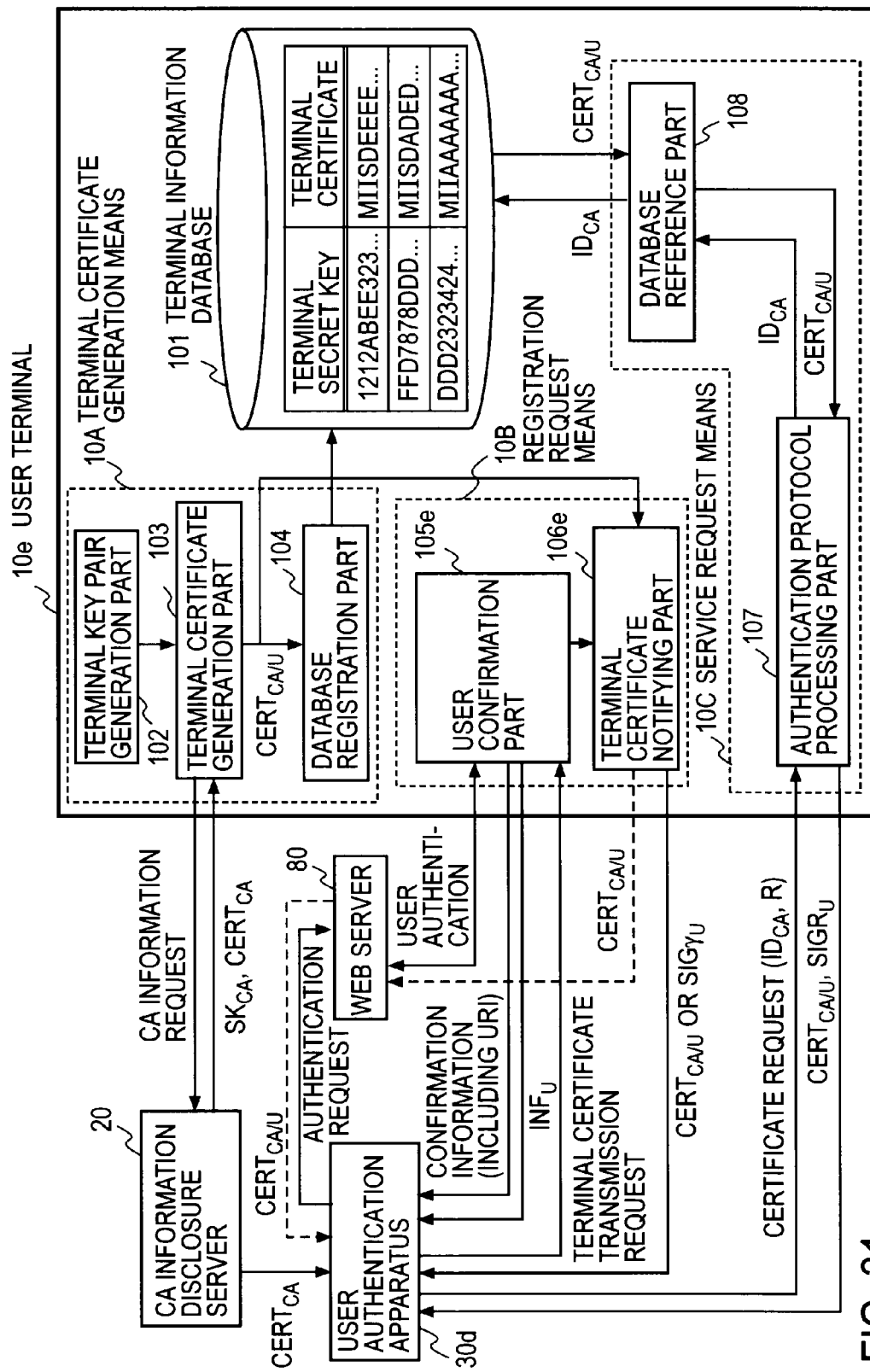
FIG. 31 is a block diagram of a user terminal in accordance with the sixth embodiment of the present invention.

As shown in FIG. 31, the user terminal 10e includes a terminal information database 101, a terminal key pair generation part 102, a terminal certificate generation part 103, a database registration part 104, an authentication protocol processing part 107, a database reference part 108, a user confirmation part 105e, and a terminal certificate notifying part 106e. The terminal key pair generation part 102, the terminal certificate generation part 103, and the database registration part 104 configure terminal certificate generation means 10A. The user confirmation part 105e and the terminal certificate notifying part 106e configure registration request means 10B. The authentication protocol processing part 107 and the database reference part 108 configure the service request means 10C.

It is assumed that the user confirmation part 105e has already acquired a URI unique to the user and was issued by the web server 80 in advance. At the time of the user registration, the web server 80 is used to execute user confirmation processing with the user authentication apparatus 30d based on the user's URI. Specifically, confirmation information containing the URI is transmitted to the user authentication apparatus 30d, to thereby perform the user authentication with the web server 80. Upon receiving the terminal certificate transmission request from the user authentication apparatus 30d, the terminal certificate transmission request is notified to the terminal certificate notifying part 106e, and the user information INFU is transmitted to the user authentication apparatus 30d.

Upon receiving the notification of the terminal certificate transmission request from the user confirmation part 105e, the terminal certificate notifying part 106e transmits the terminal certificate $CERT_{CA/U}$ to the user authentication apparatus 30d.

[User Authentication Apparatus]

Figure 32:
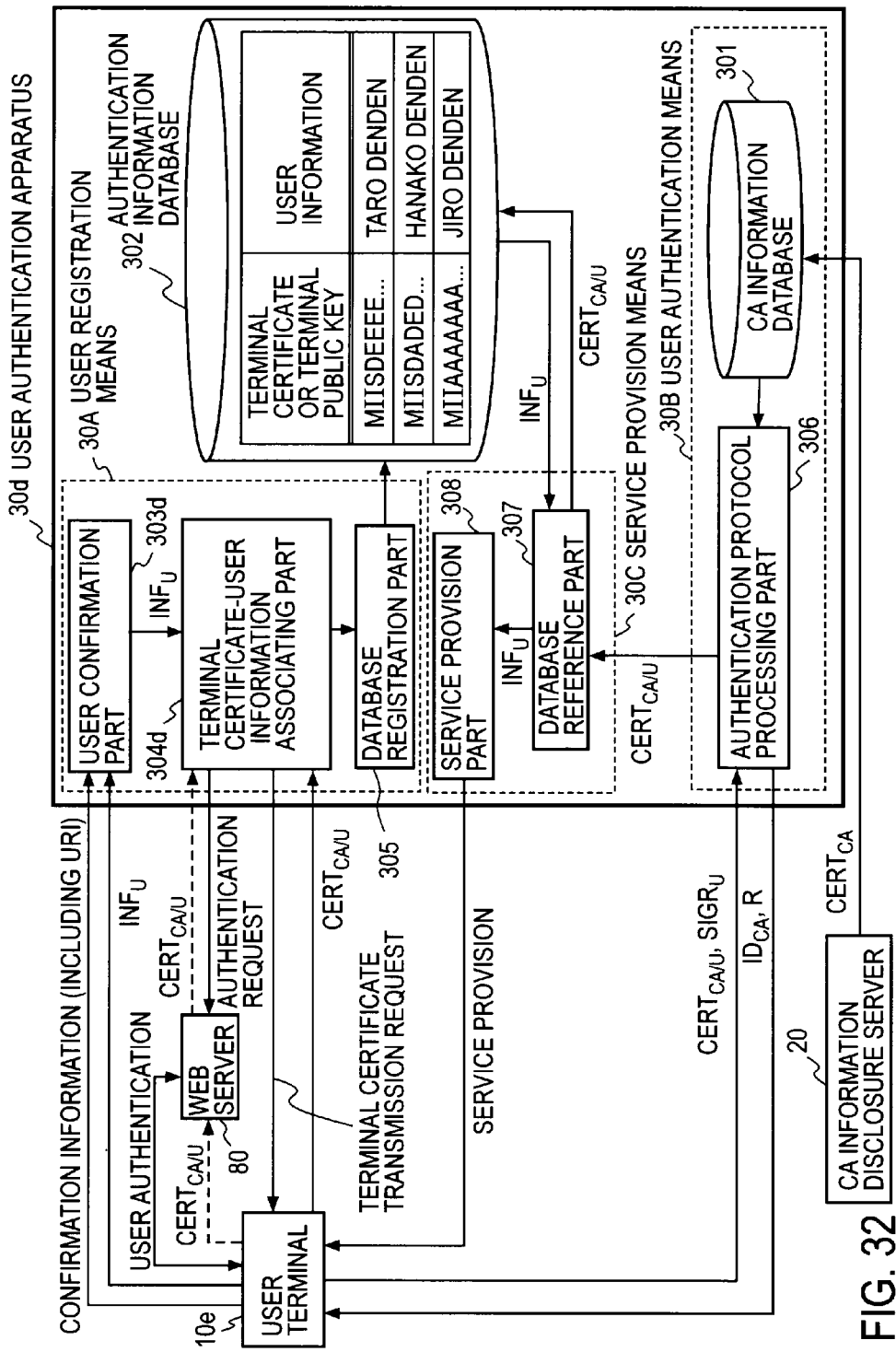
FIG. 32 is a block diagram of a user authentication apparatus in accordance with the sixth embodiment of the present invention.

As shown in FIG. 32, the user authentication apparatus 30d includes a CA information database 301, an authentication information database 302, a database registration part 305, an authentication protocol processing part 306, a database reference part 307, a service provision part 308, a user confirmation part 303d, and a terminal certificate-user information associating part 304d. The user confirmation part 303d, the terminal certificate-user information associating part 304d, and the database registration part 305 configure user registration means 30A. The CA information database 301 and the authentication protocol processing part 306 configure user authentication means 30B. The database reference part 307 and the service provision part 308 configure service provision means 30C.

At the time of the user registration, the user confirmation part 303d uses the web server 80 to execute user confirmation processing with the user terminal 10e based on the user's URI. Specifically, upon receiving the confirmation information containing the URI and the user information $INF_U$ from the user terminal 10e, they are stored, and notified to the terminal certificate-user information associating part 304d.

Upon receiving the URI from the user confirmation part 303d, the terminal certificate-user information associating part 304d accesses the web server 80 with the URI, and requests user authentication. As to the method for authenticating the user between the web server 80 and the user terminal 10e, any method can be used for it. If the authentication is successful, the terminal certificate transmission request is transmitted to the user terminal 10e. If the terminal certificate $CERT_{CA/U}$ is obtained from the user terminal 10e, the terminal certificate is verified, and the verification is successful, the user information $INF_U$ is further obtained from the user terminal 10e, and registered in association with the terminal certificate $CERT_{CA/U}$ in the authentication information database 302 via the database registration part 305.

[User Registration Processing]

Figure 33A:
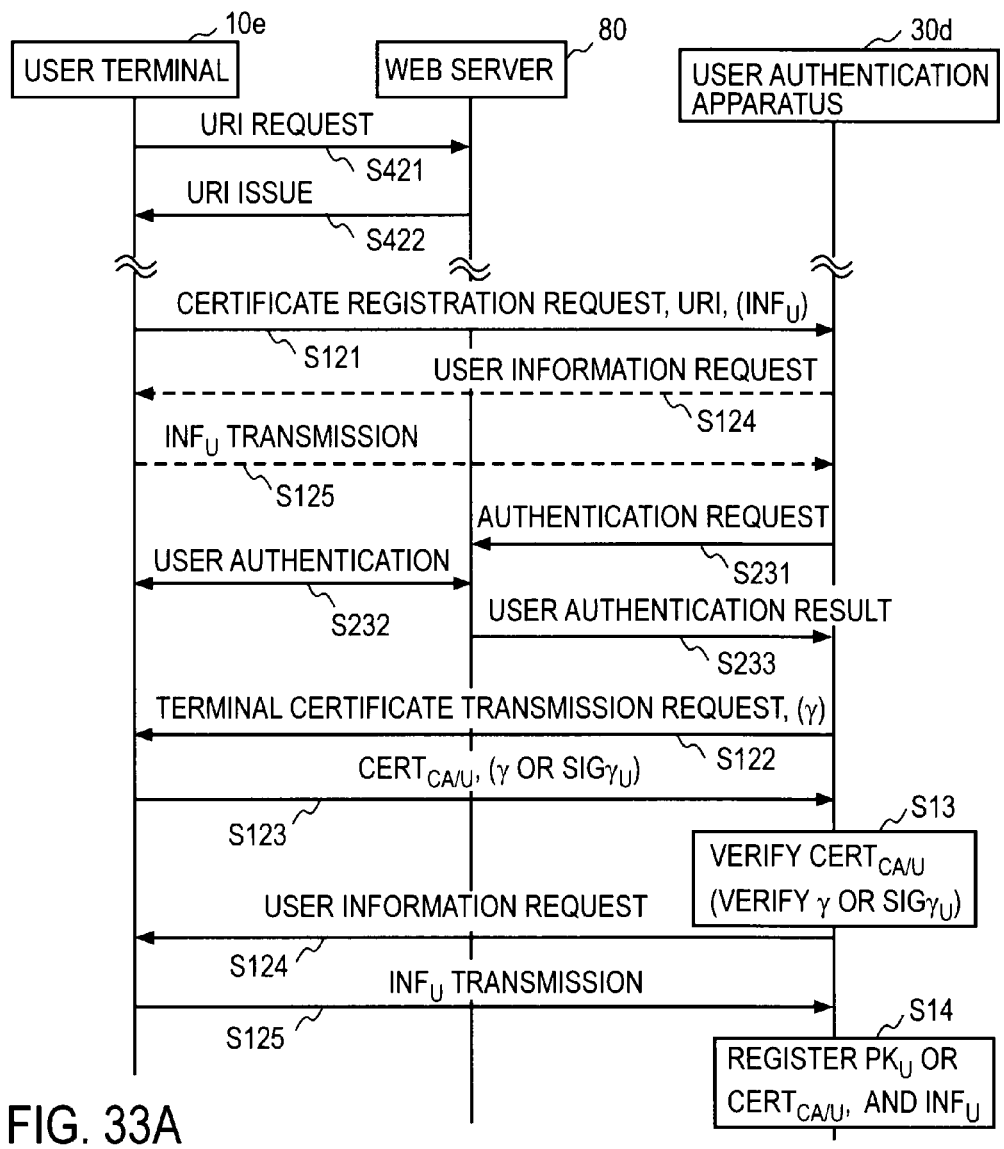
FIG. 33A is a sequence diagram showing a flow of user registration processing in a user authentication system in accordance with the sixth embodiment of the present invention.

FIG. 33A shows a flow of the user registration processing in the user authentication system in accordance with the sixth embodiment of the present invention.

First, as an advance preparation, the user terminal 10e requests a URI of the web server 80 by the user confirmation part 105e in advance (Step S421), and obtains a URI issued by the web server 80 (Step S422). It is necessary to perform the advance preparation (Steps S421 and S422) only once unless the URI is changed for reasons of the user or the web server, and for example, it is necessary to perform the advance preparation only once before the first access even when accessing to a plurality of user authentication apparatus. Next, the certificate registration request is transmitted to the user authentication apparatus 30d together with the confirmation information containing the URI (Step S121). The user authentication apparatus 30d accesses the web server 80 based on the obtained URI, requests the authentication (Step S231), replies to the authentication so that the web server 80 performs user authentication with the user confirmation parts 105e of the user terminal 10e (Step S232), and transmits the authentication result to the user authentication apparatus 30d (Step S233).

If the received authentication result is success, hereafter as in the case of FIG. 15, the user authentication apparatus 30d transmits the terminal certificate transmission request to the user terminal 10e (Step S122). In response to the transmission request, the user confirmation part 105e of the user terminal 10e transmits the terminal certificate $CERT_{CA/U}$ from the terminal certificate notifying part 106e to the user authentication apparatus 30d (Step S123). By means of the terminal certificate-user information associating part 304d, the user authentication apparatus 30d verifies the terminal certificate $CERT_{CA/U}$ received from the user terminal 10e (Step S13), and it has authenticity, transmits the user information request to the user terminal 10e (Step S124). In response to the user information request, the user terminal 10e transmits the user information $INF_U$ to the user authentication apparatus 30d by the user confirmation part 105e (Step S125). The user authentication apparatus 30d receives the user information $INF_U$ by the user confirmation part 303d, provides it to the terminal certificate-user information associating part 304d, and registers the user information $INF_U$ in the authentication information database 302 from the database registration part 305 in association with the received terminal certificate $CERT_{CA/U}$. In addition to the user information $INF_U$, the URI received from the user terminal 10e may be stored in the authentication information database 302 for use in later service provision.

The request and transmission of the terminal certificate in the above Steps S122 and S123 may be performed as will be described below with reference to FIG. 33B. Dashed lines in FIGS. 31 and 32 indicate flows of signals which are not in processing of FIG. 33A. Upon receiving the terminal certificate transmission request from the user authentication apparatus 30d in Step S122, the user terminal 10e notifies to the terminal certificate notifying part 106e by the user confirmation part 105e, and by means of the terminal certificate notifying part 106e which received the notification, the terminal certificate $CERT_{CA/U}$ is transmitted to the web server 80 (Step S123a), and in the web server 80, the terminal certificate $CERT_{CA/U}$ is registered in association with the user's URI. Furthermore, by means of the user confirmation part 105e, the user terminal 10e transmits the confirmation information containing the URI to the user authentication apparatus 30d, and notifies that the terminal certificate is registered into the web server 80 (Step S123b).

Upon receiving the confirmation information containing the URI by the user confirmation part 303d, the user authentication apparatus 30d notifies it to the terminal certificate-user information associating part 304d, and by means of the terminal certificate-user information associating part 304d, which received the notification, accesses to the web server 80 with the URI (Step S123c) to obtain the terminal certificate $CERT_{CA/U}$ (Step S123d). The process hereafter is continued to Step S13 of FIG. 33A.

Figure 33B:
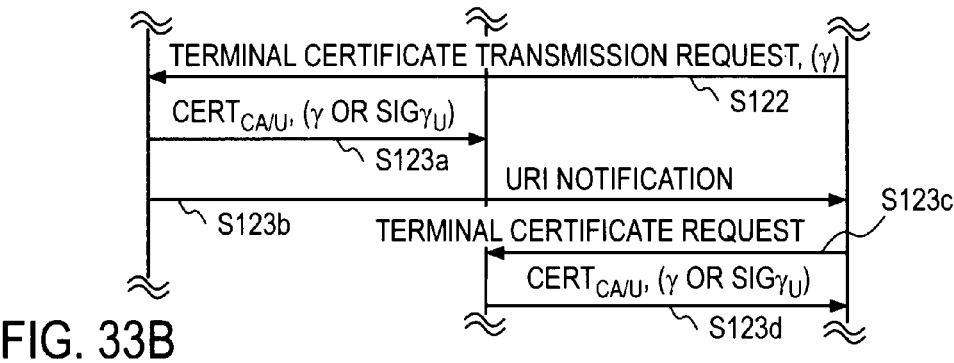
FIG. 33B is a sequence diagram showing other embodiments in Steps S122 and S123 in FIG. 33A.

In either of the cases of FIGS. 33A and 33B, as in the case of FIG. 15, the terminal certificate transmission request may be transmitted to the user terminal 10e together with the random number γ in Step S122, the user terminal 10e may transmit the received random number γ without modification together with the terminal certificate $CERT_{CA/U}$ to the user authentication apparatus 30d in Step S123 (or Steps S123a and S123d), and the verification of whether or not the random number γ received in Step S13 matches the random number γ transmitted in Step S122 may be further performed.

Alternatively, instead of returning without modification the random number γ that the user terminal 10e received, the user signature $SIG\gamma_U = SK_U(D\gamma)$ for data Dγ containing the random number γ may be generated using the terminal secret key $SK_U$, the user signature $SIG\gamma_U$ may be transmitted to the user authentication apparatus 30d together with the terminal certificate $CERT_{CA/U}$ in Step S123 (or Steps S123a and S123d), and the user authentication apparatus 30d may verify the received user signature $SIG\gamma_U$ using the terminal public key $PK_U$ contained in the received terminal certificate $CERT_{CA/U}$ in Step S13.

Moreover, as to configurations and flows other than the above, the configuration of the user terminal 10e, the CA information disclosure server 20, and the user authentication apparatus 30d, and the flow of [certificate generation processing] in the user registration phase, and [user authentication processing] in the utilization phase are the same as in the case with the second embodiment.

Moreover, in the present embodiment, it is also possible to integrate the CA information disclosure server 20 and the user authentication apparatus 30d into one apparatus.

Furthermore, in the present embodiment, as in the third embodiment, the CA information database 109 may be located in the user terminal 10e, and the terminal certificate generation part 103 may generate the terminal certificate $CERT_{CA/U}$, without acquiring the CA information from the CA information disclosure server 20.

<Seventh Embodiment>

Figure 34:
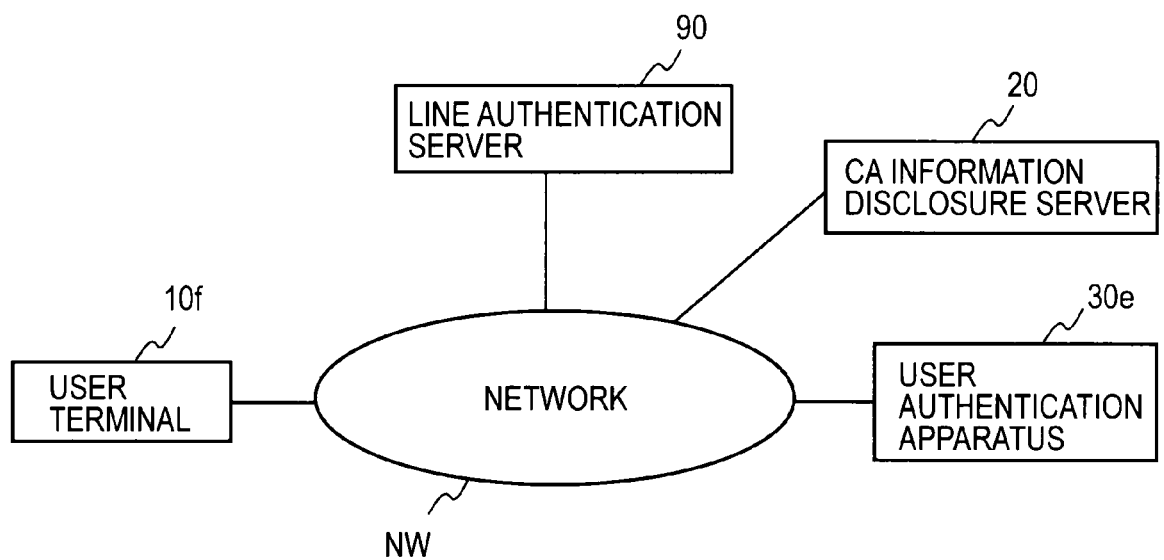
FIG. 34 is a block diagram briefly showing a user authentication system in accordance with a seventh embodiment of the present invention.

FIG. 34 shows a schematic view of a user authentication system in accordance with the seventh embodiment of the present invention. Shown here especially is a system which performs user confirmation based on the user line identifier $LID_U$ which is notified by the line authentication server used as the third party organization (cooperation with NGN line authentication service). In the figure, same symbols are used for the same elements as the second embodiment. That is, 10f is a user terminal, 20 is a CA information disclosure server, 30e is a user authentication apparatus, NW is a network, and 90 is a line authentication server (third party organization). In the line authentication server 90, user information is associated with an identifier of the line used by each user.

[User Terminal]

Figure 35:
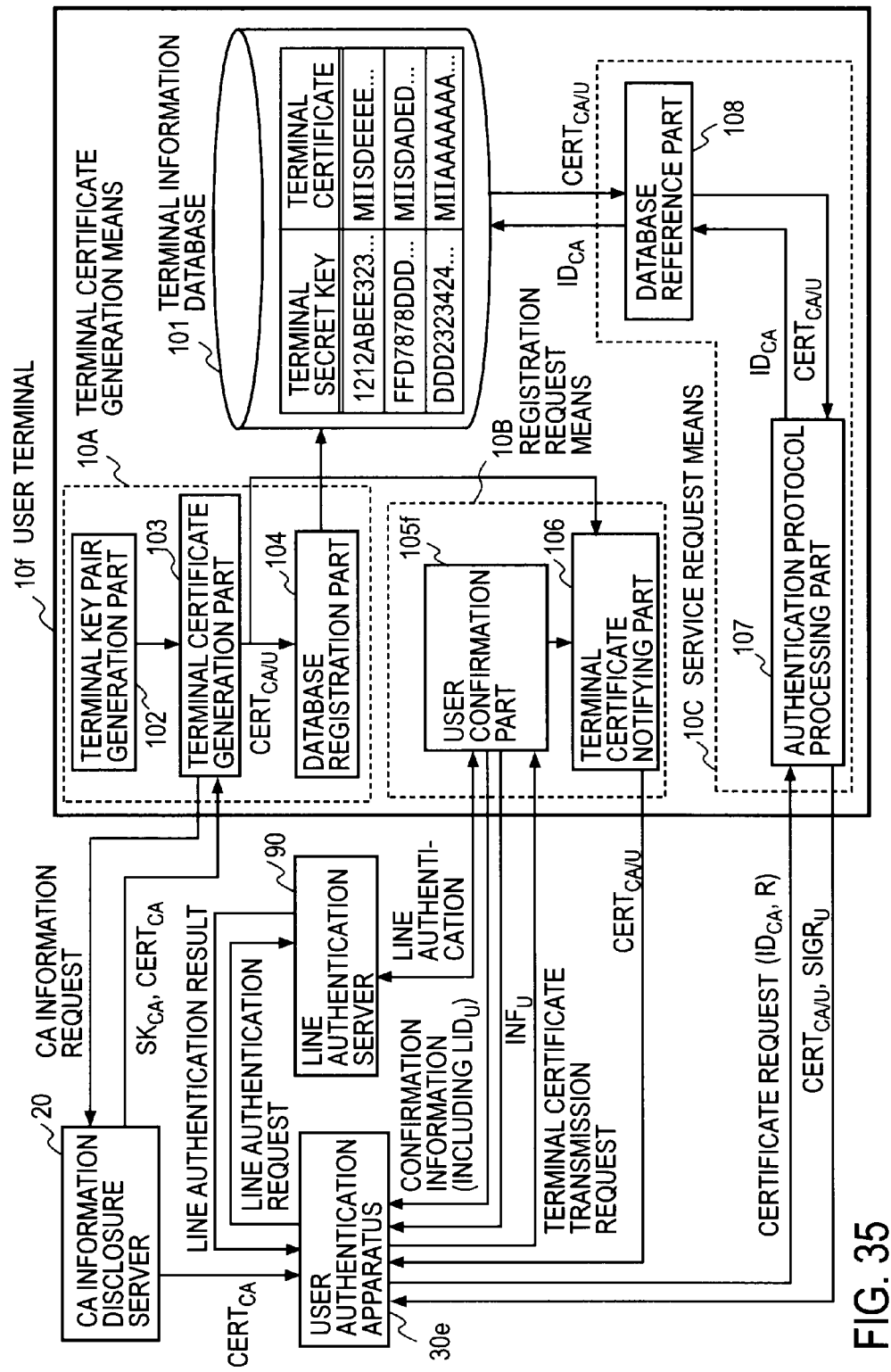
FIG. 35 is a block diagram of a user terminal in accordance with the seventh embodiment of the present invention.

As shown in FIG. 35, the user terminal 10f includes a terminal information database 101, a terminal key pair generation part 102, a terminal certificate generation part 103, a database registration part 104, a terminal certificate notifying part 106, an authentication protocol processing part 107, a database reference part 108, and a user confirmation part 105f. The terminal key pair generation part 102, the terminal certificate generation part 103, and the database registration part 104 configure terminal certificate generation means 10A. The user confirmation part 105f and the terminal certificate notifying part 106 configure registration request means 10B. The authentication protocol processing part 107 and the database reference part 108 configure service request means 10C.

At the time of the user confirmation in the user registration phase, the user confirmation part 105f uses the line authentication server 90 to execute user confirmation processing with the user authentication apparatus 30e based on the user line identifier $LID_U$. Specifically, the user confirmation part 105f transmits confirmation information containing the line identifier $LID_U$ to the user authentication apparatus 30e to perform the line authentication with the line authentication server 90.

[User Authentication Apparatus]

Figure 36:
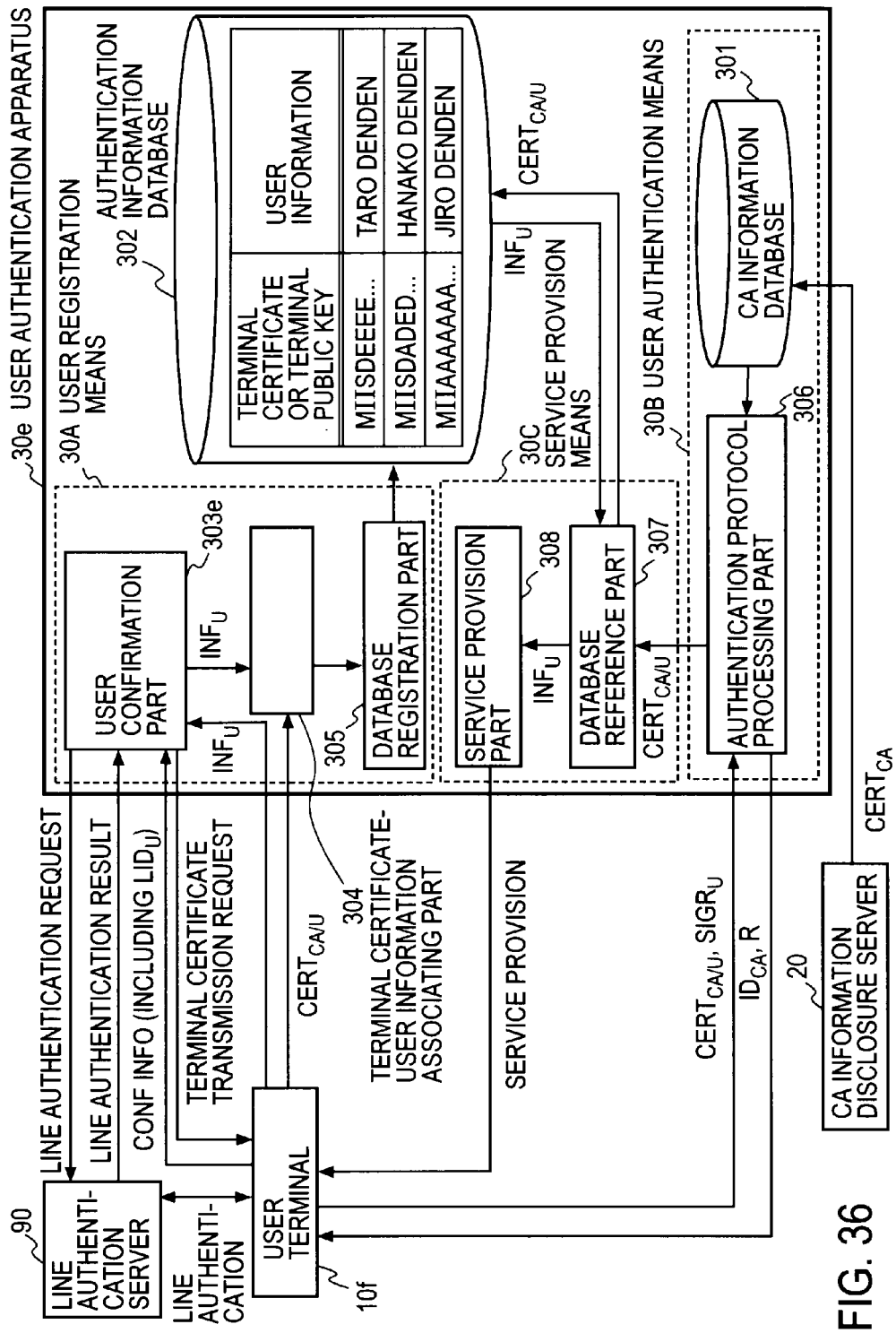
FIG. 36 is a block diagram of a user authentication apparatus in accordance with the seventh embodiment of the present invention.

As shown in FIG. 36, the user authentication apparatus 30e includes a CA information database 301, an authentication information database 302, a terminal certificate-user information associating part 304, a database registration part 305, an authentication protocol processing part 306, a database reference part 307, a service provision part 308, and a user confirmation part 303e. The user confirmation part 303e, the terminal certificate-user information associating part 304, and the database registration part 305 configure user registration means 30A. The CA information database 301 and the authentication protocol processing part 306 configure user authentication means 30B. The database reference part 307 and the service provision part 308 configure service provision means 30C.

At the time of the user confirmation, the user confirmation part 303e uses the line authentication server 90 to perform user confirmation processing with the user terminal 10f based on the user line identifier $LID_U$. Specifically, upon receiving the confirmation information containing the line identifier $LID_U$ from the user terminal 10f, the user confirmation part 303e stores it and requests authentication of the line identifier $LID_U$ to the line authentication server 90, receives the result, and if the authentication result is OK, notifies the confirmation information to the terminal certificate-user information associating part 304.

[User Registration Processing]

Figure 37:
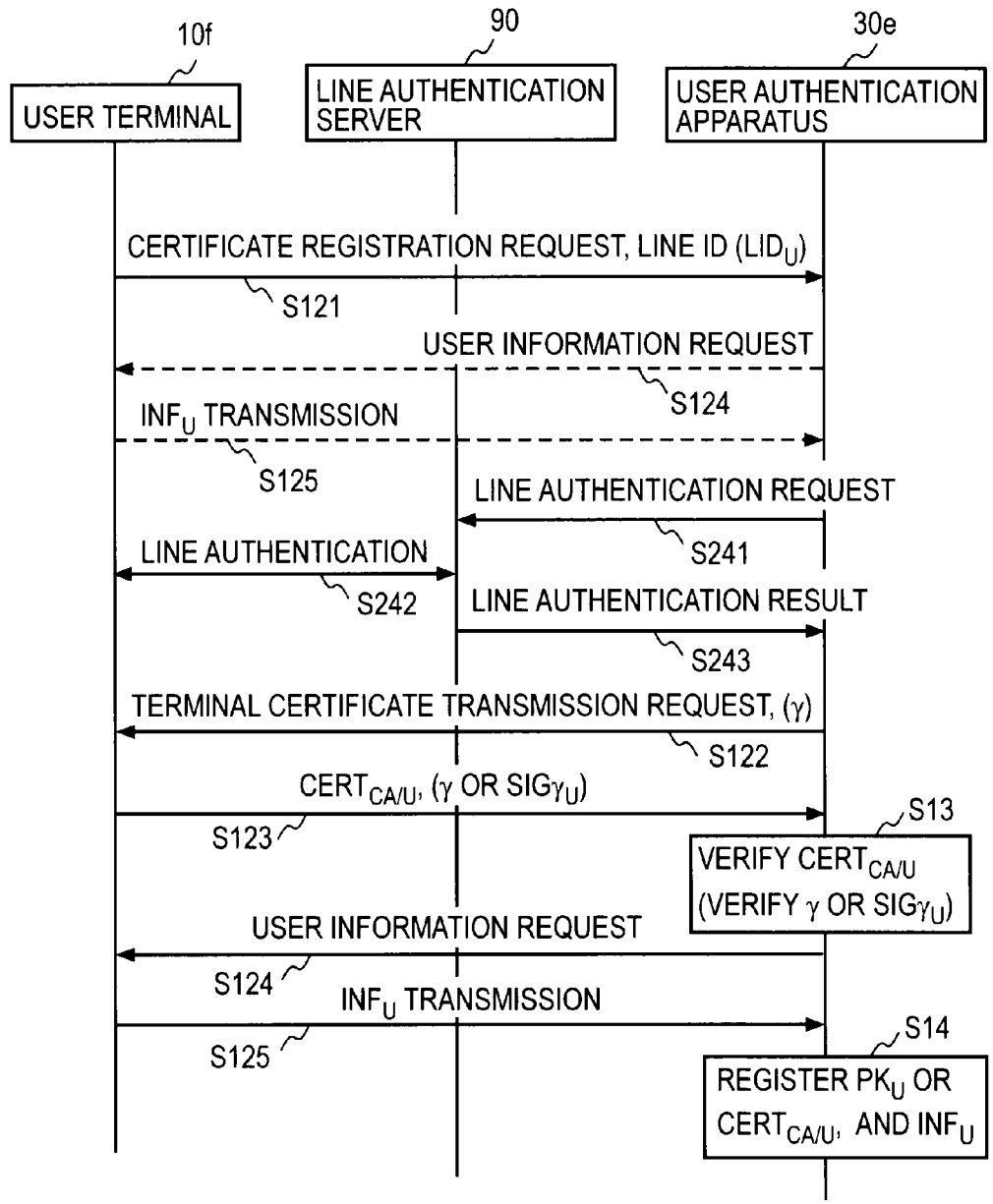
FIG. 37 is a sequence diagram showing a flow of user registration processing in a user authentication system in accordance with the seventh embodiment of the present invention.

FIG. 37 shows a flow of the user registration processing in the user authentication system in accordance with the seventh embodiment of the present invention.

By means of the user confirmation part 105f, the user terminal 10f transmits the confirmation information containing the line identifier $LID_U$ of the line that the user uses to the user authentication apparatus 30e, to request the certificate registration (Step S121). By means of the user confirmation part 303e, upon receiving the confirmation information containing the line identifier $LID_U$, the user authentication apparatus 30e stores it and transmits the line identifier $LID_U$ to the line authentication server 90, and requests authentication of the line identifier $LID_U$ (Step S241).

At the line authentication server 90, upon receiving the authentication request from the user authentication apparatus 30e, line authenticating processing is executed with the user terminal 10f based on the user information corresponding to the line identifier $LID_U$ (Step S242), and the result is transmitted to the user authentication apparatus 30e (Step S243).

By means of the user confirmation part 303e, the user authentication apparatus 30e receives the line authentication result from the line authentication server 90, and if the authentication result is OK, executes the subsequent Steps S122, S123, S13, S124, S125, and S14. Since they are similar to that of FIG. 15, the description is omitted.

As to other configurations and flows, the configuration of the user terminal 10f, the CA information disclosure server 20, and the user authentication apparatus 30e, and the flow of [certificate generation processing] and [user authentication processing] are the same as in the case with the second embodiment.

Moreover, in the present embodiment, it is also possible to integrate the CA information disclosure server 20 and the user authentication apparatus 30e into one apparatus.

Furthermore, in the present embodiment, as in the third embodiment, the CA information database 109 may be provided in the user terminal 10f, so that the terminal certificate generation part 103 generates the terminal certificate $CERT_{CA/U}$, without acquiring the CA information from the CA information disclosure server 20.

<Eighth Embodiment>

Figure 38:
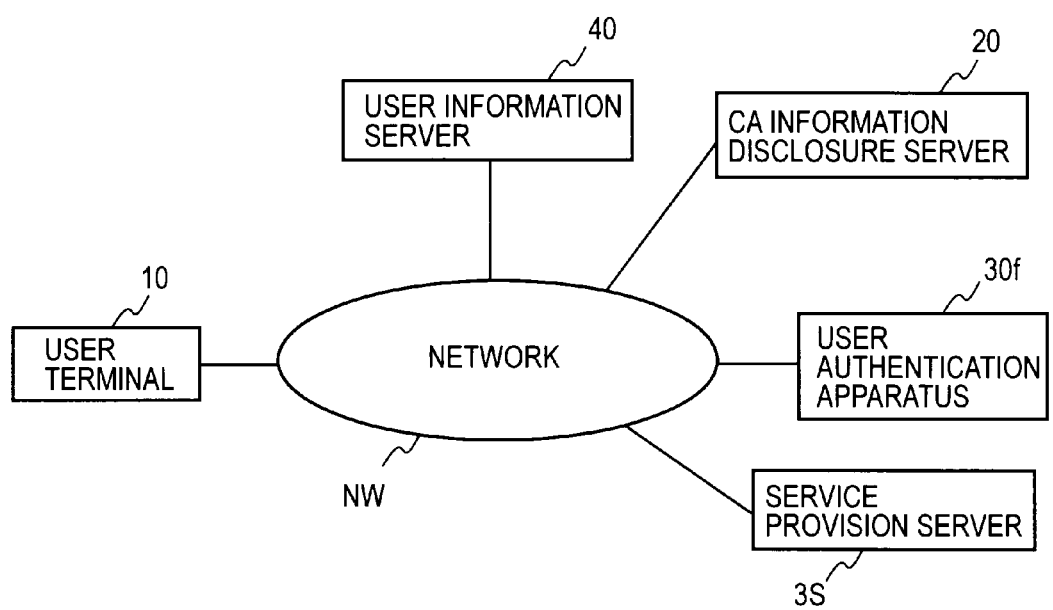
FIG. 38 is a block diagram briefly showing a user authentication system in accordance with an eighth embodiment of the present invention.

FIG. 38 shows a schematic view of a user authentication system in accordance with the eighth embodiment of the present invention. Shown here is a system which reconfirms the user information online at the time of user authentication processing (cooperation with NGN line authentication service or existing user database). In the figure, same symbols are used for the same elements as the second embodiment. 10 is a user terminal, 20 is a CA information disclosure server, 30f is a user authentication apparatus, NW is a network, 40 is a user information server, and 3S is a service provision server.

In the foregoing embodiments, the service provision part 308 in the user authentication apparatus 30 is described as providing service to the user terminal 10. However, shown here is an example which separates the function to actually provide service as the service provision server 3S from the service provision part 308. In this case, the user authentication apparatus 30f and the service provision server 3S may be provided in the same service provider 3, or alternatively, either one of them may be provided separately from the service provider 3.

In this embodiment, the "log in" is performed to the existing service provision server which authenticates with a user identifier $ID_U$ and a password $PW_U$ (hereafter referred to as "ID/PW"), in the utilization phase after performing the user registration in accordance with the first to the seventh embodiments.

[User Authentication Apparatus]

Figure 39:
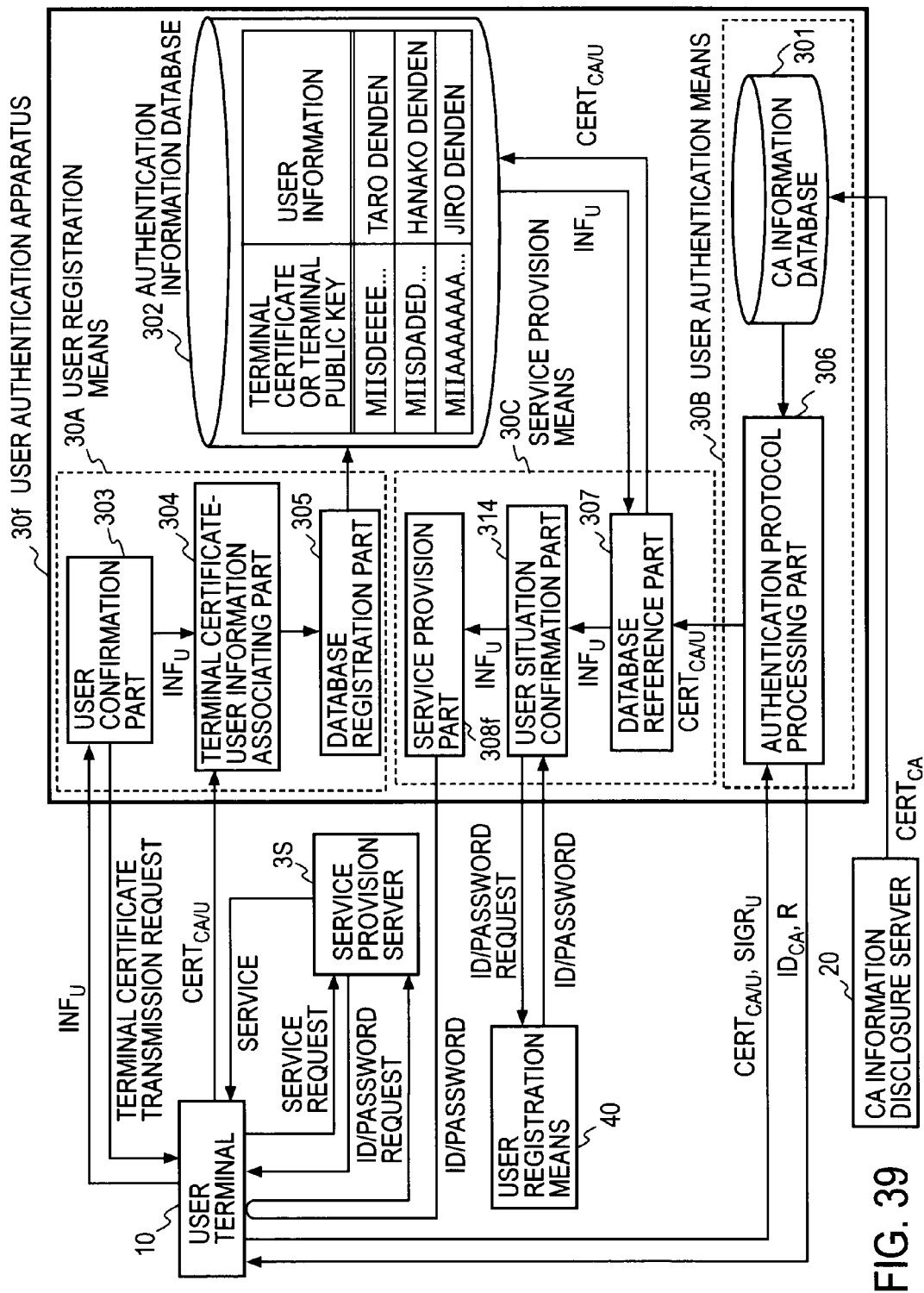
FIG. 39 is a block diagram of a user authentication apparatus in accordance with the eighth embodiment of the present invention.

As shown in FIG. 39, the user authentication apparatus 30f includes a CA information database 301, an authentication information database 302, a user confirmation part 303, a terminal certificate-user information associating part 304, a database registration part 305, an authentication protocol processing part 306, a database reference part 307, a service provision part 308f, and a user situation confirmation part 314. The user confirmation part 303, the terminal certificate-user information associating part 304, and the database registration part 305 configure user registration means 30A. The CA information database 301 and the authentication protocol processing part 306 configure user authentication means 30B.

The database reference part 307, the service provision part 308f, and the user situation confirmation part 314 configure service provision means 30C.

For example, the user information server 40 is provided with a user information database 3SD as shown in FIG. 40. At a point of time when each user performed the user registration with the user authentication apparatus 30f, the user terminal 10 transmits the terminal public key $PK_U$, the user identifier $ID_U$, and the password $PW_U$ contained in the user information of the user, to the user information server 40 together with the identifier $ID_S$ of the service provision server 3S that is desired to be used, and the user information server 40 registers them in association with each other in the user information database 3SD.

The user situation confirmation part 314 receives a service provision server identifier $ID_S$ from the user terminal 10 as an ID/PW request at the time of the user authentication in response to the service request, and for example, acquires the user information $INF_U$ corresponding to the terminal certificate $CERT_{CA/U}$ which was confirmed the authenticity of the terminal certificate $CERT_{CA/U}$ obtained from the user terminal 10 by Steps S16, S171, S172, S18, and S19 in FIG. 16 in the authentication protocol processing part 306, from the authentication information database 302 by means of the database reference part 307 in Step S20. Thereafter, the user identifier $ID_U$ and the password $PW_U$ are requested by transmitting the terminal public key $PK_U$ in the user information $INF_U$ and the received service provision server identifier $ID_S$ to the user information server 40. In response to the request, the user identifier $ID_U$ and the password $PW_U$ are received from the user information server 40, and the match of the received user identifier $ID_U$ and the user identifier $ID_U$ in the user information is confirmed. Thereafter, the user identifier $ID_U$ and the password $PW_U$ are transmitted from the service provision part 308f to the service provision server 3S via the user terminal as information that approves the service provision.

[User Authentication Processing]

Figure 41:
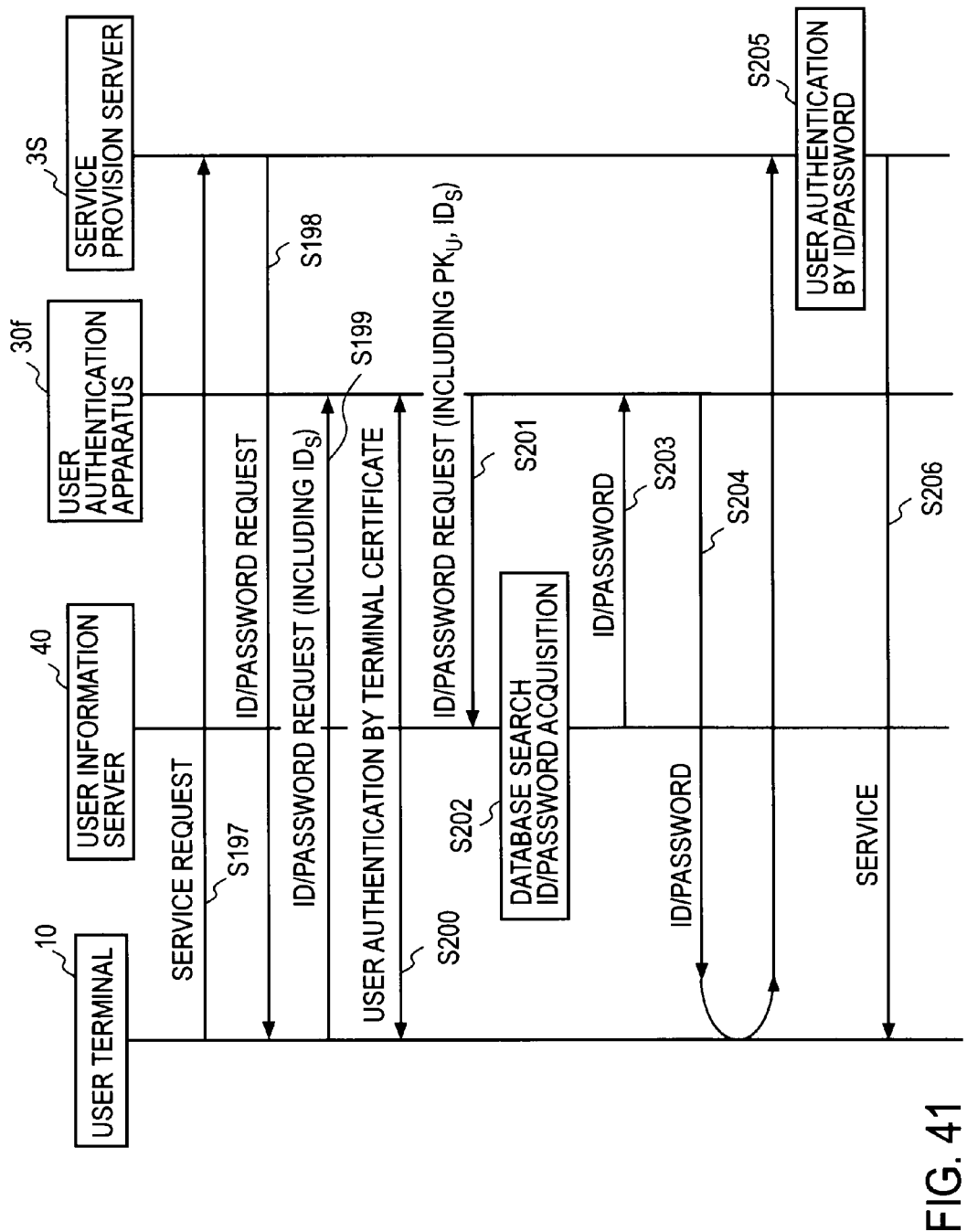
FIG. 41 is a sequence diagram showing a flow of user authentication processing in the user authentication system in accordance with the eighth embodiment of the present invention.

FIG. 41 shows a flow of user authentication processing in the utilization phase of the user authentication system in accordance with the eighth embodiment of the present invention.

In response to the user terminal 10 requesting service to the service provision server 3S (Step S197), the service provision server 3S requests a user identifier and a password (Step S198). The user terminal 10 requests the registered user identifier $ID_U$ and the password $PW_U$ by transmitting the identifier $ID_S$ of the service provision server 3S to the user authentication apparatus 30f (Step S199).

In response to the request, the user authentication apparatus 30f performs user authentication by means of the terminal certificate $CERT_{CA/U}$ with the user terminal 10 that is similar to Steps S16, S171, S172, S18, and S19 in FIG. 16, and the user information $INF_U$ corresponding to the terminal certificate $CERT_{CA/U}$ which was confirmed the authenticity in the authentication protocol processing part 306 is acquired from the authentication information database 302 by means of the database reference part 307 (Step S200).

Then, by means of the user situation confirmation part 314, the user authentication apparatus 30f transmits to the user information server 40 the terminal public key $PK_U$ in the user information $INF_U$ acquired at the database reference part 307 and the identifier $ID_S$ of the received service provision server, and requests the registered user identifier $ID_U$ and the password $PW_U$ (Step S201).

Upon receiving the terminal public key $PK_U$ and the service provision server identifier $ID_S$, the user information server 40 searches the user information database 3SD shown in FIG. 40 and reads the corresponding user identifier $ID_U$ and password $PW_U$ (Step S202), and returns them to the user authentication apparatus 30f (Step S203).

By means of the user situation confirmation part 314, the user authentication apparatus 30f receives the user identifier $ID_U$ and the password $PW_U$ from the user information server 40, and if the user identifier $ID_U$ matches the user identifier $ID_U$ in the user information $INF_U$ acquired from the authentication information database 302 in Step S200, transmits the user identifier $ID_U$ and the password $PW_U$ from the service provision part 308f to the service provision server 3S via the user terminal 10 (Step S204). The service provision server 3S performs user authentication using the received user identifier $ID_U$ and the password $PW_U$ (Step S205), and provides service to the user terminal 10 (Step S206).

The above Step S200 may be performed as client authentication by a certificate using TLS communication. The sequence in this case is as shown in FIG. 17.

In Steps S201, S202, and S203, authentication is performed by transmitting the terminal public key $PK_U$ in the user information $INF_U$ contained in the terminal certificate $CERT_{CA/U}$ which the user authentication apparatus 30f read from the authentication information database 302 as described above to the user information server 40, and the user information server 40 converting the terminal public key $PK_U$ into the corresponding ID/PW, and transmitting it to the user authentication apparatus 30f. As the user information server 40, existing software, FirstPass authentication cooperation sample program (http://www.docomo.biz/html/product/firstpass/support.html), which authenticates by converting from the user certificate information to the ID/PW of various applications may be used.

As to other configurations and flows, the configuration of the user terminal 10, the CA information disclosure server 20, and the user authentication apparatus 30f, and the flow of [certificate generation processing] and [user registration processing] are the same as in the case with the second embodiment.

Moreover, in the present embodiment, it is also possible to integrate the CA information disclosure server 20 and the user authentication apparatus 30f into one apparatus, and it is also possible to integrate the user information server 40 and the user authentication apparatus 30f into one apparatus.

Furthermore, in the present embodiment, as in the third embodiment, the CA information database 109 may be located in the user terminal 10, and the terminal certificate generation part 103 may generate the terminal certificate $CERT_{CA/U}$ without acquiring the CA information from the CA information disclosure server 20.

In the above second to eighth embodiments, in cases where the terminal key pair generation part and the terminal certificate generation part in the user terminal 10 are implemented on a computer, a program that implements those functions may be downloaded and acquired from the CA information disclosure server. This can be performed at the same time as acquiring the CA secret key $SK_{CA}$ and the CA certificate $CERT_{CA}$, and techniques such as Java (registered trademark) applet can be used for the implementation.

Moreover, the any identifier other than an e-mail address and a public key can be used as the user identifier $ID_U$, and hash of a public key can be used as the user identifier.

What is claimed is:

1. A user authentication system which performs user authentication utilizing a terminal certificate between a user authentication apparatus and a user terminal, the system comprising:
at least one user terminal having a certification authority secret key and a certification authority identifier, and at least one user authentication apparatus having a certification authority public key and a certification authority identifier are connected to at least a network,
the user terminal includes:
terminal certificate generation means which is configured to calculate a terminal signature using the certification authority secret key for signature subject information which is discretionary data, and generate a terminal certificate which is a self-signed certificate containing at least the signature subject information, the terminal signature, and the certification authority identifier;
terminal information storage means which is configured to save the terminal certificate;
registration request means which is configured to transmit at least the terminal certificate as a user registration request to the user authentication apparatus; and
service request means which is configured to acquire from the terminal information storage means a terminal certificate corresponding to a certification authority identifier received from a user authentication apparatus upon a service request, and transmit the terminal certificate to the user authentication apparatus; and
the user authentication apparatus includes:
authentication information storage means;
user registration means which is configured to register in the authentication information storage means a terminal certificate received from a user terminal; and
user authentication means which is configured to transmit, in response to a service request from a user terminal when authenticating the user terminal, the certification authority identifier to the user terminal, obtain a corresponding terminal certificate from the user terminal, and verify the terminal signature contained in the terminal certificate using the certification authority public key.

2. The user authentication system according to claim 1, wherein
the terminal certificate generation means of the user terminal includes a terminal key pair generation part which is configured to generate a pair consisting of a terminal secret key and a terminal public key, the signature subject information contains at least the terminal public key,
wherein the terminal information storage means of the user terminal further stores the terminal secret key which constitutes a pair with the terminal public key contained in the terminal certificate,
the service request means of the user terminal includes a first authentication protocol processing part which, at the time of user authentication when receiving the certificate request containing a random number together with the certification authority identifier from the user authentication apparatus in response to the service request to the user authentication apparatus, reads the terminal certificate corresponding to the certification authority identifier and the terminal secret key corresponding to the terminal certificate from the terminal information storage means, generates a user signature for data containing the random number with the terminal secret key, and transmits the user signature together with the terminal certificate to the user authentication apparatus, and
the user authentication means of the user authentication apparatus includes a second authentication protocol processing part which, at the time of user authentication, in response to the service request from the user terminal, transmits a certificate request containing a random number together with the certification authority identifier to the user terminal, and in response to the certificate request, verifies a user signature for data containing the random number received from the user terminal with a terminal public key contained in the terminal certificate.

3. The user authentication system according to claim 2, wherein
the signature subject information further includes user information,
the user registration means of the user authentication apparatus includes a terminal certificate-user information associating part which is configured to register, at the time of user registration, user information contained in the terminal certificate received from the user terminal into the authentication information storage means in association with the terminal certificate or at least a terminal public key contained in the terminal certificate, and
the user authentication apparatus further includes
service provision means which is configured to search in the authentication information storage means for user information corresponding to the terminal certificate received in response to a service request by the user terminal and verified or a terminal public key contained in the terminal certificate, and provide service to the user terminal using the obtained user information.

4. The user authentication system according to any one of claims 1 to 3, wherein
the terminal certificate generation means includes:
a certification authority information storage device which is configured to store a certification authority certificate that contains at least a certification authority public key, a certification authority signature, and a certification authority identifier of a higher rank certification authority or own certificate authority which made the certificate authority signature, in association with a certification authority secret key that constitutes a pair with the certification authority public key contained in the certification authority certificate, the certificate authority public key, the certificate authority signature and the certificate authority identifier being pre-embedded in a storage part of the user terminal; and
a terminal certificate generation part which is configured to acquire a certification authority secret key and a certification authority certificate from the certification authority information storage part to generate the terminal signature and the terminal certificate.

5. The user authentication system according to claim 1, wherein
the registration request means of the user terminal includes a first user confirmation part which is configured to execute user confirmation processing with the user authentication apparatus using confirmation information at the time of terminal certificate registration, and
the user registration means of the user authentication apparatus includes a second user confirmation part which is configured to execute user confirmation processing with the user terminal using the confirmation information received from the user terminal at the time of terminal certificate registration.

6. The user authentication system according to claim 5, wherein
at least one mail server is connected to the network,
the first user confirmation part is configured to transmit user information containing an e-mail address of the user to the user authentication apparatus, and upon receiving an e-mail transmitted to the e-mail address from the user authentication apparatus via the mail server, transmit the confirmation information contained in the e-mail to the user authentication apparatus, and
the second user confirmation part, upon receiving user information containing an e-mail address from the user terminal, transmits an e-mail containing confirmation information to the e-mail address via the mail server, and upon receiving confirmation information from the user terminal, registers the terminal certificate into the authentication information storage means.

7. The user authentication system according to claim 5, wherein:
a session initiation protocol server, hereinafter referred to as SIP server, or a switch is connected to the network, a user telephone number and user information are registered in the SIP server or the switch,
the first user confirmation part in the user terminal is configured to transmit confirmation information containing a user telephone number at the time of user registration to the user authentication apparatus, and to establish a connection session with user authentication apparatus using the telephone number via the SIP server or the switch, and
the second user confirmation part in the user authentication apparatus is configured to establish a connection session with the user terminal via the SIP server or the switch using a telephone number contained in the confirmation information received at the time of user registration, and to register the terminal certificate into the authentication information storage means if the connection establishment is successful.

8. The user authentication system according to claim 5, wherein
a web server which issues an URI unique to the user is connected to the network,
the first user confirmation part in the user terminal is configured to transmit confirmation information containing an URI of a user to the user authentication apparatus at the time of user registration, and to perform user authentication with the web server, and
the second user confirmation part in the user authentication apparatus is configured to request user authentication to the web server using an URI contained in the confirmation information received at the time of user registration, and to register the terminal certificate into the authentication information storage means if the user authentication is successful.

9. The user authentication system according to claim 5, wherein
a line authentication server in which user information corresponding to an identifier of a line for use by a user is registered is connected to the network,
the first user confirmation part in the user terminal is configured to transmit confirmation information containing a line identifier of a line for use at the time of user registration to the user authentication apparatus, and to perform user authentication with the line authentication server, and
the second user confirmation part in the user authentication apparatus is configured to request authentication for a line identifier contained in the confirmation information received at the time of user registration to the line authentication server, and to register the terminal certificate into the authentication information storage means if the line authentication is successful.

10. The user authentication system according to claim 5, wherein at least one service provision server which is capable of communicating with the user terminal and the user authentication apparatus via the network and provides service to a user using predetermined identification information for each user is connected to the network, the first user confirmation part in the user terminal is configured to execute user confirmation processing with the user authentication apparatus using the predetermined identification information and the service provision server at the time of user authentication, and the second user confirmation part is configured to execute user confirmation processing with the user terminal using the predetermined identification information and the service provision server at the time of user authentication.

11. A user authentication method which performs user authentication utilizing a terminal certificate between a user authentication apparatus and a user terminal, wherein at least one user terminal having a certification authority secret key and a certification authority identifier, and at least one user authentication apparatus having a certification authority public key and a certification authority identifier are connected to at least a network, the method comprising steps:

in the user terminal, a terminal certificate generation step which calculates a terminal signature using the certification authority secret key for signature subject information which is discretionary data, and generates a terminal certificate which is a self-signed certificate containing at least the signature subject information, the terminal signature, and the certification authority identifier;

a terminal information storing step which saves the terminal certificate;

a registration request step which transmits at least the terminal certificate as a user registration request to the user authentication apparatus; and a service request step which acquires from terminal information storage meansa terminal certificate corresponding to a certification authority identifier received from a user authentication apparatus upon a service request, and transmits the terminal certificate to the user authentication apparatus; and in user authentication apparatus, a user registration step which registers into the authentication information storing step a terminal certificate received from a user terminal; and a user authentication step which, in response to a service request from a user terminal, upon authentication of the user terminal, transmits the certification authority identifier to the user terminal, obtains a corresponding terminal certificate from the user terminal, and verifies the terminal signature contained in the terminal certificate using the certification authority public key.

12. The user authentication method according to claim 11, wherein the terminal certificate generation step of the user terminal includes a terminal key pair generation step which generates a pair consisting of a terminal secret key and a terminal public key, the signature subject information contains at least the terminal public key, the terminal information storing step of the user terminal further stores the terminal secret key which constitutes a pair with the terminal public key contained in the terminal certificate, the service request step of the user terminal includes a first authentication protocol processing step which, at the time of user authentication, upon receiving the certificate request containing a random number together with the certification authority identifier from the user authentication apparatus in response to the service request to the user authentication apparatus, reads the terminal certificate corresponding to the certification authority identifier and the terminal secret key corresponding to the terminal certificate from the terminal information storage means, generates a user signature for data containing the random number with the terminal secret key, and transmits the user signature together with the terminal certificate to the user authentication apparatus, and the user authentication step of the user authentication apparatus includes a second authentication protocol processing step which, at the time of user authentication, in response to the service request from the user terminal, transmits a certificate request containing a random number together with the certification authority identifier to the user terminal, and in response to the certificate request, verifies a user signature for data containing the random number received from the user terminal with a terminal public key contained in the terminal certificate.

13. The user authentication method according to claim 12, wherein the signature subject information further includes user information, the user registration step of the user authentication apparatus includes a terminal certificate-user information associating step which, at the time of user registration, registers user information contained in the terminal certificate received from the user terminal into authentication information storage means in association with the terminal certificate or at least a terminal public key contained in the terminal certificate, and the user authentication apparatus further includes service provision step which searches in the authentication information storage means for user information corresponding to the terminal certificate received in response to a service request by the user terminal and verified or a terminal public key contained in the terminal certificate, and provides service to the user terminal using the obtained user information.

14. The user authentication method according to any one of claims 11 to 13, further comprises certification authority information storing step including:

a certification authority information storage step which stores a certification authority certificate that contains at least a certification authority public key, a certification authority signature, and a certification authority identifier of a higher rank certification authority or own certificate authority which made the certificate authority signature, in association with a certification authority secret key that constitutes a pair with the certification authority public key contained in the certification authority certificate, the certificate authority public key, the certificate authority signature and the certificate authority identifier being pre-embedded in a storage part of the user terminal; and a terminal certificate generation step which acquires a certification authority secret key and a certification authority certificate from the certification authority information storage means, generates the terminal signature and the terminal certificate.

15. The user authentication method according to claim 11, wherein
the registration request step of the user terminal includes a first user confirmation step which executes user confirmation processing with the user authentication apparatus using confirmation information at the time of terminal certificate registration, and
the user registration step of the user authentication apparatus includes a second user confirmation step which executes user confirmation processing with the user terminal using the confirmation information received from the user terminal at the time of terminal certificate registration.

16. A user authentication system which performs, by a user authentication apparatus, authentication utilizing a certificate between the user authentication apparatus and a user terminal, the user authentication system comprising at least:
a user terminal for use by a user;
a certification authority information disclosure server which discloses certification authority information;
a user authentication apparatus which authenticates the user to provide service; and
a network which connects the user terminal, the certification authority information disclosure server, and the user authentication apparatus; and wherein
the user terminal includes at least:
a terminal key pair generation part which is configured to generate a key pair consisting of a public key and a secret key;
a terminal certificate generation part which is configured to acquire a certification authority secret key and a certification authority certificate from a certification authority information disclosure server, makes a terminal signature using the certification authority secret key for at least a terminal public key generated at the terminal key pair generation part, and generate a terminal certificate which is a self-signed certificate containing at least the terminal public key, the terminal signature, and an identifier of the certification authority certificate; and
a terminal information database which is configured to store the terminal certificate generated in the terminal certificate generation part in association with the terminal secret key which constitutes a pair with the terminal public key included in the terminal certificate; and wherein
the certification authority information disclosure server includes at least:
a first certification authority information database which is configured to store a certification authority certificate containing at least a certification authority public key, a certificate authority signature, and an identifier of a higher rank certification authority or own certification authority which made the certificate authority signature, in association with a certification authority secret key which constitutes a pair with the certification authority public key contained in the certification authority certificate; and
a certification authority information notifying part which is configured to acquire a certification authority secret key and a certification authority certificate from the first certification authority information database in response to the certification authority information request from the user terminal, and transmit the certification authority secret key and the certification authority certificate to the user terminal; and wherein the user authentication apparatus includes
a second certification authority information database which is configured to store a certification authority certificate that the certification authority information disclosure server discloses.

17. A user authentication system in which a user authentication apparatus performs authentication utilizing a certificate between the user authentication apparatus and a user terminal, the user authentication system comprising at least:
a user terminal for use by a user;
a certification authority information disclosure server which is configured to disclose certification authority information;
a user authentication apparatus which is configured to authenticate the user to provide service; and
a network which is connected to the user terminal, the certification authority information disclosure server, and the user authentication apparatus; and wherein
the user terminal includes at least:
a first certification authority information database which is a database pre-embedded by a vendor of base software or hardware of the user terminal, and is configured to store the certification authority certificate containing at least a certification authority public key which the vendor discloses, a certificate authority signature, and an identifier of a higher rank certification authority or own certification authority which made the certificate authority signature, in association with a certification authority secret key which constitutes a pair with the certification authority public key contained in the certification authority certificate;
a terminal key pair generation part which is configured to generate a key pair consisting of a public key and a secret key;
a terminal certificate generation part which is configured to acquire a certification authority secret key and a certification authority certificate from the first certification authority information database, make a terminal signature using the certification authority secret key for at least a public key generated at the terminal key pair generation part, and generate a terminal certificate which is a self-signed certificate containing at least the public key, the terminal signature, and a certification authority identifier of the certification authority certificate; and
a terminal information database which is configured to store the terminal certificate generated in the terminal certificate generation part in association with the terminal secret key which constitutes a pair with the terminal public key included in the terminal certificate; and wherein
the user authentication apparatus includes
a second certification authority information database which is configured to store a certification authority certificate that is disclosed by the certification authority information disclosure server,
the certification authority information disclosure server includes at least
a third certification authority information database which is configured to store a certification authority certificate containing at least a certification authority public key that the vendor of the base software or the hardware of the user terminal discloses, a certificate authority signature, and an identifier of a higher rank certification authority or own certification authority which made the certificate authority signature.

18. The user authentication system according to claim 16 or 17, wherein the user terminal further includes:

a first user confirmation part which is configured to execute user confirmation processing with the user authentication apparatus at the time of terminal certificate registration;

a terminal certificate notifying part which is configured to transmit the terminal certificate generated in the terminal certificate generation part to the user authentication apparatus;

a first authentication protocol processing part which at the time of user authentication upon receiving a certificate request containing an identifier of a trusted certification authority and a random number from the user authentication apparatus in response to a service request to the user authentication apparatus in accordance with a standard security protocol, reads the terminal certificate that matches the identifier of the certification authority and the terminal secret key corresponding to the terminal certificate from the terminal information database, makes a user signature on the random number using the terminal secret key, and transmits the user signature together with the terminal certificate to the user authentication apparatus; and the user authentication apparatus further includes an authentication information database which is configured to store the user information in association with a user terminal certificate received from the user terminal or at least the terminal public key contained in the terminal certificate;

a second user confirmation part which is configured to execute user confirmation processing with the user terminal at the time of terminal certificate registration;

a terminal certificate-user information associating part which is configured to receive the terminal certificate from the user terminal, and if the user confirmation processing by the second user confirmation part is successful, registers the user information in association with the terminal certificate or at least the terminal public key contained in the terminal certificate;

a second authentication protocol processing part which, at the time of user authentication, in accordance with a standard security protocol, in response to a service request from the user terminal, reads a trusted certification authority certificate from the second certification authority information database, transmits a certificate request containing a certification authority identifier of the certification authority certificate and a random number, and in response to the certificate request, verifies the user signature for the random number received from the user terminal together with the terminal certificate using the terminal public key of the user terminal;

a database reference part which is configured to search in the authentication information database for user information corresponding to the terminal certificate received together with the user signature and succeeded in the verification or the terminal public key contained in the terminal certificate; and a service provision part which is configured to provide service to the user terminal using user information acquired at the database reference part.

19. The user authentication system according to claim 18 further including a service provision server which is configured to be capable of communicating with the user terminal and the user authentication apparatus via the network, and provide service to a user using predetermined identification information for each user, and wherein the user terminal includes a user confirmation part which is configured to execute, at the time of user authentication, user confirmation processing with the user authentication apparatus using the predetermined identification information and the service provision server, and wherein the user authentication apparatus includes a user confirmation part which is configured to execute, at the time of user authentication, user confirmation processing with the user terminal using the predetermined identification information and the service provision server.

20. A user authentication method in which a user authentication apparatus performs authentication with the user terminal utilizing a certificate in a user authentication system comprising at least:

a user terminal for use by a user;

a certification authority information disclosure server which discloses certification authority information;

a user authentication apparatus which authenticates the user to provide service; and a network which connects the user terminal, the certification authority information disclosure server, and the user authentication apparatus;

the method including:

a step by the user terminal of generating a key pair consisting of a terminal public key and a terminal secret key, and requesting certification authority information to the certification authority information disclosure server;

a step by the certification authority information disclosure server of reading a certification authority secret key and a certification authority identifier from the certification authority information database in response to the request, and transmitting the certificate authority secret key and the certificate authority identifier to the user terminal; and a step by the user terminal of making, upon receiving the certification authority secret key and the certification authority identifier from the certification authority information disclosure server, a signature using the certification authority secret key on at least the generated terminal public key, generating the terminal certificate which is a self-signed certificate containing at least the terminal public key, the signature, and the certification authority identifier, and registering the terminal certificate in the terminal information database in association with the terminal secret key which constitutes a pair with the terminal public key contained in the terminal certificate.

21. The user authentication method according to claim 20 further including:

a step of executing user confirmation processing for terminal certificate registration between the user terminal and the user authentication apparatus;

a step by the user terminal of transmitting the terminal certificate to the user authentication apparatus;

a step by the user authentication apparatus of registering, upon receiving the terminal certificate from the user terminal, if the user confirmation processing is successful, the user information in the authentication information database in association with the terminal certificate or at least the terminal public key contained in the terminal certificate;

a step by the user authentication apparatus of reading, in response to a service request from the user terminal, in accordance with a standard security protocol, an identifier of a trusted certification authority from the certification authority information database, and transmitting the certificate request containing the identifier of the trusted certification authority and a random number to the user terminal;

a step by the user terminal of reading, upon receiving the certificate request containing the identifier of the trusted certification authority and the random number from user authentication apparatus in accordance with a standard security protocol, the terminal certificate that matches the identifier of the certification authority and the corresponding terminal secret key from the terminal information database, making a user signature on the random number using the terminal secret key, and transmitting the user signature together with the terminal certificate to the user authentication apparatus;

a step by the user authentication apparatus of verifying the user signature made on the random number received from the user terminal with the terminal public key of the user terminal, and confirming the authenticity, in accordance with a standard security protocol;

a step by the user authentication apparatus of searching in the authentication information database for the user information corresponding to the terminal certificate received together with the user signature and succeeded in the verification or the terminal public key contained in the terminal certificate; and a step by the user authentication apparatus of providing service to the user terminal using the user information by means of the service provision part.

* * * * *